US012726297B2

(12) United States Patent
Yi et al.

(10) Patent No.: US 12,726,297 B2
(45) Date of Patent: Sep. 1, 2026

(54) HYBRID AUTOMATIC REPEAT REQUEST FEEDBACK WITH CONTROL CHANNEL REPETITION

(71) Applicant: Ofinno, LLC, Reston, VA (US)

(72) Inventors: Yunjung Yi, Vienna, VA (US); Esmael Hejazi Dinan, McLean, VA (US); Ali Cagatay Cirik, Chantilly, VA (US); Nazanin Rastegardoost, McLean, VA (US)

(73) Assignee: Ofinno, LLC, Reston, VA (US)

( * ) Notice: Subject to any disclaimer, the term of this patent is extended or adjusted under 35 U.S.C. 154(b) by 457 days.

(21) Appl. No.: 17/975,170

(22) Filed: Oct. 27, 2022

(65) Prior Publication Data

US 2023/0050541 A1 Feb. 16, 2023

Related U.S. Application Data

(63) Continuation of application No. PCT/US2021/054656, filed on Oct. 13, 2021.

(60) Provisional application No. 63/091,773, filed on Oct. 14, 2020.

(51) Int. Cl.

| | |
|---|---|
| ***H04L 1/18*** | (2023.01) |
| ***H04L 1/1812*** | (2023.01) |
| ***H04L 1/1867*** | (2023.01) |
| ***H04L 5/00*** | (2006.01) |

(52) U.S. Cl.

CPC ............ *H04L 1/189* (2013.01); *H04L 1/1812* (2013.01); *H04L 5/0055* (2013.01)

(58) Field of Classification Search

CPC ... H04L 1/1812; H04L 1/1822; H04L 1/1861; H04L 1/189; H04L 1/1896; H04L 5/0055

See application file for complete search history.

(56) References Cited

U.S. PATENT DOCUMENTS

| | | | | |
|---|---|---|---|---|
| 12,120,679 | B2 * | 10/2024 | Gou | H04L 1/1812 |
| 2018/0019843 | A1 | 1/2018 | Papasakellariou | |
| 2019/0342030 | A1 * | 11/2019 | Hosseini | H04L 1/18 |

FOREIGN PATENT DOCUMENTS

| | | | |
|---|---|---|---|
| WO | 2020/042528 | A1 | 5/2020 |
| WO | 2020/090366 | A1 | 5/2020 |
| WO | 2020/198432 | A1 | 10/2020 |

OTHER PUBLICATIONS

3GPP TS 38.211 V16.2.0 (Jun. 2020); Technical Specification; 3rd Generation Partnership Project; Technical Specification Group Radio Access Network; NR; Physical channels and modulation; (Release 16).

(Continued)

*Primary Examiner* — Mansour Oveissi

(74) *Attorney, Agent, or Firm* — Patrick Moon; Kavon Nasabzadeh; Jacob L. Mangan

(57) ABSTRACT

A wireless device may receive an indication that repetition of downlink control information (DCI) is scheduled via a first monitoring occasion and a second monitoring occasion. The wireless device may transmit one or more feedback information bits via an uplink resource. The one or more feedback information bits may be based on a downlink assignment index (DAI) corresponding to the earlier of the first monitoring occasion and the second monitoring occasion.

20 Claims, 32 Drawing Sheets

(56) References Cited

OTHER PUBLICATIONS

3GPP TS 38.212 V16.1.0 (Mar. 2020); Technical Specification; 3rd Generation Partnership Project; Technical Specification Group Radio Access Network; NR; Multiplexing and channel coding; (Release 16).
3GPP TS 38.213 V16.2.0 (Jun. 2020); Technical Specification; 3rd Generation Partnership Project; Technical Specification Group Radio Access Network; NR;Physical layer procedures for control; (Release 16).
3GPP TS 38.331 V16.1.0 (Jul. 2020); Technical Specification; 3rd Generation Partnership Project; Technical Specification Group Radio Access Network; NR; Radio Resource Control (RRC) protocol specification; (Release 16).
R1-2005236; 3GPP TSG-RAN WG1 Meeting #102e; e-Meeting, Aug. 17-28, 2020; Agenda Item: 8.6.3; Source: Ericsson; Title: Coverage recovery and capacity impact for RedCap; Document for: Discussion and Decision.
R1-2005246; 3GPP TSG RAN WG1 Meeting #102-e; E-meeting, Aug. 17-28, 2020; Agenda Item: 8.1.1; Source: Huawei, HiSilicon; Title: Enhancements on multi-beam operation in Rel-17; Document for: Discussion and Decision.
R1-2005278; 3GPP TSG RAN WG1 Meeting #102-e; eMeeting, Aug. 17-Aug. 28, 2020; Agenda Item: 8.6.3; Source: Futurewei; Title: Coverage Recovery for Redcap; Document for: Discussion and decision.
R1-2005286; 3GPP TSG RAN WG1 #102-e; e-Meeting, Aug. 17-28, 2020; Agenda Item: 8.1.2.2; Source: Futurewei; Title: Inter-cell multi-TRP operation; Document for: Discussion/Decision.
R1-2005287; 3GPP TSG RAN WG1 #102-e; e-Meeting, Aug. 17-28, 2020; Agenda Item: 8.1.2.3; Source: Futurewei; Title: Beam management for simultaneous multi-TRP transmission with multi-panel reception; Document for: Discussion/Decision.
R1-2005290; 3GPP TSG RAN WG1 #102-e; e-Meeting, Aug. 17-28, 2020; Agenda Item: 8.1.1; Source: Futurewei; Title: Enhancement on multi-beam operation; Document for: Discussion/Decision.
R1-2005363; 3GPP TSG RAN WG1 #102-e; e-Meeting, Aug. 17-28, 2020; Source: vivo; Title: Discussion on multi-beam enhancement; Agenda Item: 8.1.1; Document for: Discussion and Decision.
R1-2005366; 3GPP TSG RAN WG1 #102-e; e-Meeting, Aug. 17-28, 2020; Source: vivo; Title: Discussion on MTRP multi-beam enhancement; Agenda Item: 8.1.2.3; Document for: Discussion and Decision.
R1-2005385; 3GPP TSG-RAN WG1 #102; e-Meeting, Aug. 17-28, 2020; Source: vivo, Guangdong Genius, GDCNI; Title: Discussion on functionality for coverage recovery; Agenda Item: 8.6.3; Document for: Discussion and Decision.
R1-2005454; 3GPP TSG RAN WG1 Meeting #102-e; e-Meeting, Aug. 17-28, 2020; Source: ZTE; Title: Enhancements on Multi-beam Operation; Agenda Item: 8.1.1; Document for: Discussion and Decision.
R1-2005527; 3GPP TSG RAN WG1 Meeting #102-e; e-Meeting, Aug. 17-28, 2020; Agenda item: 8.6.3; Source: Nokia, Nokia Shanghai Bell; Title: Functionality for coverage recovery; Document for: Discussion and Decision.
R1-2005560; 3GPP TSG RAN WG1#102e; E-meeting, Aug. 17-28, 2020; Agenda Item: 8.1.1; Source: Sony; Title: Considerations on the enhancement of multi-beam operation; Document for: Discussion.
R1-2005639; 3GPP TSG RAN WG1 Meeting #102-e; e-Meeting, Aug. 17-28, 2020; Agenda Item: 8.6.3; Source: MediaTek Inc.; Title: Discussion on coverage recovery for NR RedCap UEs; Document for: Discussion and Decision.
R1-2005882; 3GPP TSG RAN WG1 Meeting #102_E; e-Meeting, Aug. 17-28, 2020; Agenda Item: 8.6.3; Source: Intel Corporation; Title: On coverage recovery for RedCap NR UEs; Document for: Discussion/Decision.
R1-2006128; 3GPP TSG RAN WG1 #102-e; e-Meeting, Aug. 17-28, 2020; Agenda item: 8.1.1; Source: Samsung; Title: Multi-beam enhancements; Document for: Discussion and Decision.
R1-2006154; 3GPP TSG RAN WG1 #102-e; e-Meeting, Aug. 17-28, 2020; Agenda Item: 8.6.3; Source: Samsung; Title: Coverage recovery for low capability device; Document for: Discussion and decision.
R1-2006308; 3GPP TSG RAN WG1 #102-e; e-Meeting, Aug. 17-28, 2020; Agenda Item: 8.6.3; Source: LG Electronics; Title: Discussion on the coverage recovery of reduced capability NR devices; Document for: Discussion and decision.
R1-2006526; 3GPP TSG-RAN WG1 #102-e; e-Meeting, Aug. 17-28, 2020; Source: Apple Inc.; Title: Functionality for Coverage Recovery for RedCap; Agenda item: 8.6.3; Document for: Discussion and Decision.
R1-2006541; 3GPP TSG RAN WG1 #102-e; e-Meeting, Aug. 17-28, 2020; Agenda Item: 8.6.3; Source: InterDigital, Inc.; Title: PDCCH coverage enhancement for reduced capability NR devices; Document for: Discussion.
R1-2006735; 3GPP TSG RAN WG1 #102-e; e-Meeting, Aug. 17-28, 2020; Source: Ntt Docomo, Inc.; Title: Discussion on coverage recovery for RedCap; Agenda Item: 8.6.3; Document for: Discussion and Decision.
R1-2006790; 3GPP TSG RAN WG1 Meeting #102-e; Aug. 17-28, 2020; Agenda item: 8.1.1; Source: Qualcomm Incorporated; Title: Enhancements on Multi-beam Operation; Document for: Discussion/Decision.
R1-2006791; 3GPP TSG-RAN WG1 Meeting #102-e; e-Meeting, Aug. 17-28, 2020; Agenda item: 8.1.2.1; Source: Qualcomm Incorporated; Title: Enhancements on Multi-TRP for PDCCH, PUCCH and PUSCH; Document for: Discussion/Decision.
R1-2006792; 3GPP TSG-RAN WG1 Meeting #102-e; e-Meeting, Aug. 17-28, 2020; Agenda item: 8.1.2.2; Source: Qualcomm Incorporated; Title: Enhancements on Multi-TRP inter-cell operation; Document for: Discussion/Decision.
R1-2006793; 3GPP TSG RAN WG1 Meeting #102-e; Aug. 17-28, 2020; Agenda item: 8.1.2.3; Source: Qualcomm Incorporated; Title: Enhancements on beam management for multi-TRP; Document for: Discussion/Decision.
R1-2006797; 3GPP TSG-RAN WG1 #102-e; e-Meeting, Aug. 17-Aug. 28, 2020; Agenda item: 8.2.1; Source: Qualcomm Incorporated; Title: Required changes to NR using existing DL/UL NR waveform to support operation between 52.6 GHz and 71 GHz; Document for: Discussion/Decision.
R1-2006798; 3GPP TSG RAN WG1 Meeting #102-e; e-Meeting, Aug. 17-Aug. 28, 2020; Agenda item: 8.2.2; Source: Qualcomm Incorporated; Title: Channel access mechanism for NR in 52.6 to 71GHz band; Document for: Discussion and Decision.
R1-2006813; 3GPP TSG-RAN WG1 Meeting #102-e; e-Meeting, Aug. 17-28, 2020; Agenda item: 8.6.3; Source: Qualcomm Incorporated; Title: Coverage Recovery for RedCap Devices; Document for: Discussion/Decision.
R1-2007081; 3GPP TSG-RAN WG1 Meeting #102-e; e-Meeting, Aug. 17-28, 2020; Agenda item: 8.6.3; Source: Qualcomm Incorporated; Title: Coverage Recovery for RedCap Devices; Document for: Discussion/Decision.
R1-2007312; 3GPP TSG RAN WG1 #102-e; e-Meeting, Aug. 17-28, 2020; Agenda item: 8.6.3; Source: Moderator (Qualcomm Inc.); Title: FL summary #3 on Coverage Recovery and Capacity Impact for NR RedCap; Document for: Discussion/decision.
R1-200xxxx; 3GPP TSG RAN WG1 Meeting #102-e; e-meeting, Aug. 17-28, 2020; Agenda item: 8.1.2.1; Source: Qualcomm Incorporated; Title: Discussion Summary for mTRP PDCCH Reliability Enhancements; Document for: Discussion/Decision.
R2-2007577; 3GPP TSG-RAN2 Meeting #111 electronic; Online, Aug. 17-28, 2020; CR-Form-v11.4; Change Request; 38.331 CR 1863; rev; Current version: 16.1.0.
International Search Report of the International Searching Authority, mailed Apr. 13, 2022, in International Application No. PCT/US2021/054656.

(56) References Cited

OTHER PUBLICATIONS

R1-2101838; 3GPP TSG-RAN WG1 Meeting #104-e; e-Meeting, Jan. 25-Feb. 5, 2021; Title: Discussion Summary for mTRP PDCCH Reliability Enhancements; Document for: Discussion/decision.

* cited by examiner

Logical Channels

Transport Channels

Physical Channels

Physical Signals

PCCH BCCH CCCH DCCH DTCH

PCH BCH DL-SCH

DCI

PBCH PDSCH PDCCH

PSS/SSS CSI-RS DM-RS PT-RS

Downlink

CCCH DCCH DTCH

UL-SCH RACH

UCI

PUSCH PUCCH PRACH

DM-RS PT-RS SRS

Uplink

1 Frame (10 ms)

0 1 2 3 4 5 6 7 8 9

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

```
ControlResourceSet ::=                SEQUENCE {
    controlResourceSetId                  ControlResourceSetId,
    frequencyDomainResources              BIT STRING (SIZE (45)),
    duration                              INTEGER (1..maxCoReSetDuration),
    cce-REG-MappingType CHOICE {
        interleaved      SEQUENCE {
            reg-BundleSize     ENUMERATED {n2, n3, n6},
            interleaverSize    ENUMERATED {n2, n3, n6},
            shiftIndex         INTEGER(0..maxNrofPhysicalResourceBlocks-1)     },
        nonInterleaved                       NULL
    },
     precoderGranularity                   ENUMERATED {sameAsREG-
bundle,allContiguousRBs},
     tci-StatesPDCCH-ToAddList             SEQUENCE(SIZE (1..maxNrofTCI-StatesPDCCH))
OF TCI-StateId
     tci-StatesPDCCH-ToReleaseList         SEQUENCE(SIZE (1..maxNrofTCI-StatesPDCCH))
OF TCI-StateId
     tci-PresentInDCI                          ENUMERATED {enabled}
     pdcch-DMRS-ScramblingID                   INTEGER (0..65535)
...,
    [[
    rb-Offset-r16                             INTEGER (0..5)
    tci-PresentInDCI-Format1-2-r16   INTEGER (1..3)
    coresetPoolIndex-r16                      INTEGER (0..1)
    controlResourceSetId-v16xy                  ControlResourceSetId-v16xy]]}
```

FIG. 18

DL/UL
Carrier indicator
UL/ SUL
BWP index
Frequency domain RA
Frequency domain RA
Time domain RA
FH
MCS
NDI
RV
HARQ process #
1st DAI
2nd DAI
TPC
SRI
PMI
Antenna ports
SRS request
CSI request
CBGTI
PTRS
Beta offset
DMRS
UL- SCH
Open loop power
Priorit y
Invalid OS
Scell dormancy

```
SearchSpace ::=                              SEQUENCE {
    searchSpaceId                                SearchSpaceId,
    controlResourceSetId                         ControlResourceSetId
    monitoringSlotPeriodicityAndOffset           CHOICE {
        sl1                                          NULL,
        sl2                                          INTEGER (0..1),
        sl4                                          INTEGER (0..3),
        sl5                                          INTEGER (0..4),
        sl8                                          INTEGER (0..7),
        sl10                                         INTEGER (0..9),
        sl16                                         INTEGER (0..15),
        sl20                                         INTEGER (0..19),
        sl40                                         INTEGER (0..39),
        sl80                                         INTEGER (0..79),
        sl160                                        INTEGER (0..159),
        sl320                                        INTEGER (0..319),
        sl640                                        INTEGER (0..639),
        sl1280                                       INTEGER (0..1279),
        sl2560                                       INTEGER (0..2559)
    }
      duration                                       INTEGER (2..2559)
      monitoringSymbolsWithinSlot                    BIT STRING (SIZE (14))
      timeRepetitionLocation-r16                 BIT STRING (SIZE (X))

        }
    }
}
```

HYBRID AUTOMATIC REPEAT REQUEST FEEDBACK WITH CONTROL CHANNEL REPETITION

CROSS-REFERENCE TO RELATED APPLICATIONS

This application is a continuation of International Application No. PCT/US2021/054656, filed Oct. 13, 2021 which claims the benefit of U.S. Provisional Application No. 63/091,773, filed Oct. 14, 2020, all of which are hereby incorporated by reference in their entireties.

BRIEF DESCRIPTION OF THE DRAWINGS

Examples of several of the various embodiments of the present disclosure are described herein with reference to the drawings.

FIG. 18 illustrates configuration parameters of a coreset as per an aspect of an embodiment of the present disclosure.

FIG. 25 illustrates example parameters of a search space to configure one or more monitoring occasions within a monitoring periodicity as per an aspect of an embodiment of the present disclosure.

DETAILED DESCRIPTION

Figure 1A:
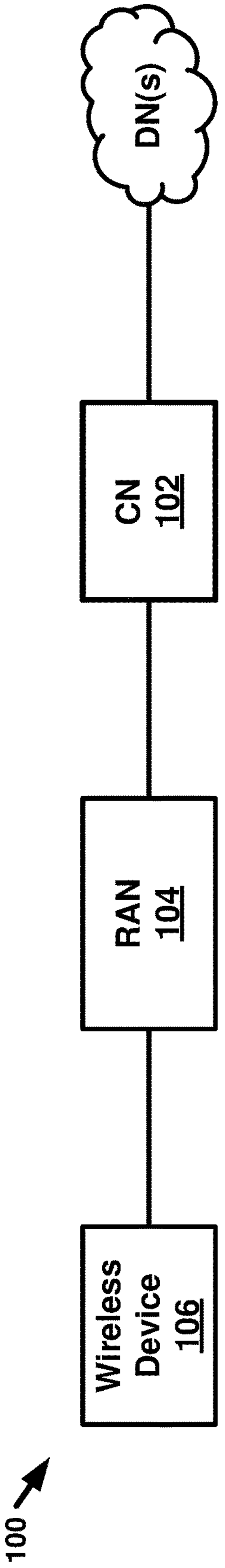
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
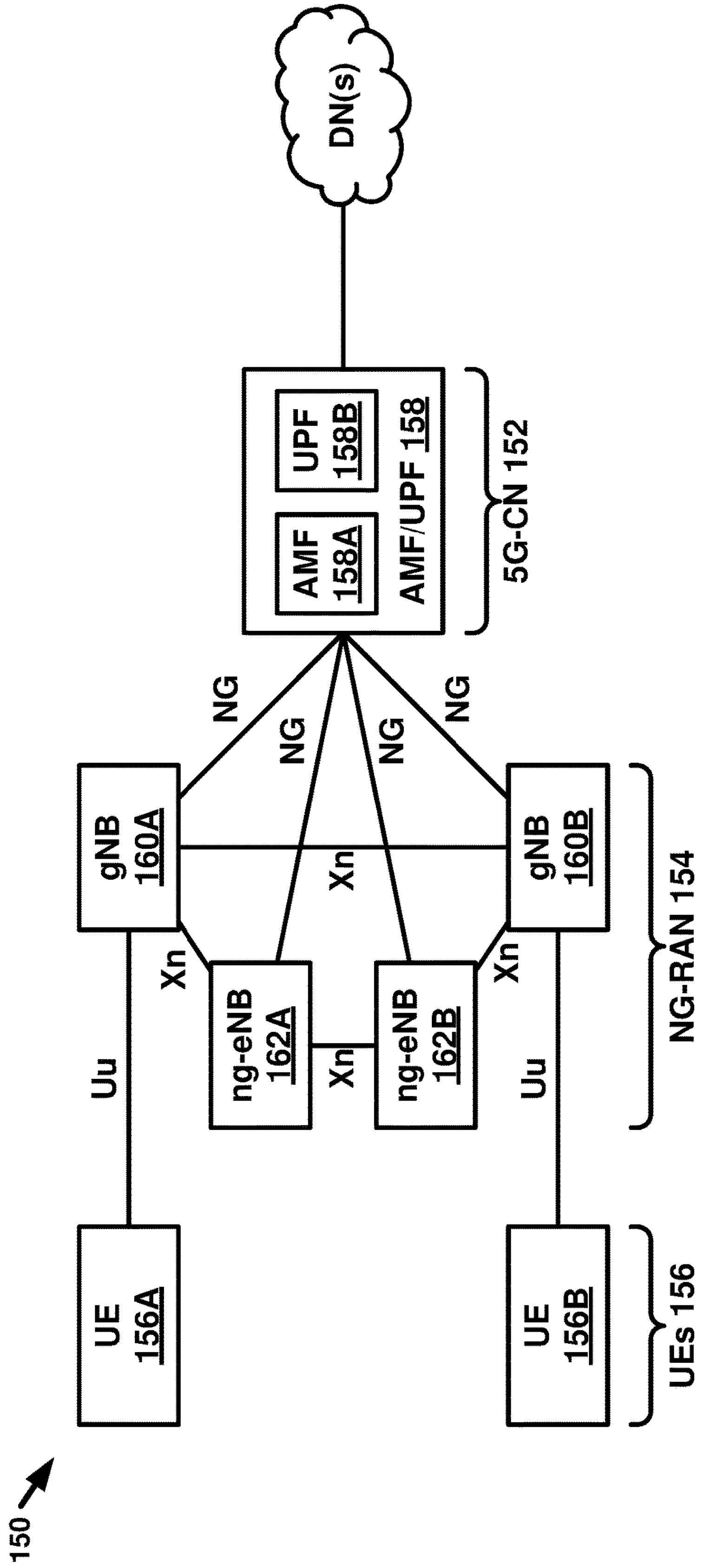

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNB s, illustrated as gNB 160A and gNB 160B (collectively gNBs 160) and/or one or more ng-eNB s, illustrated as ng-eNB 162A and ng-eNB 162B (collectively ng-eNB s 162). The gNBs 160 and ng-eNBs 162 may be more generically referred to as base stations. The gNBs 160 and ng-eNB s 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNB s 160 and/or the ng-eNB s 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
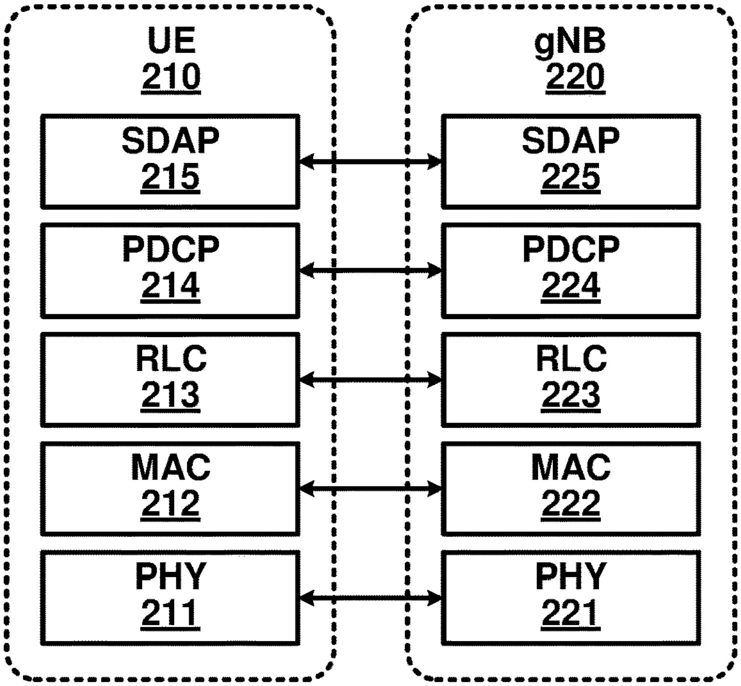
FIG. 2A and FIG. 2B respectively illustrate a New Radio (NR) user plane and control plane protocol stack.
Figure 2B:
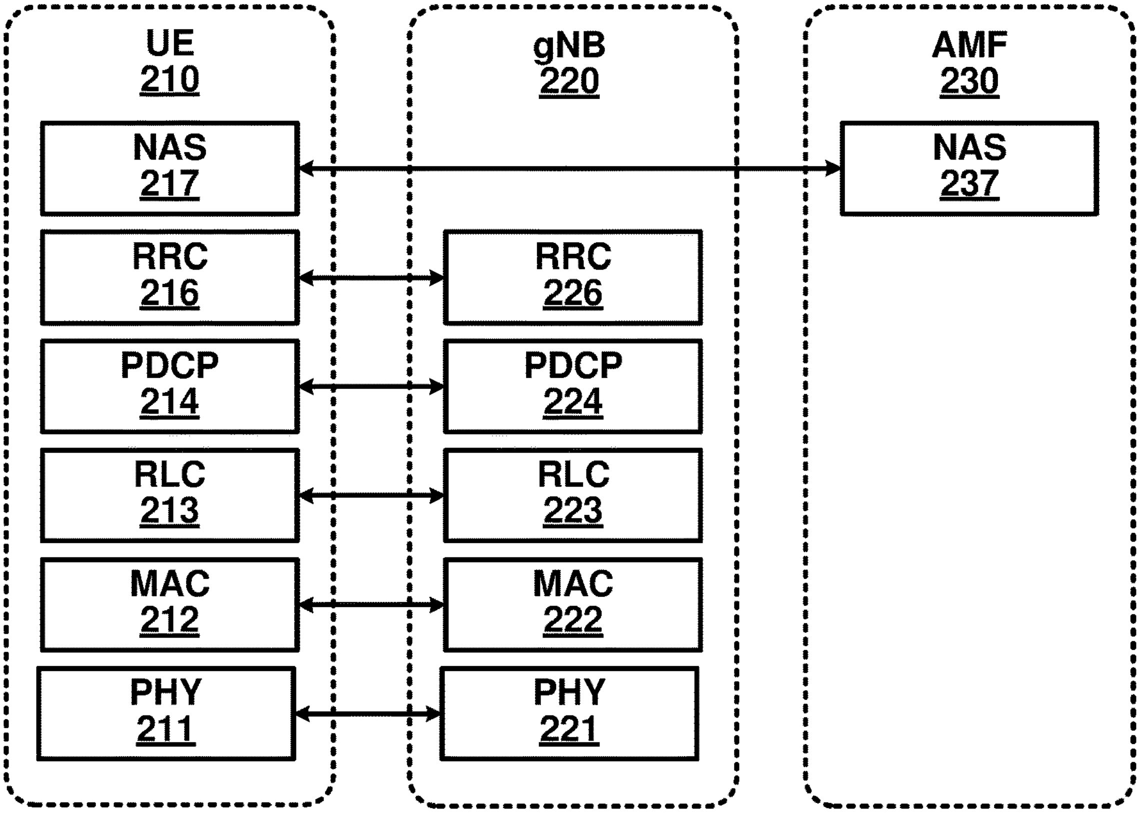

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
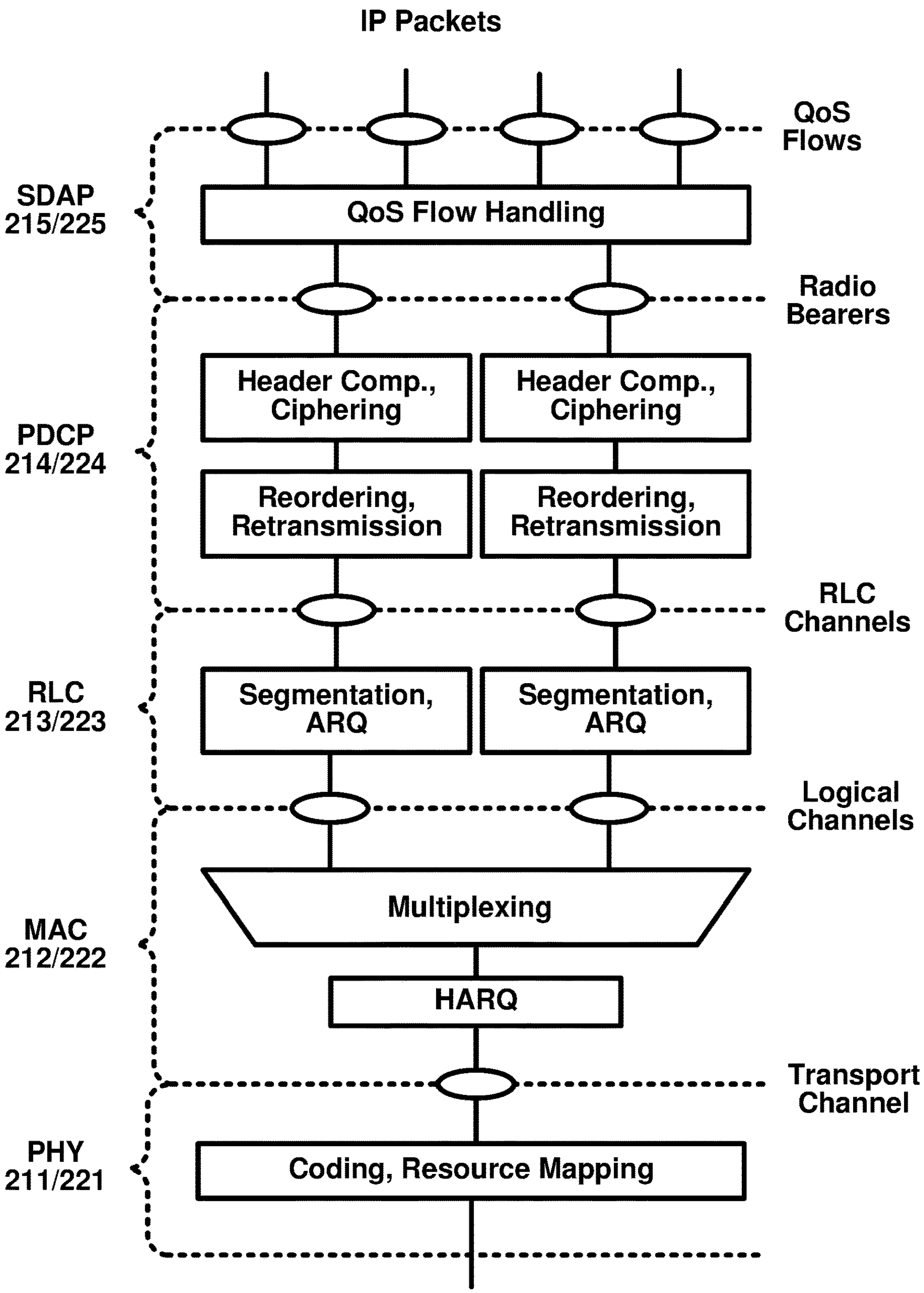
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
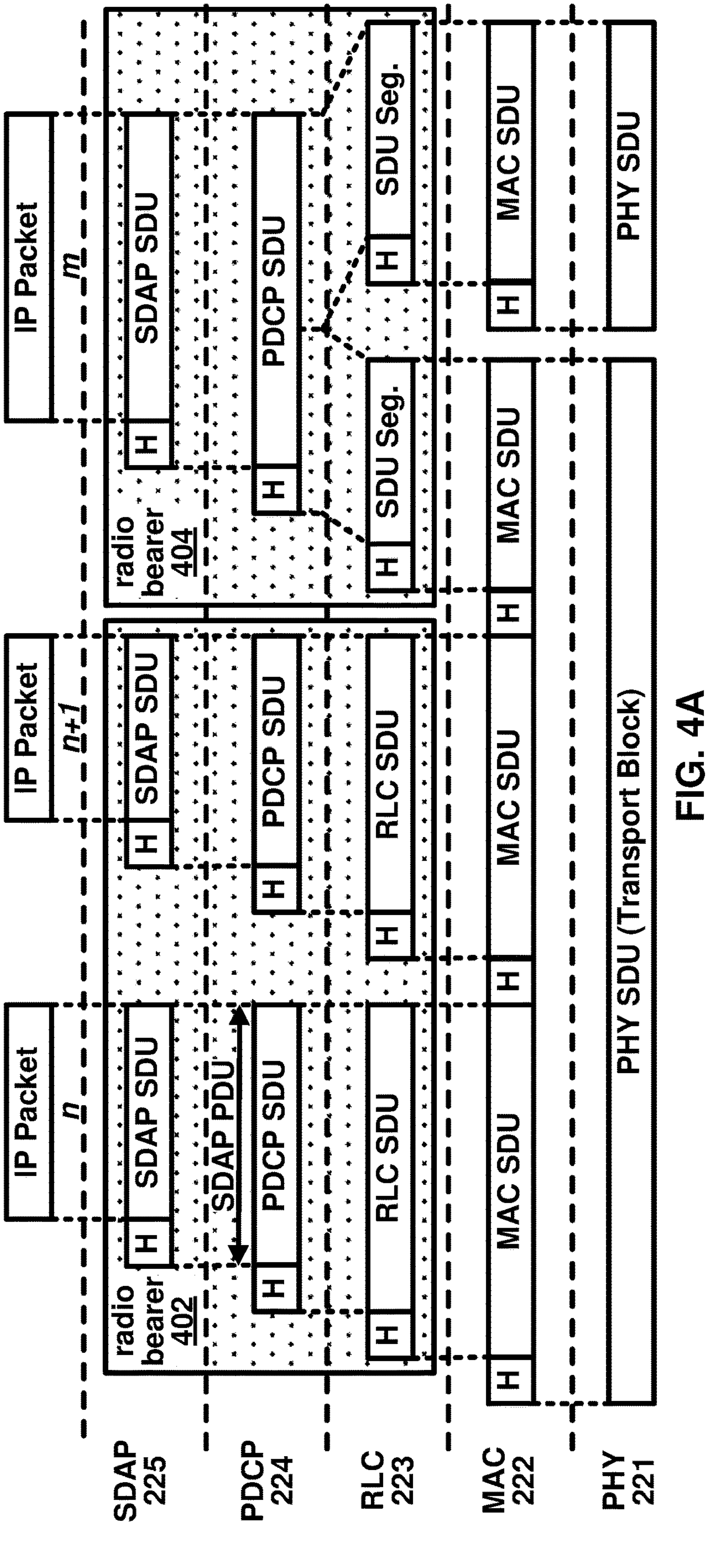
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TB s at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
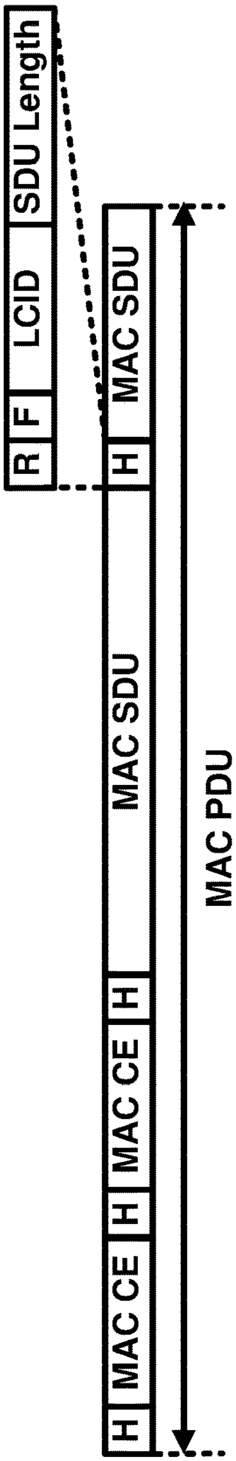
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
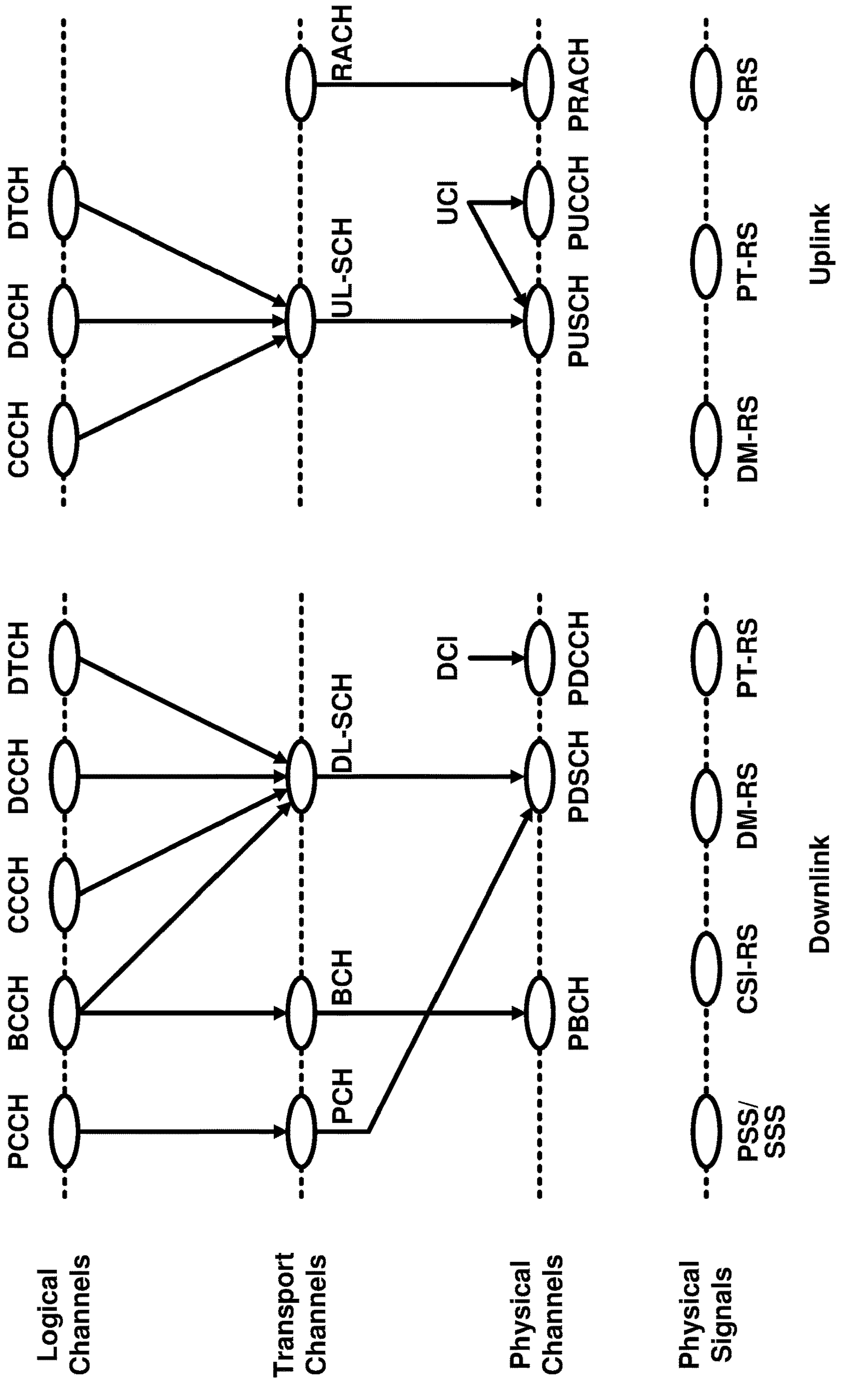
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
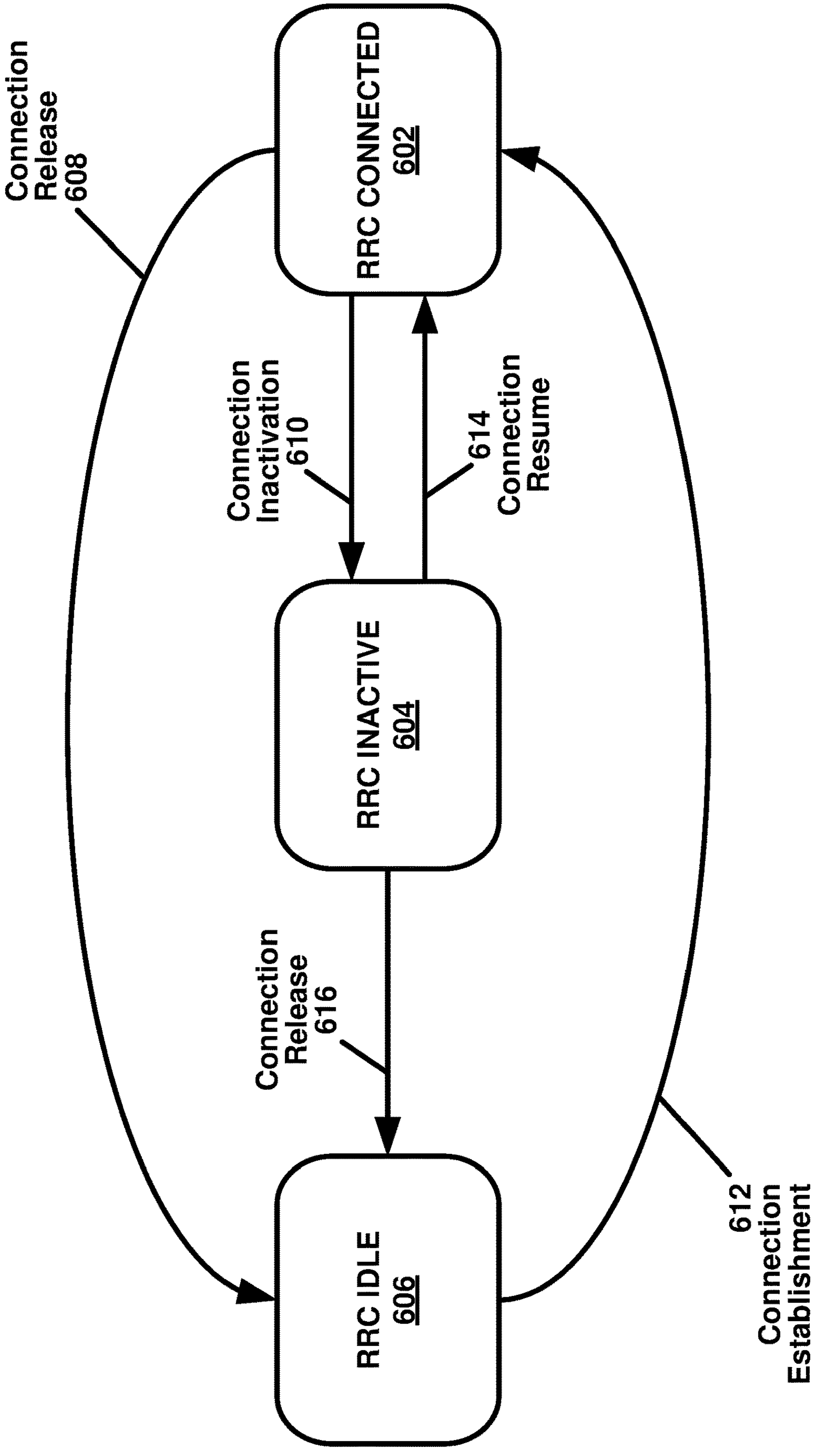
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
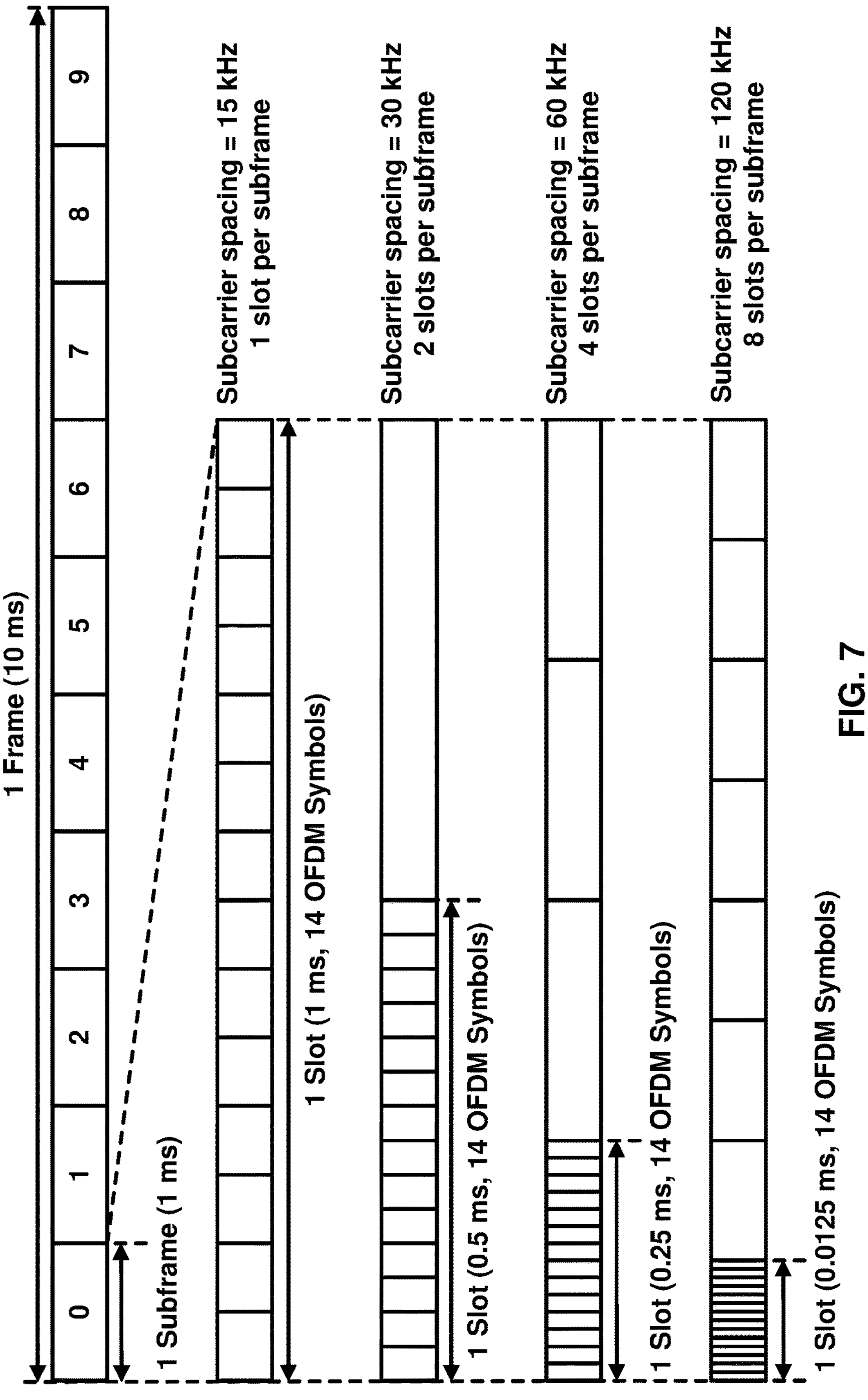
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
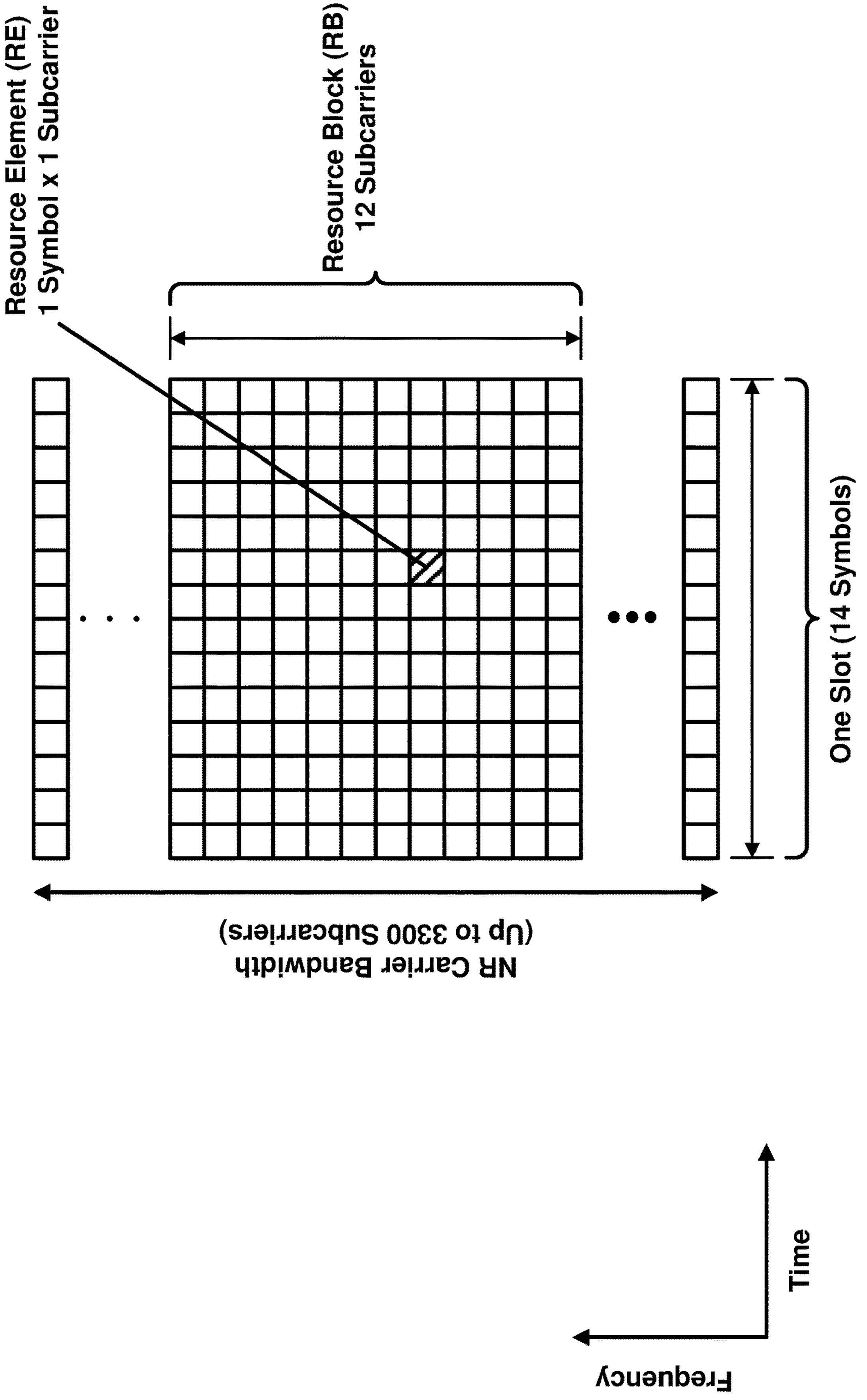
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
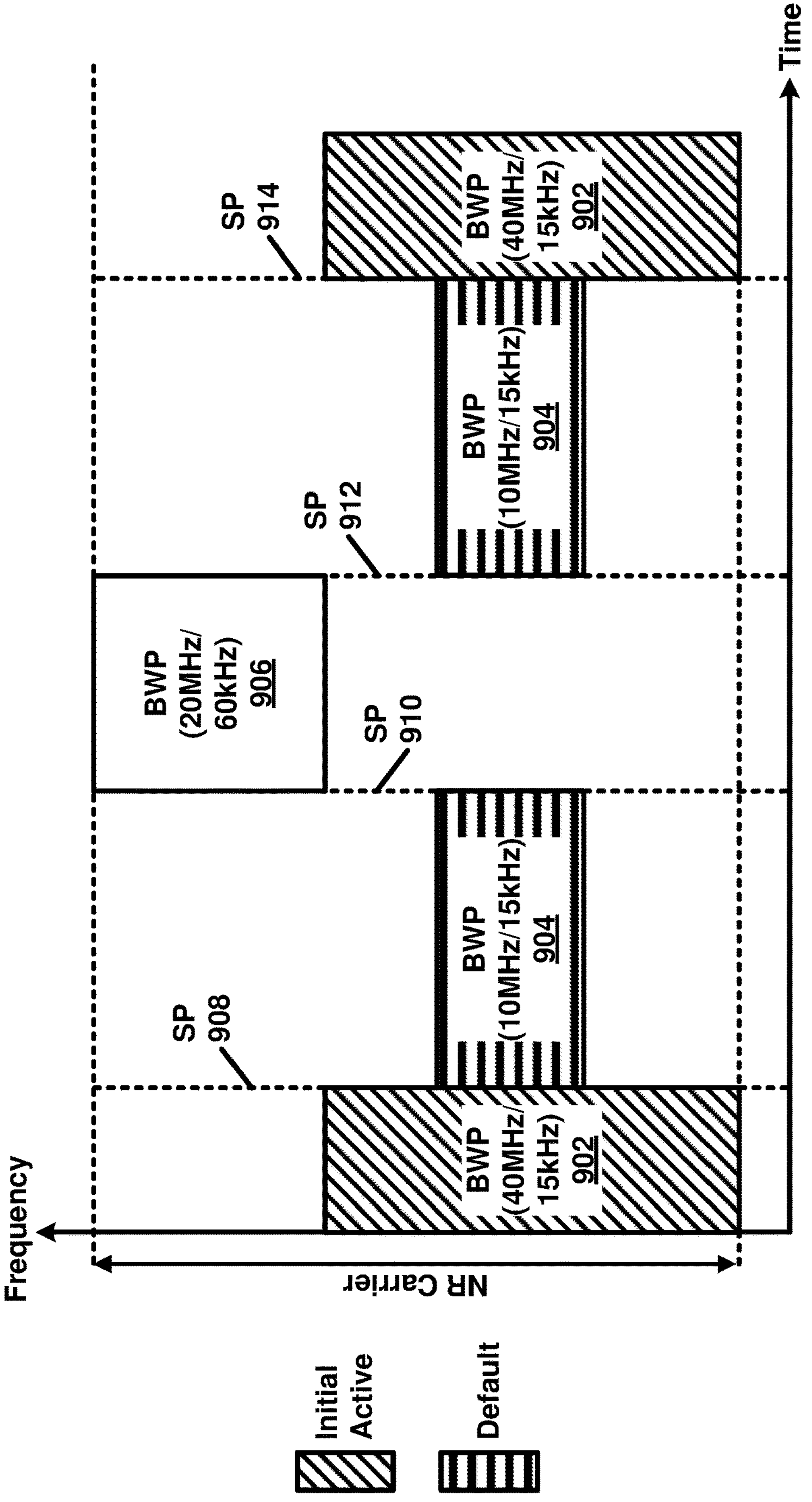
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
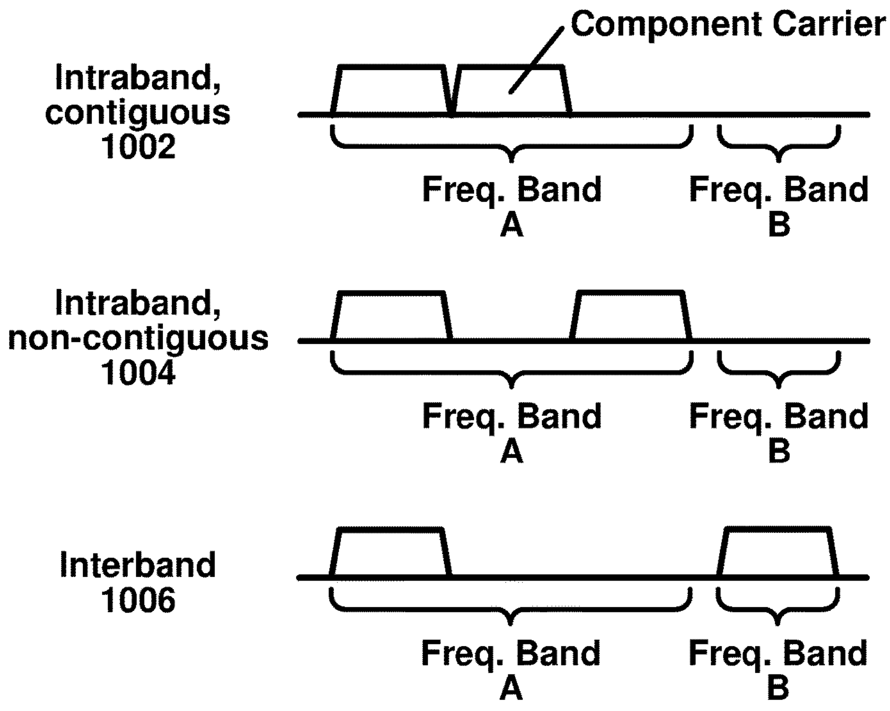
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
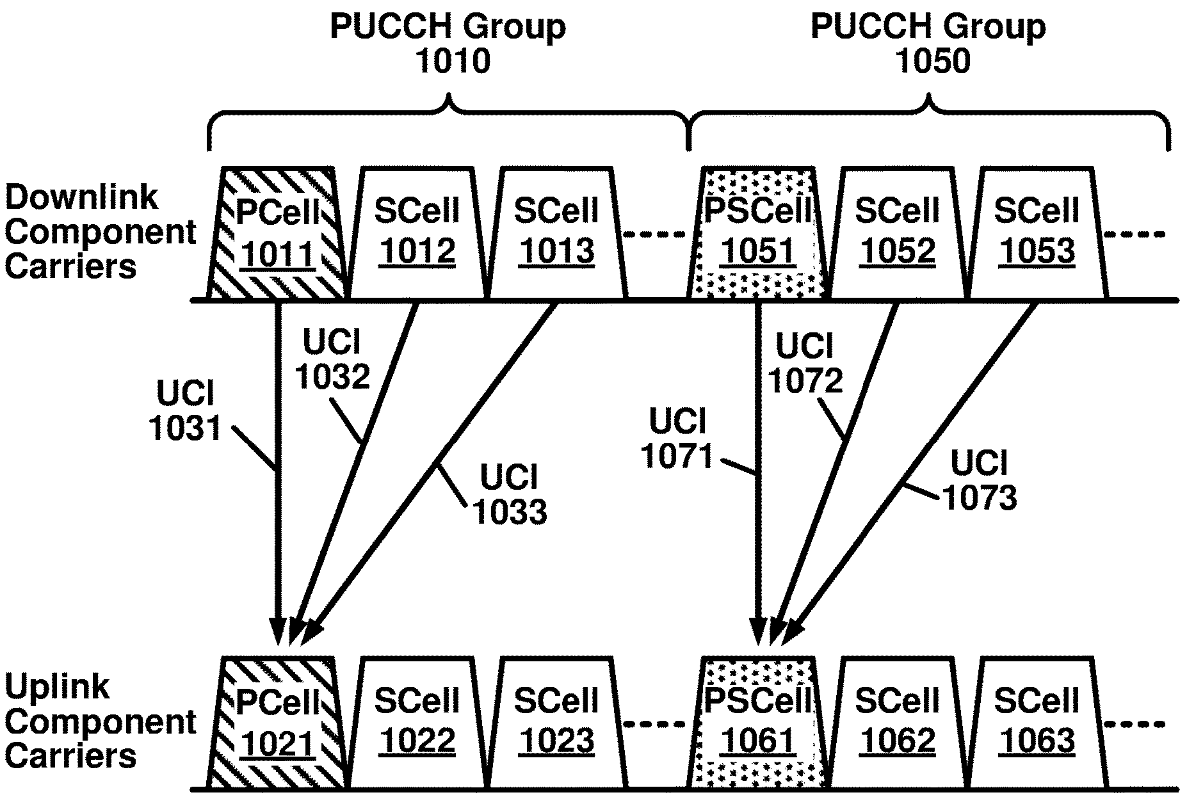
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
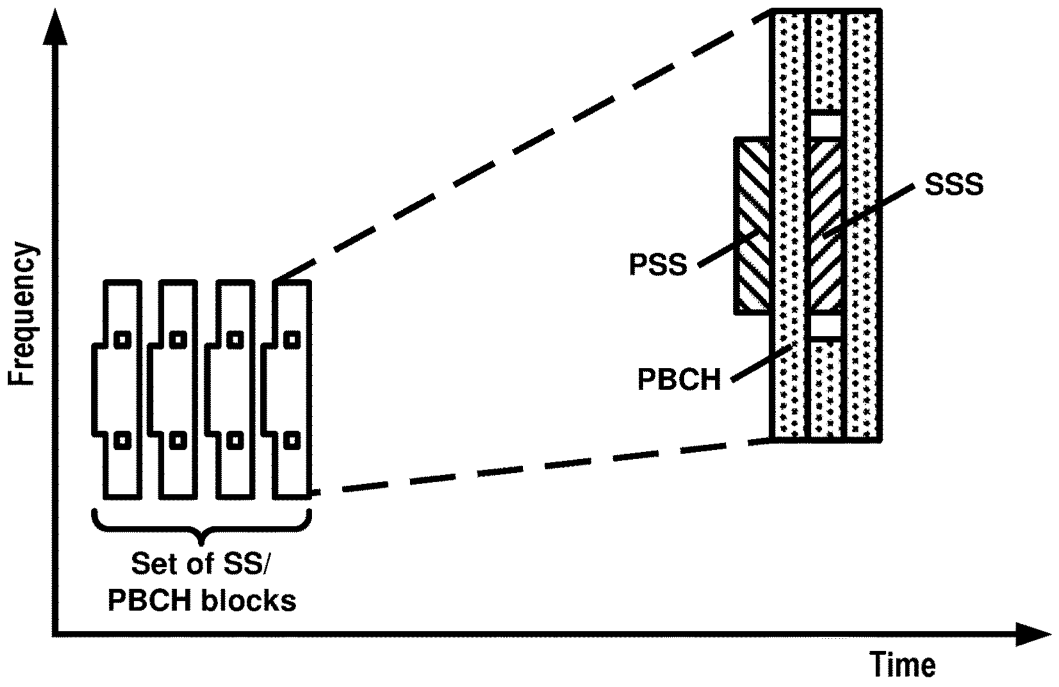
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
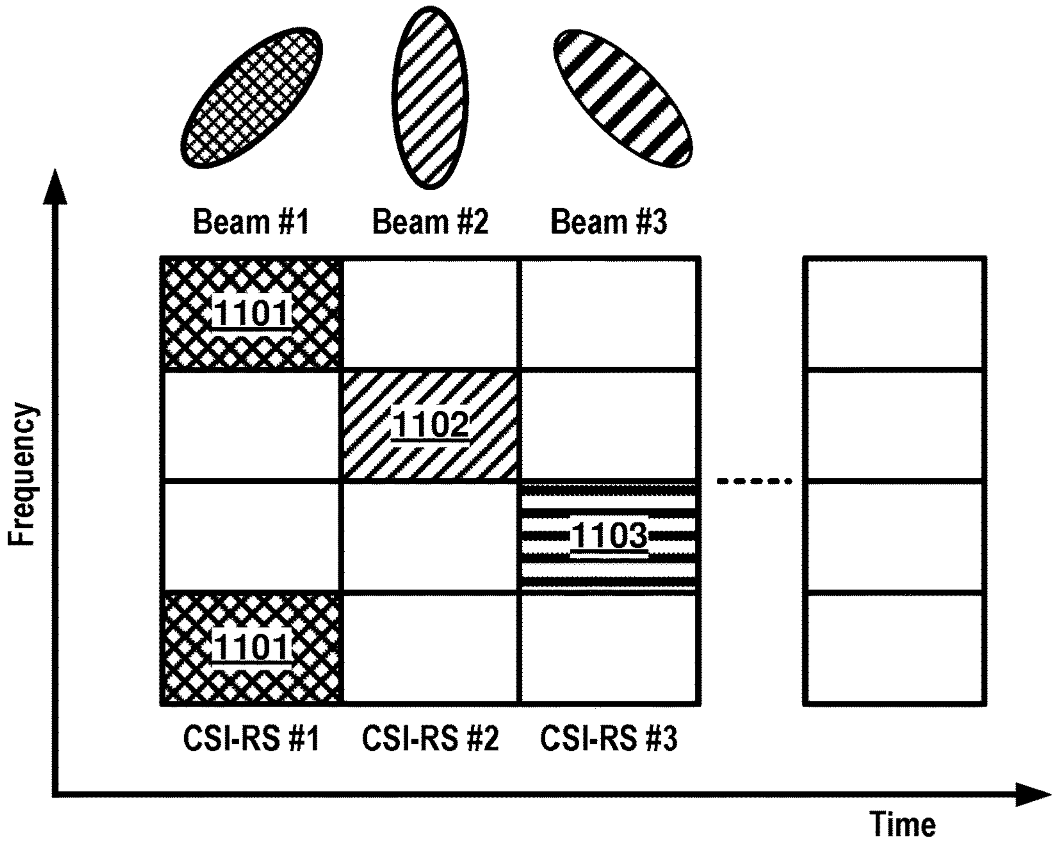
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
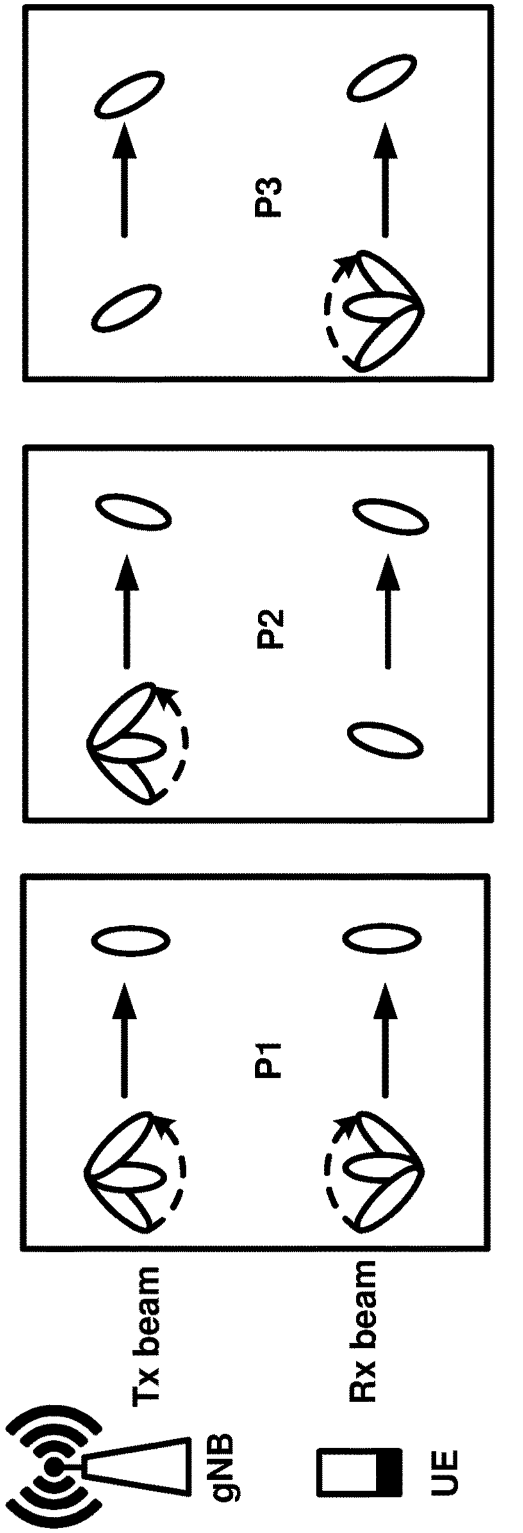
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
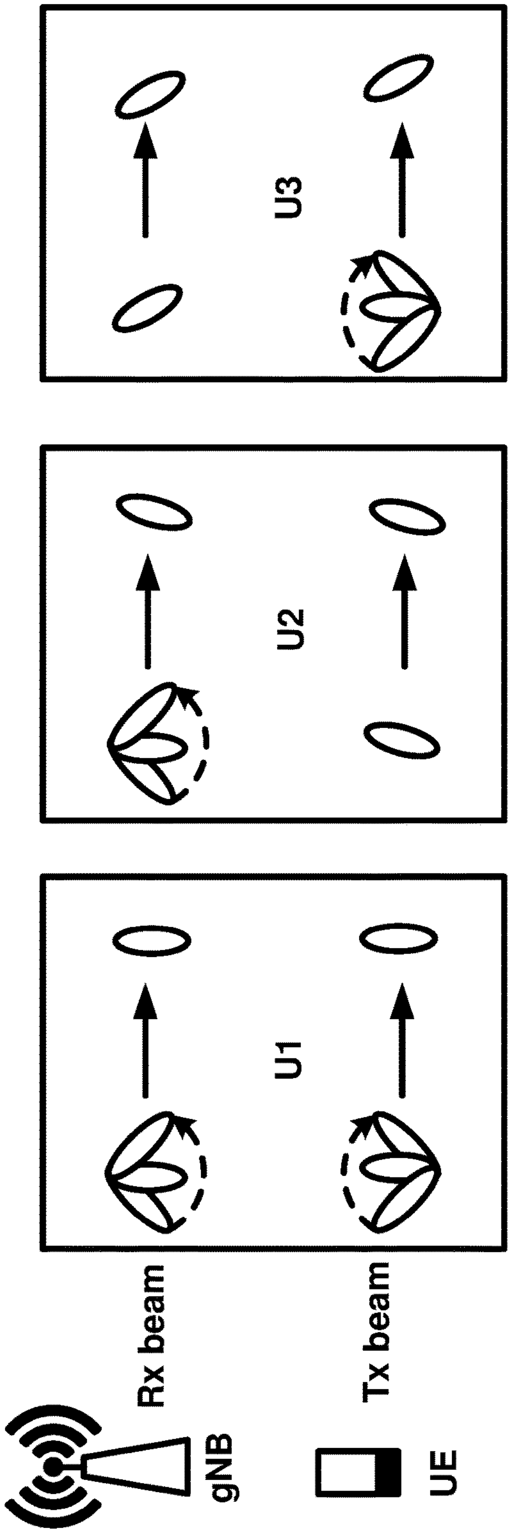

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
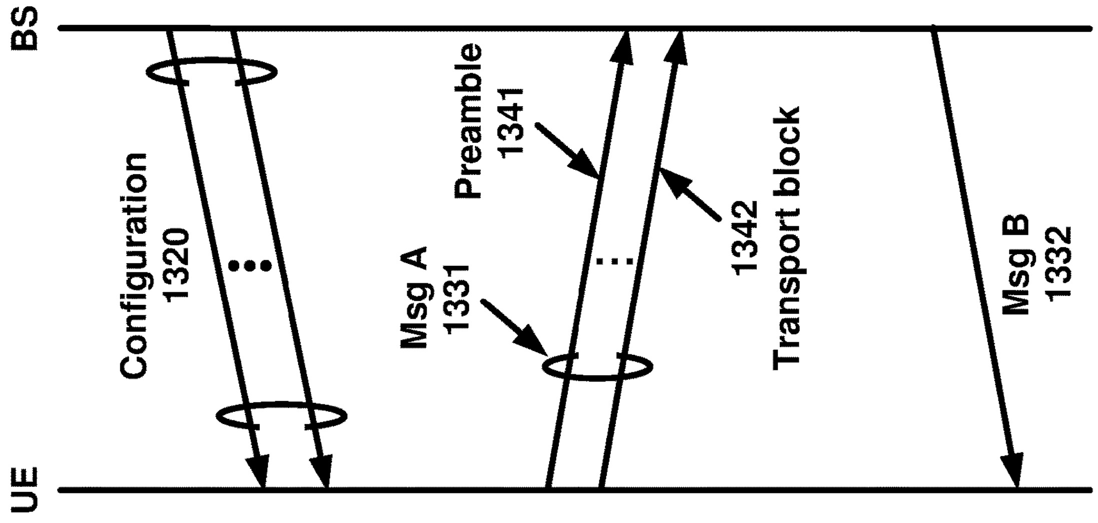
FIG. 13A, FIG. 13B, and FIG. 13C respectively illustrate a four-step contention-based random access procedure, a two-step contention-free random access procedure, and another two-step random access procedure.
Figure 13B:
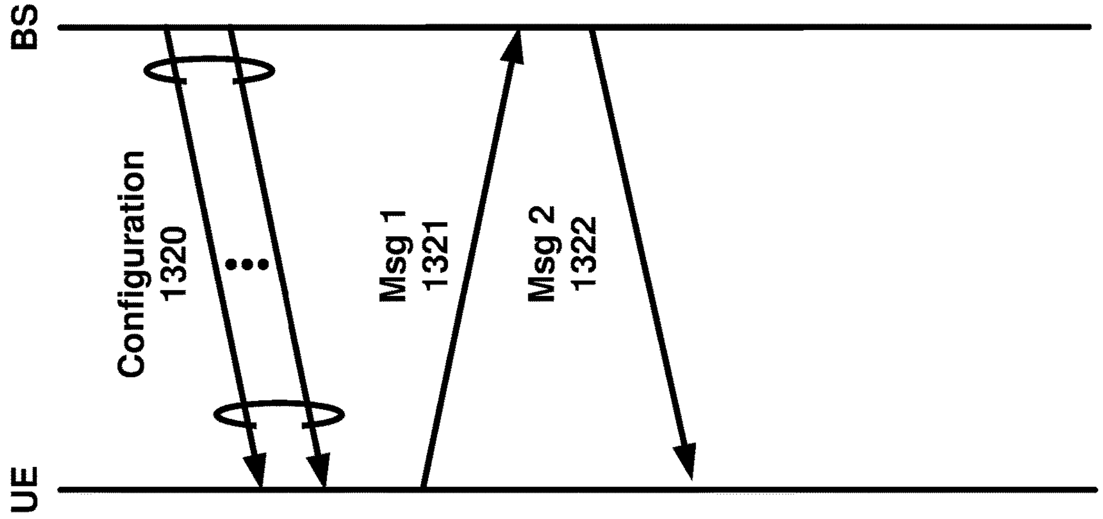
Figure 13A:
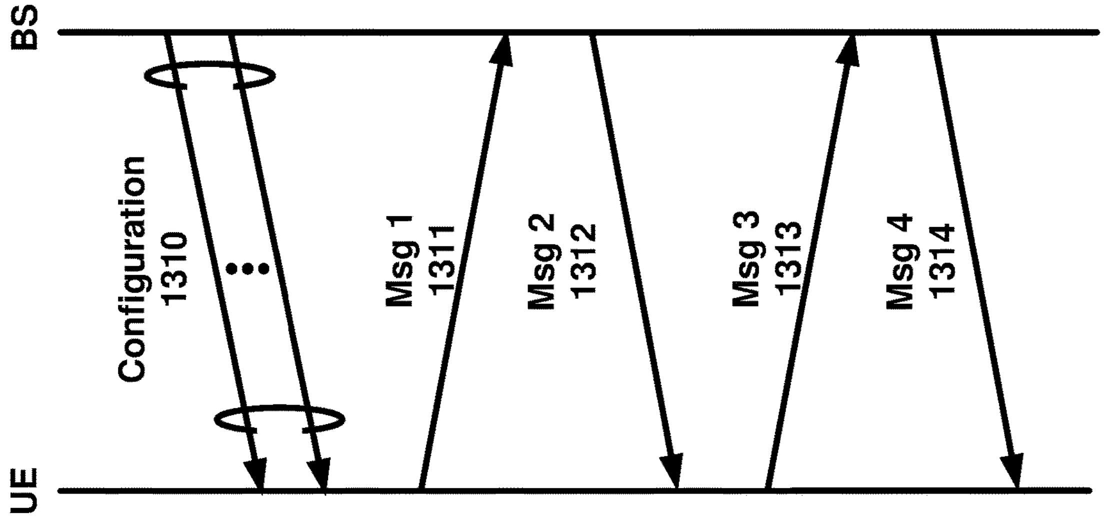

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI}=1+s\_id+14\times t\_id+14\times 80\times f\_id+14\times 80\times 8\times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as “FFFE” in hexadecimal. A DCI having CRC parity bits scrambled with a system information RNTI (SI-RNTI) may indicate a broadcast transmission of the system information. The SI-RNTI may be predefined as “FFFF” in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
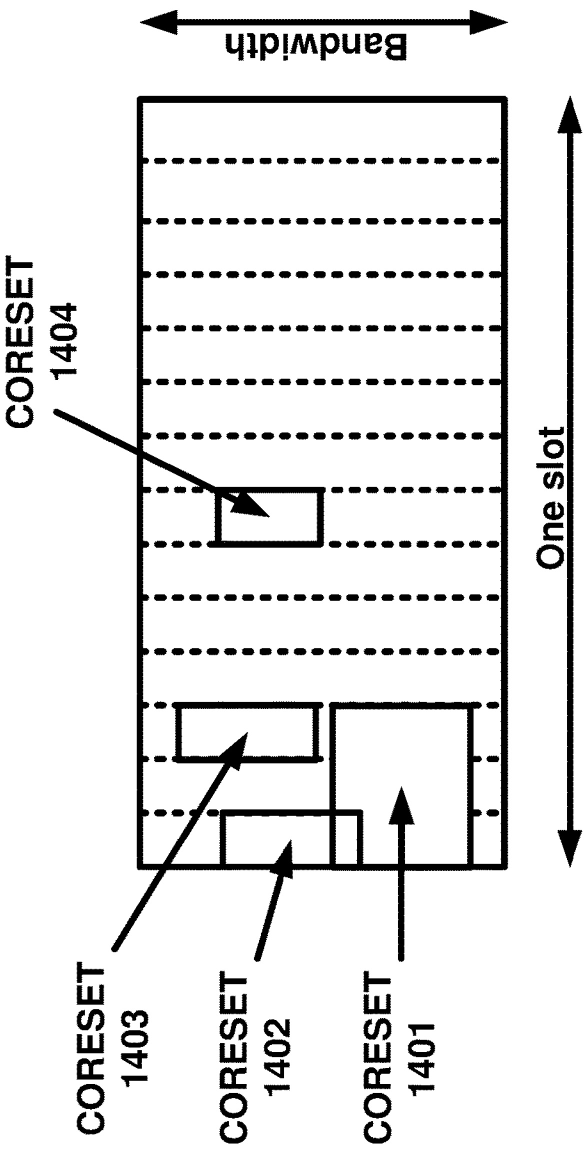
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
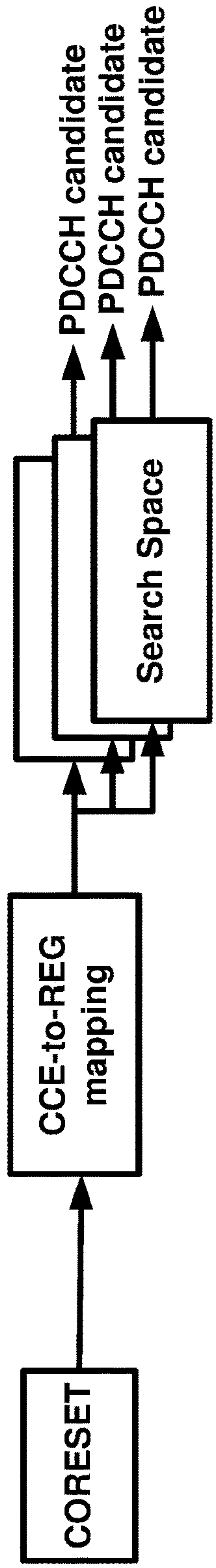
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to “3”.

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
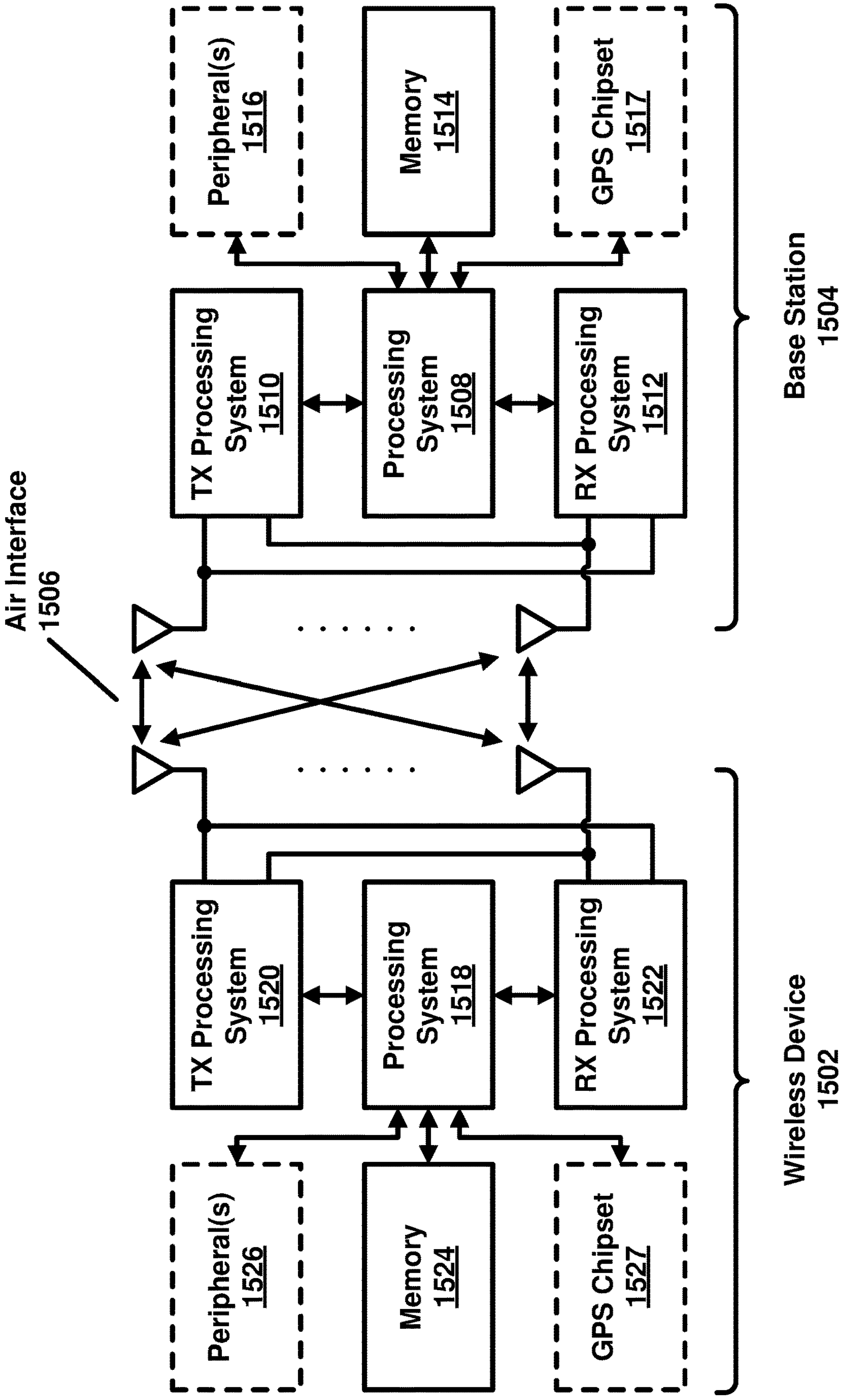
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
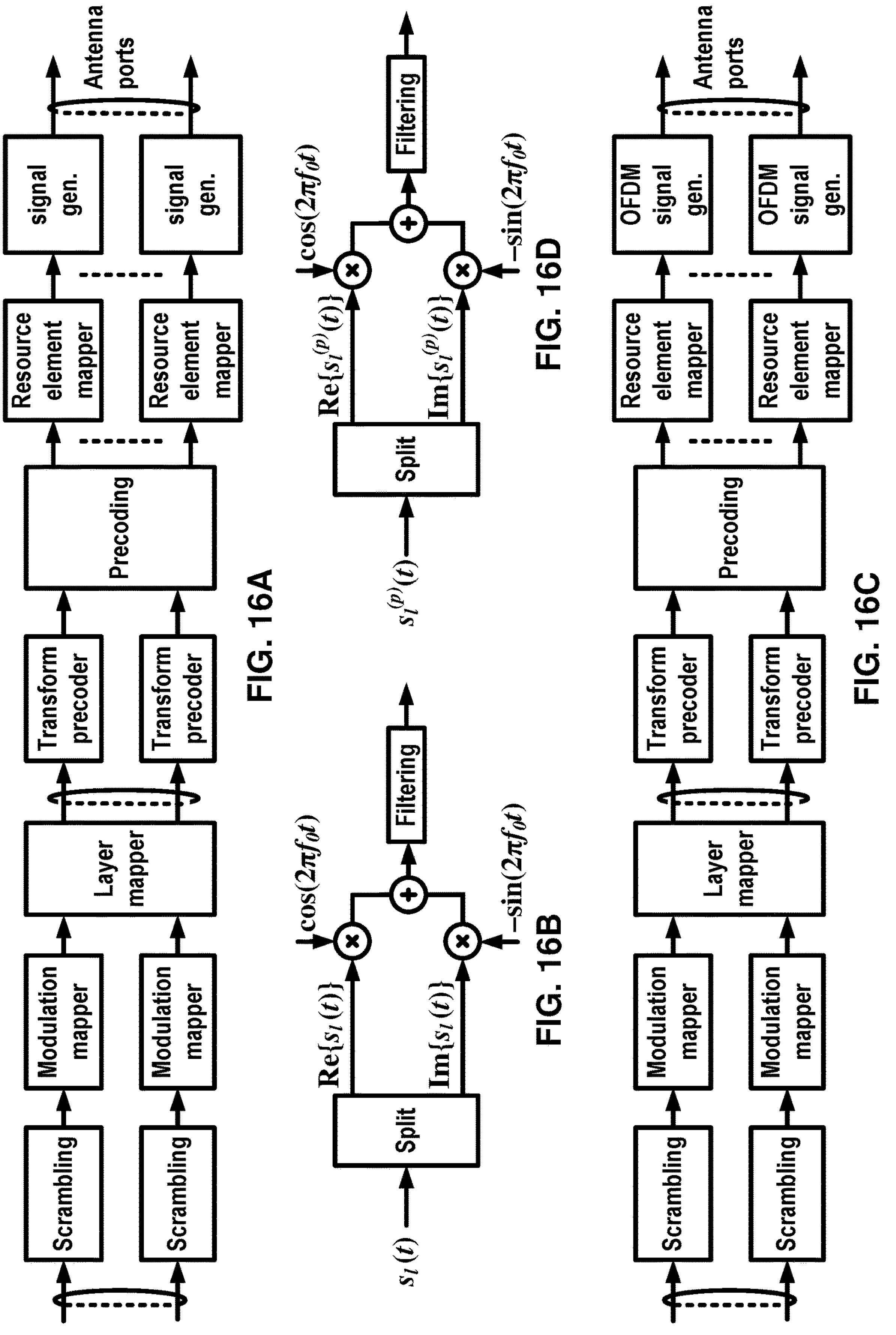
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

//Background—SS/Coreset Configuration

Figure 17:
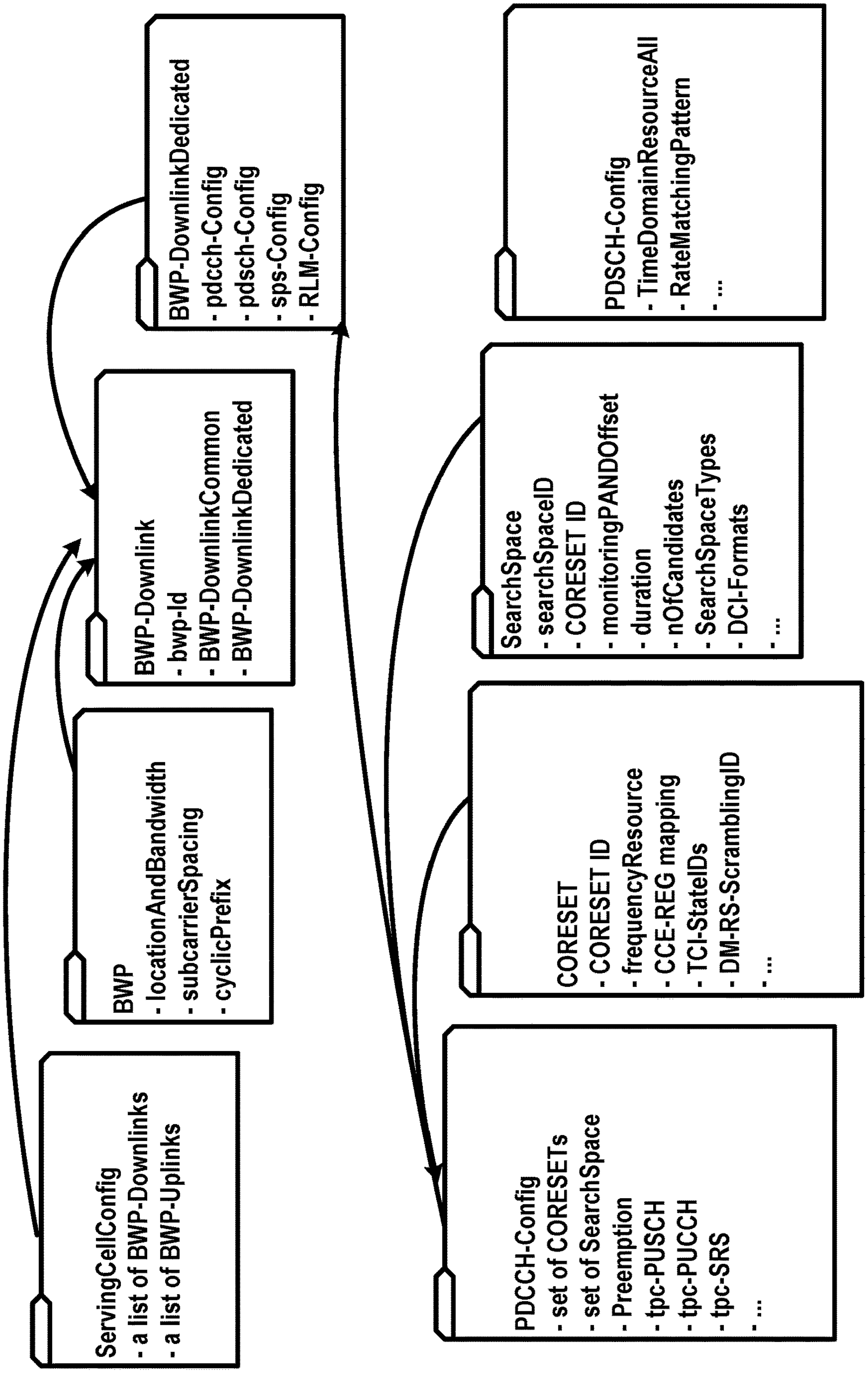
FIG. 17 illustrates example configuration parameters for a wireless device to receive control and/or data from a base station as per an aspect of an embodiment of the present disclosure.

FIG. 17 illustrates example configuration parameters for a wireless device to receive control and/or data from a base station. A wireless device may receive one or more radio resource control (RRC) messages comprising configuration parameters of a cell. The configuration parameters may comprise one or more parameters of a serving cell configuration (e.g., ServingCellConfig). The one or more parameters of the serving cell configuration may comprise one or more downlink bandwidth parts (e.g., a list of BWP-Downlinks). The one or more parameters of the serving cell configuration may comprise one or more uplink bandwidth parts (e.g., a list of BWP-Uplinks). A downlink bandwidth part (e.g., BWP-Downlink) and/or an uplink bandwidth part (e.g., BWP-Uplink) may comprise a bandwidth part index (e.g., bwp-Id), configuration parameters of a cell-common downlink bandwidth part (e.g., BWP-DownlinkCommon), and/or a UE-specific downlink bandwidth part (e.g., BWP-DownlinkDedicated). For example, the bandwidth part index (bwp-Id) may indicate a bandwidth part configuration. For example, an index of the bandwidth part is the bandwidth part index. The bandwidth part configuration may comprise a location and bandwidth information (locationAndBandwidth). The locationAndBandwidth may indicate a starting resource block (RB) of the bandwidth part and a bandwidth of the bandwidth part, based on a reference point (e.g., a pointA of a carrier/cell for the bandwidth part). The bandwidth part configuration may comprise a subcarrier spacing (e.g., subcarrierSpacing) and a cyclic prefix (e.g., cyclicPrefix). For example, the subcarrier spacing may be one of 15 kHz, 30 kHz, 60 kHz, 120 kHz, 240 kHz, 480 kHz, and 960 kHz. For example, the cyclic prefix may be one of a normal cyclic prefix and an extended cyclic prefix.

Configuration parameters of the cell-specific downlink bandwidth (e.g., BWP-DownlinkCommon) may indicate/comprise genericParameters, pdcch-ConfigCommon, and/or pdsch-ConfigCommon. For example, pdcch-ConfigCommon may comprise cell-specific parameters for receiving downlink control information (DCIs) via the cell-specific downlink bandwidth part (e.g., an initial BWP). For example, pdsch-ConfigCommon may comprise cell-specific parameters for receiving PDSCHs of transport blocks (TBs) via the cell-specific downlink bandwidth part. Configuration parameters of the UE-specific downlink bandwidth part (e.g., BWP-DownlinkDedicated) may comprise pdcch-Config, pdsch-Config, sps-Config, and/or radioLinkMonitoring-Config (e.g., RLM-Config). The configuration parameters may comprise sps-ConfigList and/or beamFailureRecovery-SCellConfig. For example, beamFailureRecoverySCellConfig may comprise reference signal parameters for beam failure recovery for secondary cells. For example, pdcch-Config may comprise parameters for receiving DCIs for the UE-specific downlink bandwidth part. For example, pdsch-Config may comprise parameters for receiving PDSCHs of TBs for the UE-specific downlink bandwidth part. For example, sps-Config may comprise parameters for receiving semi-persistent scheduling PDSCHs. The base station may configure a SPS for a BWP or a list of SPS for the BWP. For example, radioLinkMonitoringConfig may comprise parameters for radio link monitoring.

Configuration parameters of pdcch-Config may indicate/comprise at least one of a set of coresets, a set of search spaces, a downlink preemption (e.g., downlinkPreemption), a transmission power control (TPC) for PUSCH (e.g. tpc-PUSCH), a TPC for PUCCH and/or a TPC for SRS. The configuration parameters may comprise a list of search space switching groups (e.g., searchsSpaceSwitchingGroup), a search space switching timer (e.g., searchSpaceSwitchingTimer), an uplink cancellation, and/or a monitoring capability configuration (e.g., monitoringCapabilityConfig). The base station may configure the list of search space switching groups, where the wireless device may switch from a first search space group to a second search space group based on the search space switching timer or a rule, an indication, or an event. The base station may configure up to K (e.g., K=3) coresets for a BWP of a cell. The downlink preemption may indicate whether to monitor for a downlink preemption indication for the cell. The monitoring capability config may indicate whether a monitoring capability of the wireless device would be configured for the cell, where the capability is based on a basic capability or an advanced capability. The base station may configure up to M (e.g., M=10) search spaces for the BWP of the cell. The tpc-PUCCH, tpc-PUSCH, or tpc-SRS may enable and/or configure reception of TPC commands for PUCCH, PUSCH or SRS respectively. The uplink cancellation may indicate to monitor uplink cancellation for the cell.

Configuration parameters of pdcch-ConfigCommon may comprise a control resource set zero (e.g., controlResourceSetZero), a common control resource set (e.g., commonControlResourceSet), a search space zero (e.g., searchSpaceZero), a list of common search space (e.g., commonSearchSpaceList), a search space for SIB1 (e.g., searchSpaceSIB1), a search space for other SIBs (e.g., searchSpaceOtherSystemInformation), a search space for paging (e.g., pagingSearchSpace), a search space for random access (e.g., ra-SearchSpace), and/or a first PDCCH monitoring occasion. The control resource set zero may comprise parameters for a first coreset with an index value zero. The coreset zero may be configured for an initial bandwidth part of the cell. The wireless device may use the control resource set zero in a BWP of the cell, wherein the BWP is not the initial BWP of the cell based on one or more conditions. For example, a numerology of the BWP may be same as the numerology of the initial BWP. For example, the BWP may comprise the initial BWP. For example, the BWP may comprise the control resource set zero. The common control resource set may be an additional common coreset that may be used for a common search space (CSS) or a UE-specific search space (USS). The base station may configure a bandwidth of the common control resource set where the bandwidth is smaller than or equal to a bandwidth of the control resource set zero. The base station may configure the common control resource set such that it is contained within the control resource set zero (e.g., CORESET #0). The list of common search space may comprise one or more CSSs. The list of common search space may not comprise a search space with index zero (e.g., SS #0). The first PDCCH monitoring occasion may indicate monitoring occasion for paging occasion. The base station may configure a search space for monitoring DCIs for paging (e.g., pagingSearchSpace), for RAR monitoring (e.g., ra-SearchSpace), for SIB1 (e.g., searchSpaceSIB1) and/or for other SIBs than SIB1 (e.g., searchSpaceOtherSystemInformation). The search space with index zero (e.g., searchSpaceZero, SS #0) may be configured for the initial BWP of the cell. Similar to the coreset/CORESET #0, the SS #0 may be used in the BWP of the cell based on the one or more conditions.

FIG. 18 illustrates configuration parameters of a coreset. A ControlResourceSet (coreset) may comprise a coreset index (e.g., ControlResourceSetId), frequency domain resources (e.g., frequencyDomainResources), a duration of the coreset (e.g., a number of OFDM symbols between [1, maxCoReSetDuration], where maxCoReSetDuration=3) and a control channel element (CCE) to resource element group (REG) mapping type (e.g., between interleaved and nonInterleaved). When the CCE-REG mapping type is configured as interleaved, the base station may also configure a bundle size of REG (e.g., reg-BundleSize) and an interleaver size (e.g., interleaverSize). The coreset may also comprise a precoder granularity (e.g., between same as REG bundle (e.g., sameAsREG-bundle) and across all contiguous RBs (e.g., allContiguousRBs)). For example, when the precoder granularity is configured as 'same as REG bundle', the wireless device may assume that a same precoder is used across REGs in a bundle. For example, when the precoder granularity is configured as 'across all contiguous RBs', the wireless device may assume that a same precoder is used across RBs in contiguous RBs of the coreset. The coreset may comprise a list of TCI states, wherein the coreset is not a coreset #0. The coreset may comprise a parameter of a TCI presence in DCI. The wireless device may expect a DCI format comprises a TCI indication in a DCI based on the DCI format scheduled via a search space associated with the coreset if the coreset is configured with the TCI presence in DCI. For example, the DCI format may be a DCI format 1_1 and/or a DCI format 0_1. The coreset may optionally comprise one or more of a DMRS scrambling identity, a coreset pool index, an enhanced coreset index (e.g., ControlResourceSetId-v16xy), a TCI present in DCI for a DCI format 1_2, and an RB offset. For example, when the enhanced coreset index is present in the coreset configuration, the wireless device may ignore the coreset index. The enhanced coreset index may indicate a value between [0, . . . , 15] whereas the coreset index may indicate a value between [0, . . . , 11].

A coreset may be associated with a search space. For example, the wireless device may determine search space candidates and/or monitoring occasions of the search space based on configuration of the associated search space and the coreset. A search space is associated with a coreset. For example, the wireless device may determine search space candidates and/or monitoring occasions of the search space based on configuration of the search space and the associated coreset. Parameters of the search space may comprise an index of the coreset when the search space is associated with the coreset or the coreset is associated with the search space.

A search space may comprise an index of the search space (e.g., searchSpaceId), an index for associated coreset (e.g., controlResourceSetId), a monitoring periodicity and offset (e.g., periodicity in terms of a number of slots and an offset in terms of a number of slots, between [1, 2560] slots for periodicity, an offset between [0, . . . , P−1] where the P is the periodicity). The search space may comprise a duration, wherein the wireless device may monitor the search space in a consecutive slots starting from the monitoring occasion based on the duration. The base station may not configure the duration for a search space scheduling a DCI format 2_0. A maximum duration value may be the periodicity −1 (e.g., repeated in each slot within an interval/periodicity). The search space may comprise a monitoring symbols within a slot (e.g., a bitmap of size of OFDM symbols in a slot (e.g., 12 for extended cyclic prefix (CP), 14 for normal CP)). The search space may comprise a set of a number of candidates of each aggregation level (e.g., a first candidate number for an aggregation level L=1, a second candidate number of an aggregation level L=2, and so on). The search space may comprise a search space type (e.g., between CSS and USS). Each CSS or USS may comprise one or more DCI formats monitored in the search space. For example, for CSS, one or more of a DCI format 0_0/1_0, a DCI format 2_0, a DCI format 2_1, a DCI format 2_2 and a DCI format 2_3 may be configured. For USS, the base station may configure a list of search space group index (if configured). For USS, the base station may configure a frequency monitoring occasion/location for a wideband operation of unlicensed spectrum or licensed spectrum. In the specification, DCI format 0_0/1_0 may be interchangeably used with DCI format 0-0/1-0 or fallback DCI format. DCI format 0_1/1_1 may be interchangeably used with DCI format 0-1/1-1 or non-fallback DCI format. DCI format 0_2/1_2 may be interchangeably used with DCI format 0-2/1-2 or non-fallback DCI format.

Configuration parameters of the pdsch-Config may comprise parameters for receiving transport blocks. For example, the configuration parameters may comprise a data scrambling identify for PDSCH, a DM-RS mapping type (e.g., between mapping type A and mapping type B), a list of transmission configuration indicator (TCI) states, a parameter of (virtual RB) VRB-to-(physical RB) PRB interleaver, resource allocation type (e.g., resource allocation type 0, resource allocation type 1 or a dynamic switch between two), a list of time domain allocation, a aggregation factor, a list of rate matching patterns, a RBG (resource block group) size, a MCS table (e.g., between QAM 256 and a QAM64LowSE, between high MCSs or low MCSs), a maximum codeword (e.g., between 1 or 2), parameter(s) related to a PRB bundling, maximum MIMO layer, a minimum scheduling offset related to a power saving technique, and/or one or more parameters related to a DCI format 1_2 (e.g., a compact DCI or small sized DCI format).

In an example, the base station may configure a coreset with a plurality of TCI states. The base station may indicate a TCI of the plurality of TCI states for the coreset as an active TCI state via a MAC CE command or a DCI command. For example, a MAC CE may comprise a serving cell index, a coreset index, and a TCI state index. For example, a serving cell index (e.g., Serving Cell ID) may indicate an index of a serving cell, where the MAC CE applies. A coreset index (e.g., CORESET ID) may indicate a index of a coreset where the MAC CE applies. A TCI state index (e.g., TCI State ID) may indicate a TCI state identified by TCI-StateId. For example, when the coreset is CORESET #0, the TCI state ID may indicate one TCI state of first 64 TCI states configured for pdsch-Config of a BWP of the serving cell. The BWP of the serving cell may be an active BWP of the cell. When the coreset is not the CORESET #0 (e.g., CORESET ID is not zero), the TCI state ID may indicate a TCI state of the plurality of TCI states configured for the coreset in pdcch-Config.

In an example, a base station and a wireless device may use a plurality of downlink control information (DCI) formats to communicate control information to schedule downlink data and/or uplink data and/or to deliver control information. For example, a DCI format 0_0 may be used to schedule an uplink resource for a PUSCH over a cell. A DCI format 0_1 may be used to schedule one or more PUSCHs in one cell or may be used to indicate downlink feedback information for configured grant PUSCH (CG-DFI). A DCI format 0_2 may be used to schedule a resource for a PUSCH in one cell. Similarly, for downlink scheduling, a DCI format 1_0 may schedule a resource for a PDSCH in one cell. A DCI format 1_1 may be used to schedule a PDSCH in one cell or trigger one shot HARQ-ACK feedback. A DCI format 1_2 may be used to schedule a resource for a PDSCH in one cell. There are one or more DCI formats carrying non-scheduling information. For example, a DCI format 2_0 may be used to indicate a slot formation information for one or more slots of one or more cells. A DCI format 2_2 may be used to indicate one or more transmit power control commands for PUCCH and PUSCH. A DCI format 2_3 may be used to indicate one or more transmit power control for SRS. A DCI format 2_4 may be used to indicate an uplink cancellation information. A DCI format 2_5 may be used to indicate a preemption information. A DCI format 2_6 may be used to indicate a power saving state outside of DRX active time. A DCI format 3_0 or 3_1 may be used to schedule NR sidelink resource or LTE sidelink resource in one cell.

In an example, a DCI format 0_0 and a DCI format 1_0 may be referred as a fallback DCI format for scheduling uplink and downlink respectively. In an example, a DCI format 0_1 and a DCI format 1_1 may be referred as a non-fallback DCI format scheduling uplink and downlink respectively. In an example, a DCI format 0_2 and a DCI format 1_2 may be referred as a compact DCI format for scheduling uplink and downlink respectively. A base station may configure one or more DCI formats for scheduling downlink and/or uplink resources. For example, a DCI format 0_0, 0_1 and 0_2 may be used to schedule uplink resource(s) for one or more PUSCHs. A DCI format 1_0, 1_1 and 1_2 may be used to schedule downlink resource(s) for one or more PDSCHs. A DCI format 2_0, 2_1, 2_2, 2_3, 2_4, 2_5 and 2_6 may be used for a group-common DCI transmission. Each format of DCI format 2_x may be used for different information. For example, the DCI format 2_4 may be used to indicate uplink resources for a group of wireless devices. In response to receiving a DCI based on the DCI format 2_4, a wireless device may cancel any uplink resource, scheduled prior to the receiving, when the uplink resource may be overlapped with the indicated uplink resources.

A DCI format may comprise one or more DCI fields. A DCI field may have a DCI size. A wireless device may determine one or more bitfield sizes of one or more DCI fields of the DCI format based on one or more radio resource control (RRC) configuration parameters by a base station. For example, the one or more RRC configuration parameters may be transmitted via master information block (MIB). For example, the one or more RRC configuration parameters may be transmitted via system information blocks (SIBs). For example, the one or more RRC configuration parameters may be transmitted via one or more a wireless device specific messages. For example, the wireless device may determine one or more DCI sizes of one or more DCI fields of a DCI format 0_0 based on the one or more RRC configuration parameters transmitted via the MIB and/or the SIBs. The wireless device may be able to determine the one or more DCI sizes of the DCI format 0_0 without receiving any the wireless device specific message. Similarly, the wireless device may determine one or more DCI sizes of one or more second DCI fields of a DCI format 1_0 based on the one or more RRC configuration parameters transmitted via the MIB and/or the SIBs.

Figure 19:
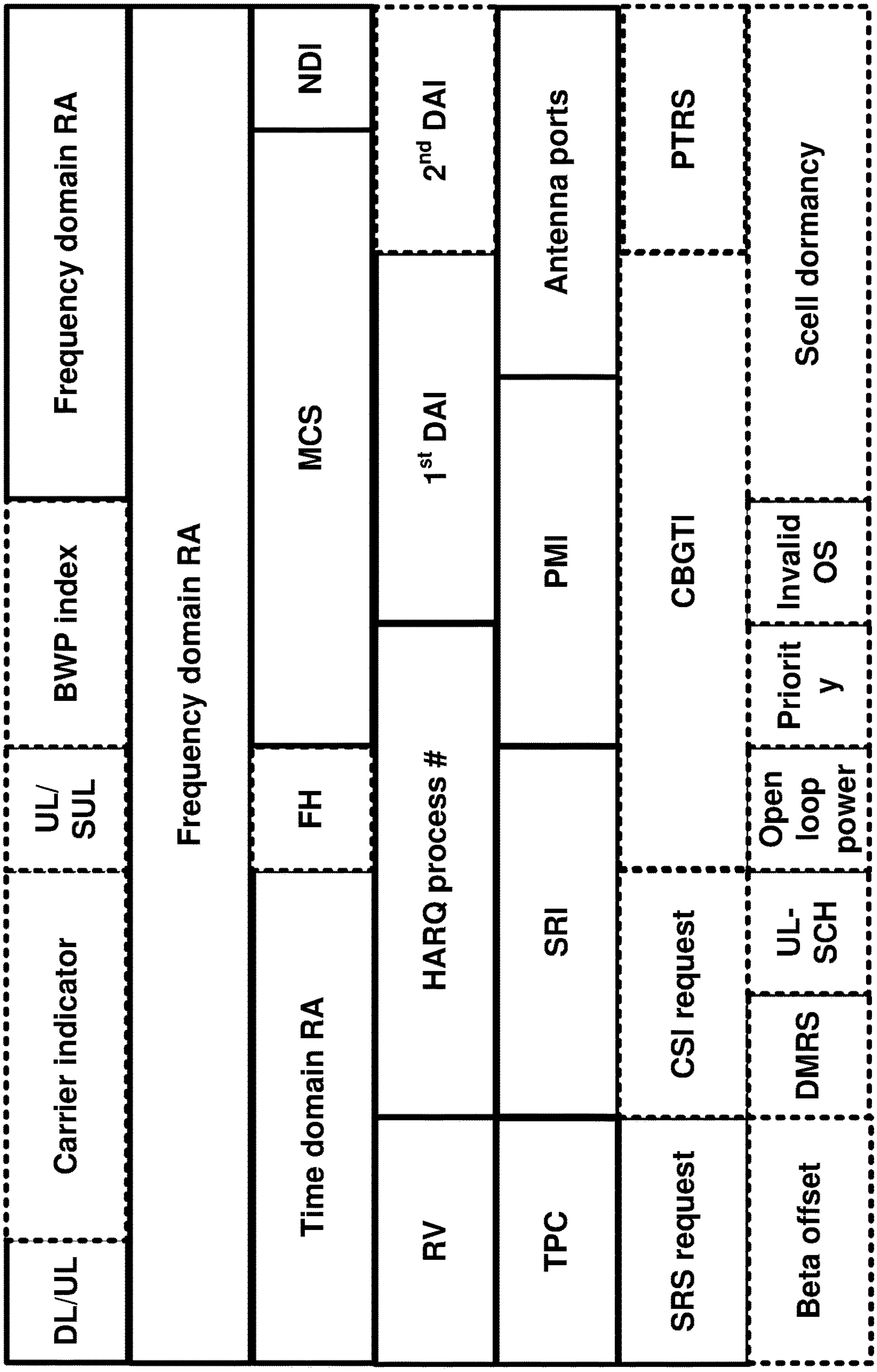
FIG. 19 illustrates an example DCI format for scheduling uplink resource of a single cell as per an aspect of an embodiment of the present disclosure.

For example, the wireless device may determine one or more first DCI sizes of one or more first DCI fields of a DCI format 0_2 based on one or more RRC configuration parameters transmitted via the MIB and/or the SIBs and/or the wireless device specific RRC message(s). The wireless device may determine one or more bitfield sizes of the one or more first DCI fields based on the one or more RRC configuration parameters. For example, FIG. 19 may illustrate the one or more first DCI fields of the DCI format 0_2. In FIG. 19, there are one or more second DCI fields that may present in the DCI format 0_2 regardless of the wireless device specific RRC message(s). For example, the one or more second DCI fields may comprise at least one of DL/UL indicator, frequency domain resource allocation, MCS, NDI, and TPC fields. For example, the one or more first DCI fields may comprise the one or more second DCI fields and one or more third DCI fields. A DCI field of the one or more third DCI fields may be present or may not be present based on one or more configuration parameters transmitted by the base station. For example, the one or more third DCI fields may comprise at least one of a BWP index, RV, HARQ process #, PMI, antenna ports, and/or beta offset.

For example, the DCI format 0_2 may comprise a 1-bit DL/UL indicator where the bit is configured with zero ('0') to indicate an uplink grant for the DCI format 0_2. DCI field(s) shown in dotted boxes may not be present or a size of the DCI field(s) may be configured as zero. For example, a carrier indicator may be present when the DCI format 0_2 is used to schedule a cell based on cross-carrier scheduling. The carrier indicator may indicate a cell index of a scheduled cell by the cross-carrier scheduling. For example, UL/SUL indicator (shown UL/SUL in FIG. 19) may indicate whether a DCI based on the DCI format 0_2 schedules a resource for an uplink carrier or a supplemental uplink. The UL/SUL indicator field may be present when the wireless device is configured with a supplemental uplink for a scheduled cell of the DCI. Otherwise, the UL/SUL indicator field is not present.

A field of BWP index may indicate a bandwidth part indicator. The base station may transmit configuration parameters indicating one or more uplink BWPs for the scheduled cell. The wireless device may determine a bit size of the field of BWP index based on a number of the one or more uplink BWPs. For example, 1 bit may be used. The number of the one or more uplink BWPs (excluding an initial UL BWP) is two. The field of BWP index may be used to indicate an uplink BWP switching. The wireless device may switch to a first BWP in response to receiving the DCI indicating an index of the first BWP. The first BWP is different from an active uplink BWP (active before receiving the DCI).

A DCI field of frequency domain resource allocation (frequency domain RA in FIG. 19) may indicate uplink resource(s) of the scheduled cell. For example, the base station may transmit configuration parameters indicating a resource allocation type 0. With the resource allocation type 0, a bitmap over one or more resource block groups (RBGs) may schedule the uplink resource(s). With a resource allocation type 1, a starting PRB index and a length of the scheduled uplink resource(s) may be indicated. In an example, a length may be a multiple of K1 resource blocks. For example, the configuration parameters may comprise a resource allocation type1 granularity for the DCI format 0_2 (e.g., K1). A default value of the K1 may be one ('1'). The base station may transmit configuration parameters indicating a dynamic change between the resource allocation type 0 and the resource allocation type 1 (e.g., 'dynamicswitch'). The wireless device may determine a field size of the frequency domain RA field based on the configured resource allocation type and a bandwidth of an active UL BWP of the scheduled cell. The wireless device may further determine the field size of the frequency domain RA field based on the K1 value, when the resource allocation type 1 may be used/configured. For example, when the resource allocation type 0 is configured, the bitmap may indicate each of the one or more RBGs covering the bandwidth of the active UL BWP. A size of the bitmap may be determined based on a number of the one or more RBGs of the active UL BWP. For example, the wireless device may determine the size of the frequency domain RA field based on the resource allocation type 1 based on the bandwidth of the active uplink BWP (e.g., ceil (log 2(BW/K1(BW/K1+1)/2) and the resource allocation type1 granularity. E.g., the BW is the bandwidth of the active uplink BWP. E.g., the K1 is the resource allocation type1 granularity.).

The wireless device may determine a resource allocation indicator value (RIV) table, where an entry of the table may comprise a starting PRB index and a length value. The wireless device may determine the RIV table based on the resource allocation type1 granularity. For example, when the dynamic change between the resource allocation type 0 and the resource allocation type 1 is used, a larger size between a first size based on the resource allocation type 0 (e.g., the bitmap size) and a second size based on the resource allocation type 1 (e.g., the RIV table size) with additional 1 bit indication to indicate either the resource allocation type 0 or the resource allocation type 1. For example, the frequency domain RA field may indicate a frequency hopping offset. The base station may use K (e.g., 1 bit for two offset values, 2 bits for up to four offset values) bit(s) to indicate the frequency hopping offset from one or more configured offset values, based on the resource allocation type 1. The base station may use ceil(log 2(BW/K1(BW/K1+1)/2)−K bits to indicate the uplink resource(s) based on the resource allocation type 1, when frequency hopping is enabled.

Otherwise, the base station/wireless device may use ceil(log 2(BW/K1(BW/K1+1)/2) bits to indicate the uplink resource(s) based on the resource allocation type 1.

In an example, a base station may transmit one or more messages comprising configuration parameters of a BWP of a cell. The configuration parameters may indicate/comprise a resource allocation type for one or more PUSCHs scheduled by one or more DCIs, based on a first RNTI. The resource allocation type may be a resource allocation type 0 or a resource allocation type 1 or a dynamic switching between the resource allocation type 0 and the resource allocation type 1. For example, the first RNTI is a C-RNTI. The configuration parameters may indicate/comprise a configured grant configuration or a SPS configuration. The configuration parameters may indicate a resource allocation type for the configured grant configuration or the SPS configuration. The resource allocation type may be a resource allocation type 0 or a resource allocation type 1 or a dynamic switching between the resource allocation type 0 and the resource allocation type 1.

A DCI field of time domain resource allocation (time domain RA shown in FIG. 19) may indicate time domain resource of one or more slots of the scheduled cell. The base station may transmit configuration parameters indicating one or more time domain resource allocation lists of a time domain resource allocation table for an uplink BWP of the scheduled cell. The wireless device may determine a bit size of the time domain RA field based on a number of the one or more time domain resource allocation lists of the time domain resource allocation table. The base station may indicate a frequency hopping flag by a FH flag (shown as FH in FIG. 19). For example, the FH flag may present when the base station may enable a frequency hopping of the scheduled cell or the active UL BWP of the scheduled cell. A DCI field of modulation and coding scheme (MCS) (shown as MCS in FIG. 19) may indicate a coding rate and a modulation scheme for the scheduled uplink data. In an example, a bit size of the MCS field may be predetermined as a constant (e.g., 5 bits). A new data indicator (NDI) field may indicate whether the DCI schedules the uplink resource(s) for a new/initial transmission or a retransmission. A bit size of the NDI may be fixed as a constant value (e.g., 1 bit). A redundancy version (RV) field may indicate one or more RV values (e.g., a RV value may be 0, 2, 3, or 1) for one or more PUSCHs scheduled over the one or more slots of the scheduled cells. For example, the DCI may schedule a single PUSCH via one slot, a RV value is indicated. For example, the DCI may schedule two PUSCHs via two slots, two RV values may be indicated. A number of PUSCHs scheduled by a DCI may be indicated in a time domain resource allocation list of the one or more time domain resource allocation lists. The configuration parameters may indicate/comprise a bit size of the RV field. For example, the bit size may be 0, 1 or 2 bits for a single PUSCH. When the bit size is configured as zero ('0'), the wireless device may apply a RV=0 for any uplink resource scheduled by a DCI based on the DCI format 0_2.

A DCI field of hybrid automatic repeat request (HARQ) process number (HARQ process # in FIG. 19) may indicate an index of a HARQ process used for the one or more PUSCHs. The wireless device may determine one or more HARQ processes for the one or more PUSCHs based on the index of the HARQ process. The wireless device may determine the index for a first HARQ process of a first PUSCH of the one or more PUSCHs and select a next index as a second HARQ process of a second PUSCH of the one or more PUSCHs and so on. The configuration parameters may indicate/comprise a bit size for the HARQ process # field. For example, the bit size may be 0, 1, 2, 3 or 4 bits for a single PUSCH. The wireless device may assume that a HARQ process index=0 in case the bit size is configured as zero. The wireless device may assume that a HARQ process index in a range of [0, 1] when the bit size is configured as one. The wireless device may assume that a HARQ process index in a range of [0, . . . , 3] when the bit size is configured as two. The wireless device may assume that a HARQ process index in a range of [0, . . . , 7] when the bit size is configured as three. For the 4 bits of bit size, the wireless device may use a HARQ process in a range of [0, . . . , 15].

The DCI format 0_2 may have a first downlink assignment index (1st DAI) and/or a second DAI (2nd DAI). The configuration parameters may indicate/comprise a parameter to indicate whether to use DAI for the DCI format 0_2 (e.g., Downlinkassignmentindex-ForDCIFormat0_2). The first DAI may be used to indicate a first size of bits of first HARQ-ACK codebook group. The second DAI may be present when the base station may transmit configuration parameters indicating a plurality of HARQ-ACK codebook groups. When there is no HARQ-ACK codebook group configured, the wireless device may assume the first HARQ-ACK codebook group only. The second DAI may indicate a second size of bits of second HARQ-ACK codebook group. The first DAI may be 1 bit when a semi-static HARQ-ACK codebook generation mechanism is used. The first DAI may be 2 bits or 4 bits when a dynamic HARQ-ACK codebook generation mechanism is used.

A field of transmission power control (TPC shown in FIG. 19) may indicate a power offset value to adjust transmission power of the one or more scheduled PUSCHs. A field of sounding reference signal (SRS) resource indicator (SRI) may indicate an index of one or more configured SRS resources of an SRS resource set. A field of precoding information and number of layers (shown as PMI in FIG. 19) may indicate a precoding and a MIMO layer information for the one or more scheduled PUSCHs. A field of antenna ports may indicate DMRS pattern(s) for the one or more scheduled PUSCHs. A field of SRS request may indicate to trigger a SRS transmission of a SRS resource or skip SRS transmission. A field of CSI request may indicate to trigger a CSI feedback based on a CSI-RS configuration or skip CSI feedback. A field of phase tracking reference signal (PTRS)-demodulation reference signal (DMRS) association (shown as PTRS in FIG. 19) may indicate an association between one or more ports of PTRS and one or more ports of DM-RS. The one or more ports may be indicated in the field of antenna ports. A field of beta_offset indicator (beta offset in FIG. 19) may indicate a code rate for transmission of uplink control information (UCI) via a PUSCH of the one or more scheduled PUSCHs. A field of DM-RS sequence initialization (shown as DMRS in FIG. 19) may present based on a configuration of transform precoding. A field of UL-SCH indicator (UL-SCH) may indicate whether a UCI may be transmitted via a PUSCH of the one or more scheduled PUSCHs or not. A field of open loop power control parameter set indication (open loop power in FIG. 19) may indicate a set of power control configuration parameters. The wireless device is configured with one or more sets of power control configuration parameters. A field of priority indicator (priority) may indicate a priority value of the one or more scheduled PUSCHs. A field of invalid symbol pattern indicator (invalid OS) may indicate one or more unavailable/not-available OFDM symbols to be used for the one or more scheduled PUSCHs.

Note that additional DCI field(s), although not shown in FIG. 19, may be present for the DCI format 0_2. For example, a downlink feedback information (DFI) field indicating for one or more configured grant resources may present for an unlicensed/shared spectrum cell. For example, the unlicensed/shared spectrum cell is a scheduled cell. When the DCI format 0_2 is used for indicating downlink feedback information for the one or more configured grant resources, other DCI fields may be used to indicate a HARQ-ACK bitmap for the one or more configured grant resources and TPC commands for a scheduled PUSCH. Remaining bits may be reserved and filled with zeros ('0's).

Figure 20:
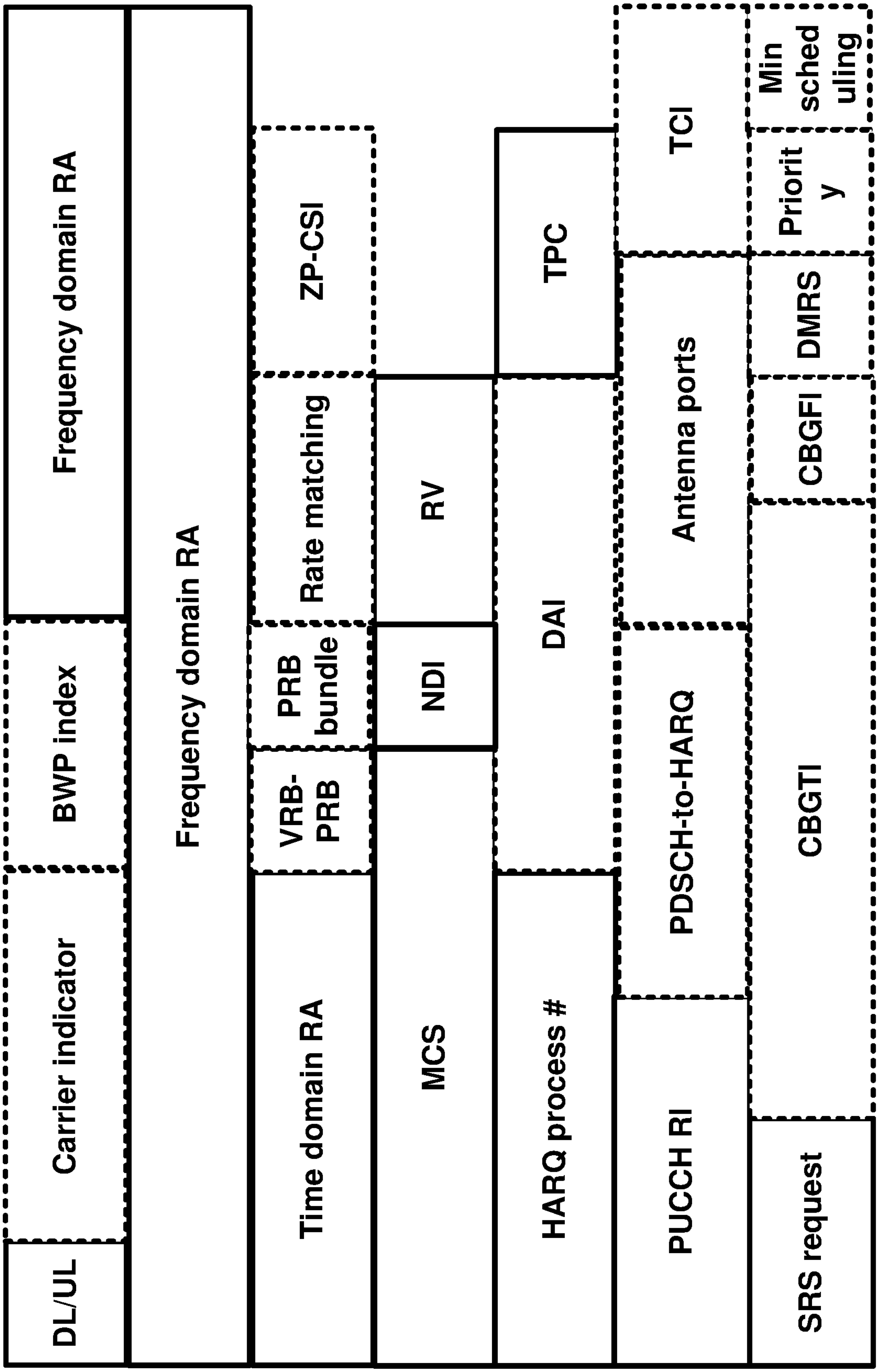
FIG. 20 illustrates an example DCI format for scheduling downlink resource of a single cell as per an aspect of an embodiment of the present disclosure.

FIG. 20 shows an example of a DCI format 1_2. The DCI format 1_2 may schedule a downlink resource for a scheduled downlink cell. The DCI format 1_2 may comprise one or more DCI fields such as an identifier for DCI formats (DL/UL), a carrier indicator, bandwidth part indicator (BWP index), a frequency domain resource assignment (frequency domain RA), a time domain resource assignment (time domain RA), a virtual resource block to physical resource block mapping (VRB-PRB), Physical resource block (PRB) bundling size indicator (PRB bundle), rate matching indicator (rate matching), zero power CSI-RS (ZP-CSI), a MCS, a NDI, a RV, a HARQ process number, a downlink assignment index (DAI), a TPC command for a PUCCH, a PUCCH resource indicator (PUCCH-RI), a PDSCH-to-HARQ feedback timing indicator (PDSCH-to-HARQ in FIG. 20), an antenna ports, a transmission configuration indication (TCI), a SRS request, DMRS sequence initialization (DMRS), and a priority indicator (priority).

The base station may transmit one or more messages indicating configuration parameters for the DCI format 1_2. Similar to the DCI format 0_2 of FIG. 19, one or more DCI fields shown in dotted lined boxes may be present or may not be present based on the configuration parameters. The configuration parameters may indicate/comprise one or more DCI bit sizes and/or related configuration parameters/values for the one or more DCI fields.

For example, the VRB-PRB field may indicate whether a mapping is based on a virtual RB or a physical RB. For example, the PRB bundle may indicate a size of PRB bundle when a dynamic PRB bundling is enabled. For example, the rate matching may indicate one or more rate matching resources where the scheduled data may be mapped around based on the rate matching. For example, the ZP-CSI field may indicate a number of aperiodic ZP CSI-RS resource sets configured by the base station. For example, the DCI format 1_2 may also include MCS, NDI and RV for a second transport block, in response to a max number of codewords scheduled by DCI may be configured as two. The DCI format 1_2 may not include MCS, NDI and RV field for the second transport block. For example, the DAI field may indicate a size of bits of HARQ-ACK codebook. The TPC field may indicate a power offset for the scheduled PUCCH. The wireless device may transmit the scheduled PUCCH comprising HARQ-ACK bit(s) of the scheduled downlink data by the DCI. The PUCCH-RI may indicate a PUCCH resource of one or more PUCCH resources configured by the base station. The PDSCH-to-HARQ field may indicate a timing offset between an end of a scheduled PDSCH by the DCI and a starting of the scheduled PUCCH. The field of antenna ports may indicate DMRS patterns for the scheduled PDSCH. The TCI field may indicate a TCI code point of one or more active TCI code points/active TCI states. The base station may transmit configuration parameters indicating one or more TCI states for the scheduled cell. The base station may active one or more second TCI states of the one or more TCI states via one or more MAC CEs/DCIs. The wireless device may map an active TCI code point of the one or more active TCI code points to an active TCI of the one or more second TCI states.

In an example, a wireless device may receive a DCI indicating an activation, a release, or a retransmission for one or more configured grant configurations or one or more semi-persistent scheduling configurations. The DCI may be cyclic redundancy check (CRC) scrambled with a first radio network temporary identifier (RNTI). The wireless device may receive a second DCI indicating one or more resources for scheduling downlink and/or uplink data. The second DCI may be CRC scrambled with a second RNTI. For example, the second RNTI may be a cell RNTI (C-RNTI) and/or MCS-C-RNTI. For example, the first RNTI may be configured scheduling RNTI (CS-RNTI) for an uplink configured grant configuration. The first RNTI may be semi-persistent scheduling RNTI (SPS-RNTI). The DCI and the second DCI may be based on a DCI format. For example, the DCI and the second DCI may be based on a DCI format 0_2 for uplink (e.g., uplink grant and/or configured grant (CG)). For example, the DCI and the second DCI may be based on a DCI format 1_2 for downlink (e.g., downlink scheduling and/or semi-persistent scheduling (SPS)).

For example, the wireless device may determine whether the DCI indicates the activation, the release or the retransmission for the one or more CG configurations or for the one or more SPS configurations based on determining one or more values of one or more DCI fields of the DCI format used for the DCI. For example, the wireless device may determine the DCI indicates the activation in response to receiving the DCI with a HARQ process # (HARQ process number) field of the DCI format indicating zero(s) (e.g., '0, . . . , 0') and a RV (redundancy version) field of the DCI indicating zero(s). The wireless device may first determine whether a NDI field of the DCI may indicate a new data or not. In response to receiving the DCI with the NDI field of the new data, the wireless device may further determine the HARQ process number field and the redundancy version field of the DCI. In response to determining the HARQ process number field being set to a predetermined value (e.g., zero(s)) and the redundancy version field being set to a predetermined value (e.g., zero(s)), the wireless device may determine the DCI may indicate the activation or the release of at least one CG configuration or at least one SPS configuration. For example, the wireless device may further check/determine a MCS (modulation and coding scheme) field of the DCI and/or a FDRA (frequency domain resource assignment) field of the DCI to differentiate between the activation and the release. In response to the MCS field being set to a second predetermined value (e.g., one(s), '1, . . . , 1') and the FDRA field being set to a third predetermined value (e.g., zero(s) for resource allocation type 0 or a resource allocation type 2 with mu=1, one(s) for resource allocation type 1 or the resource allocation type 2 with mu=0), the wireless device may determine the DCI indicates the release for the at least one CG configuration or the at least one SPS configuration. In response to the MCS field being set to different value from the second predetermined value and/or the FDRA field being set to the third predetermined value, the wireless device may determine the DCI may indicate the activation for the at least one CG configuration or the at least one SPS configuration.

For example, a DCI format 0_0/0_1/0_2, CRC scrambled with the first RNTI, may be used to indicate an activation, a release and/or retransmission for a configured grant (CG) based on setting one or more DCI fields with one or more predetermined values. For example, a DCI format 1_0/1_2, CRC scrambled with a third RNTI (e.g., SPS-RNTI), may be used to indicate an activation, a release and/or retransmission for a semi-persistent scheduling (SPS) on setting the one or more DCI fields with one or more predetermined values.

In an example, a physical downlink control channel (PDCCH) may comprise one or more control-channel elements (CCEs). For example, the PDCCH may comprise one CCE that may correspond to an aggregation level (AL)=1. For example, the PDCCH may comprise two CCEs that may correspond to an AL of two (AL=2). For example, the PDCCH may comprise four CCEs that may correspond to an AL of four (AL=4). For example, the PDCCH may comprise eight CCEs that may correspond to an AL of eight (AL=8). For example, the PDCCH may comprise sixteen CCEs that may correspond to an AL of sixteen (AL=16).

In an example, a PDCCH may be carried over one or more control resource sets (coresets). A coreset may comprise N_rb_coreset resource blocks (RBs) in the frequency domain and N_symbol_coreset symbols in the time domain. For example, the N_rb_coreset may be multiple of 6 RBs (e.g., 6, 12, 18, . . . ,). For example, N_symbol_coreset may be 1, 2 or 3. A CCE may comprise M (e.g., M=6) resource-element groups (REGs). For example, one REG may comprise one RB during one OFDM symbol. REGs within the coreset may be ordered/numbered in increasing order in a time-first manner, starting with 0 for a first OFDM symbol and a lowest number (e.g., a lowest frequency) RB in the coreset. The wireless device may increase the numbering in the first OFDM symbol by increasing a frequency location or a RB index. The wireless device may move to a next symbol in response to all RBs of the first symbol may have been indexed. The wireless device may map one or more REG indices for one or more 6 RBs of N_rb_coreset RBs within N_symbol_coreset OFDM symbols of the coreset.

In an example, a wireless device may receive configuration parameters from a base station. The configuration parameters may indicate/comprise one or more coresets. One coreset may be associated with one CCE-to-REG mapping. For example, a single coreset may have a single CCE mapping to physical RB s/resources of the single coreset. For example, a CCE-to-REG of a coreset may be interleaved or non-interleaved. For example, a REG bundle may comprise L consecutive REGs (e.g., iL, iL+1, . . . , iL+L−1). For example, L may be a REG bundle size (e.g., L=2 or 6 for N_symbol_coreset=1 and L=N_symbol_coreset or 6 when N_symbol_coreset is 2 or 3). A index of a REG bundle (e.g., i), may be in a range of [0, 1, . . . N_reg_coreset/L−1]. For example, N_reg_coreset may be defined as N_rb_coreset*N_symbol_coreset (e.g., a total number of REGs in the single coreset). For example, a j-th indexed CCE may comprise one or more REG bundles of {f(6j/L), f(6j/L+1), . . . , f(6j/L+6/L−1)}. For example, f(x) may be an interleaver function. In an example, f(x) may be x (e.g., j-th CCE may comprise 6j/L, 6j/L+1, . . . , and 6j/L+6/L−1), when the CCE-to-REG mapping may be non-interleaved. When the CCE-to-REG mapping may be interleaved, L may be defined as one of {2, 6} when N_symbol_coreset is 1 or may be defined as one of {N_symbol_coreset, 6} when N_symbol_coreset is 2 or 3. When the CCE-to-REG mapping may be interleaved, the function f(x) may be defined as (rC+c+n_shift) mod (N_reg_coreset/L), wherein x=cR+r, r=0, 1, . . . , R−1, c=0, 1, . . . , C−1, C=N_reg_coreset/(L*R), and R is one of {2, 3, 6}.

For example, the configuration parameters may indicate/comprise a frequencyDomainResources that may define N_rb_coreset. The configuration parameters may indicate/comprise duration that may define N_symbol_coreset. The configuration parameters may indicate/comprise cce-REG-MappingType that may be selected between interleaved or non-interleaved mapping. The configuration parameters may indicate/comprise reg-BundleSize that may define a value for L for the interleaved mapping. For the non-interleaved mapping, L=6 may be predetermined. The configuration parameters may indicate/comprise shiftIndex that may determine n_shift as one of {0, 1, . . . , 274}. The wireless device may determine/assume a same precoding for REGs within a REG bundle when precorder granularity (e.g., a precoderGranularity indicated/configured by the configuration parameters) is configured as sameAsREG-bundle. The wireless device may determine/assume a same precoding for all REGs within a set of contiguous RBs of a coreset when the precoderGranularity is configured as allContiguousRBs.

For a first coreset (e.g., CORESET #0) may be defined/configured with L=6, R=2, n_shift=cell ID, and precoderGranularity=sameAsREG-bundle.

In an example, a base station may transmit one or more messages comprising configuration parameters. The configuration parameters may indicate/comprise one or more serving cells for a wireless device. The configuration parameters may indicate/comprise parameter(s) to enable control channel repetition. For example, the control channel repetition may be transmitted via one or more serving cells. The control channel repetition may schedule one or more resources for a transport block. The transport block may be transmitted via one or more PDSCHs or one or more PUSCHs. For example, the control channel repetition may be transmitted via a single cell, where the single cell may operate with a single transmission and reception point (TRP) or a plurality of TRPs. The base station may transmit one or more control channels for a control channel repetition via one or more resources in different frequency resources (e.g., repetition in a frequency domain or in a plurality of carriers/cells). The one or more resources may overlap in time domain. The base station may transmit one or more second control channels for a control channel repetition via one or more second resources in different time resources (e.g., repetition in a time domain or in a plurality of slots). The one or more second resources may overlap in frequency domain. For example, the base station may transmit the repetitions of the control channel repetition via a plurality of coresets of the single cell. For example, the base station may transmit the control channel repetition via a plurality of search spaces of the single cell.

In an example, the control channel repetition (e.g., a DCI) may be transmitted/received via a plurality of PDCCHs. For example, a PDCCH may indicate a physical control channel transmitted in one search space candidate. A search space candidate may comprise one or more CCEs based on an aggregation level. The plurality of PDCCHs may be transmitted via a plurality of coresets of a plurality of cells. For example, a coreset of a cell of the plurality of cells may transmit a PDCCH of the plurality of the PDCCHs. The plurality of PDCCHs may be transmitted via a plurality of coresets of a cell. For example, a coreset of the plurality of coresets may transmit a PDCCH of the plurality of the PDCCHs. The plurality of PDCCHs may be transmitted via a plurality of search spaces, where a PDCCH of the plurality of PDCCHs maybe transmitted via a search space of the plurality of search spaces. The plurality of PDCCHs may be transmitted via a plurality of search space candidates where each PDCCH of the plurality of PDCCHs may be transmitted via a search space candidate of the plurality of search space candidates. The plurality of search space candidates may belong to a single search space or a plurality of search spaces. A search space may comprise a set of search space candidates over monitoring occasions. Monitoring occasions of the search space may refer timing occasions where the wireless device may monitor a search space candidate for receiving a DCI/a PDCCH.

In an example, a PDCCH of the plurality of PDCCHs for the control channel repetition may convey/transmit a DCI based on a DCI format. For example, a first DCI of a first PDCCH of the plurality of PDCCHs may be the same as a second DCI of a second PDCCH of the plurality of PDCCHs. For example, content of the first DCI/PDCCH may be same as content of the second DCI/PDCCH. Based on same content of the plurality of PDCCHs, the wireless device may aggregate the plurality of DCIs/PDCCHs before decoding a DCI/PDCCH. For example, the wireless device may need to determine a reference frequency domain resource and/or a reference time domain resource and/or a reference CCE index and/or a reference REG index when the control channel repetition is transmitted via equal content DCIs/PDCCHs. For example, the wireless device may determine an aggregated DCI/PDCCH by aggregating the plurality of DCIs/PDCCHs. The wireless device may decode the aggregated DCI/PDCCH. For example, the reference frequency domain resource of the plurality of DCIs/PDCCHs may be determined based on an earliest PDCCH (or a latest PDCCH) among the plurality of PDCCHs. For example, when a first PDCCH of the plurality of PDCCHs is transmitted in a slot n and a second PDCCH of the plurality of PDCCHs is transmitted in a slot n+1, the first PDCCH may determine the reference frequency domain resource. Similarly, the reference time domain resource and/or the reference CCE index and/or the reference REG may be determined based on the earliest PDCCH or the latest PDCCH. The reference frequency domain resource of the plurality of DCIs/PDCCHs may be determined based on a CORESET index of one or more CORESETs where the plurality of DCIs/PDCCHs are transmitted. For example, a smallest (or a largest) index of the one or more CORESETs may be used for the determining.

The reference frequency domain resource of the plurality of DCIs/PDCCHs may be determined based on a search space index of one or more search spaces where the plurality of DCIs/PDCCHs are transmitted. For example, a smallest (or a largest) index of the one or more search spaces may be used for the determining. The reference frequency domain resource of the plurality of DCIs/PDCCHs may be determined based on a cell index of one or more cells where the plurality of DCIs/PDCCHs are transmitted. For example, a smallest (or a largest) index of the one or more cells may be used for the determining. Similarly, the reference time domain resource and/or the reference CCE index and/or the reference REG may be determined based on the CORESET index, the search space index and/or the cell index. Combinations of transmission time, a CORESET index, a search space and/or a cell index may be used. For example, first the reference frequency domain resource may be determined based on the transmission time of a DCI/PDCCH. When there are multiple DCIs/PDCCHs transmitted at a same time, the wireless device may use the CORESET index or the search space index and/or the cell index to further identify a reference DCI/PDCCH. The wireless device may determine the reference DCI/PDCCH for determining the reference frequency domain resource, the reference time domain resource, the reference CCE index and/or the reference REG index.

In an example, the base station may configure a maximum repetition number K for the control channel repetition. The base station may transmit a number of repetitions M that is smaller than the K. In response to the M being smaller than K, the wireless device may determine the reference DCI/PDCCH based on a candidate DCI/PDCCH in K-th repetition regardless whether the K-th repetition has been actually transmitted or not. The wireless device may determine the reference DCI/PDCCH based on a first DCI/PDCCH which is a first repetition. The wireless device may determine the reference DCI/PDCCH based on a last DCI/PDCCH which has been actually transmitted (e.g., M-th repetition). For a convenience, in the specification, this type of control channel repetition (e.g., same content is repeated over a plurality of DCIs/PDCCHs) may be called/referred as a first control channel repetition mode (e.g., a mode 1, a repetition mode 1, a $1^{st}$ repetition mode). In an example, a base station may configure a list of time domain resource allocation entries. A time domain resource allocation entry may comprise a number of repetition of a control channel, a scheduling offset between the control channel and a PDSCH, and/or a number of PDSCH repetition. For example, the number of repetition of the control channel may represent the number of repetition K. Based on the number of repetition, the wireless device may determine a reference DCI/PDCCH timing based on K-th DCI/PDCCH repetition. The repeated DCIs/PDCCHs may indicate an entry of the list of time domain resource allocation entries.

In an example, a first DCI/PDCCH of the plurality of DCIs/PDCCHs may be different from a second DCI/PDCCH of the plurality of DCIs/PDCCHs. For example, a wireless device may not aggregate the first DCI/PDCCH and the second DCI as contents of the first DCI/PDCCH may be different. The wireless device may attempt to decode the first DCI/PDCCH separately from the second DCI/PDCCH. For example, the wireless device may complete the decoding of the control channel repetition when the wireless device has received at least one DCI/PDCCH of the plurality of DCIs/PDCCHs. For example, the wireless device may be able to receive or transmit a TB scheduled by the plurality of DCIs/PDCCHs when the wireless device has received at least one DCI/PDCCH of the plurality of DCIs/PDCCHs. In the specification, this type of control channel repetition (e.g., potentially different contents are transmitted via a plurality of DCIs/PDCCHs, a DCI/PDCCH of the plurality of DCIs/PDCCHs may schedule one or more resources of a transport block) may be called/referred as a second control channel repetition mode (e.g., a mode 2, a repetition mode 2, a $2^{nd}$ repetition mode). For example, a reference DCI/PDCCH of the plurality of DCIs/PDCCHs based on the second control channel repetition mode may be each DCI/PDCCH received by the wireless device.

In an example, a base station may indicate a control channel repetition. A wireless device may apply the control channel repetition for one or more DCI formats configured/associated with a USS. The wireless device may not apply the control channel repetition for one or more second DCI formats configured/associated with a CSS. The wireless device may not apply the control channel repetition for a CSS. The wireless device may apply the control channel repetition for a USS.

In an example, a base station may enable a control channel repetition for a first DCI format while disabling a control channel repetition for a second DCI format. The base station may indicate whether to enable or disable the control channel repetition for each DCI format of one or more DCI formats supported by the wireless device via a cell, where the control channel repetition is applied. For example, the base station may enable a control channel repetition for a DCI format 1_1/0_1 while disabling the control channel repetition for a DCI format 1_2/0_2 or a DCI format 1_0/0_0. Embodiments may allow better resource utilization by allowing a control channel repetition may not be used for a smaller sized DCI format (e.g., a compact DCI without repetition).

In an example, a wireless device may be, via RRC signaling, configured with a first cell group comprising one or more serving cells. The wireless device may be, via RRC signaling, configured with a second cell group comprising one or more second serving cells. The wireless device may perform a hybrid automatic repeat request (HARQ) feedback procedure for the first cell group independently from a second HARQ feedback procedure for the second cell group. A cell group may be a master cell group or a secondary cell group. A cell group may be a first PUCCH cell group comprising a primary cell. A cell group may be a second PUCCH cell group not comprising the primary cell. A cell group may comprise one or more serving cells among a plurality of serving cells configured to the wireless device. A cell group may also represent one or more serving cells associated with a first service or a first link (e.g., sidelink, multicast, broadcast, MBSM, D2D, V2X, V2P, V2I, V2N, and/or the like). A cell group may represent one or more second serving cells associated with a second service or a second link (e.g., downlink/uplink, cellular communication, location service, and/or the like). The wireless device may be configured with, via RRC signaling, a first set of PUCCH resources for the first cell group. The wireless device may be configured with, via RRC signaling, a second set of PUCCH resources for the second cell group. The wireless device may determine a first PUCCH for the first cell group based on the HARQ feedback procedure. The wireless device may determine a second PUCCH for the second cell group based on the second HARQ feedback procedure. For example, the first PUCCH and the second PUCCH may overlap in time and/or frequency domain. The wireless device may determine the first PUCCH or the second PUCCH based on a priority of the first PUCCH and a second priority of the second PUCCH. For example, the wireless device may determine the first PUCCH or the second PUCCH based on a priority of the first PUCCH and a threshold for the first PUCCH. A base station may configure the threshold for the first cell group via RRC signaling.

In an example, a wireless device may be provided with a coreset pool index for one or more coresets of an active bandwidth part of a serving cell. The wireless device may determine a coreset pool index of a coreset as zero in response to the coreset pool index has not been provided for the coreset. The coreset pool index may be zero or one. The base station may transmit one or more RRC messages indicating configuration parameters. The configuration parameters may indicate/comprise a ACKNACKFeedbackMode between SeparateFeedback or JointFeedback. For example, when ACKNACKFeedbackMode is indicated as SeparateFeedback, the wireless device may determine first HARQ feedback bits corresponding to a first corset pool index (or coresets of the first coreset pool index). The wireless device may determine second HARQ feedback bits, independently from the first HARQ feedback bits, corresponding to a second corset pool index (or coresets of the second coreset pool index). When ACKNACKFeedbackMode is indicated as JointFeedback, the wireless device may generate/determine HARQ feedback bits for both coreset pool indexes jointly. When ACKNACKFeedbackMode is indicated as SeparateFeedback, the wireless device may perform a first HARQ feedback process for the first coreset pool independently from a second HARQ feedback process for the second coreset pool.

In an example, a wireless device may determine a priority index of a PUSCH or a PUCCH transmission. For example, the wireless device may determine the priority index of the PUSCH based on a DCI scheduling uplink resource(s) for the PUSCH. The DCI may comprise or indicate the priority index. In response to the DCI does not comprise a priority index field, the wireless device may determine the priority index of the PUSCH is zero (0). The wireless device may determine a priority index of a PUCCH transmission based on one or more priorities of corresponding PDSCH(s) and/or SPS PDSCH(s) or SPS PDSCH release(s) that the PUCCH transmission carries HARQ feedback bits for the corresponding PDSCH(s) and/or SPS PDSCH(s) or SPS PDSCH release(s). In an example, the base station may transmit one or more RRC messages comprising configuration parameters. The configuration parameters may indicate a harq-CodebookID for a SPS configuration, wherein the harq-CodebookID may be used to determine a priority value of a SPS PDSCH or a SPS PDSCH release based on the SPS configuration. The wireless device may receive a second DCI scheduling a PDSCH of the corresponding PDSCH(s). The wireless device may determine a priority of the PDSCH based on the second DCI. For example, the second DCI may comprise/indicate a priority index field indicating the priority. For example, the wireless device may determine the priority as zero (0) in response to the second DCI does not comprise/indicate the priority for the PDSCH.

In an example, a base station may schedule a PUSCH with a first priority that may be used to piggyback/carry HARQ feedback bits with a second priority. The first priority and the second priority may be different or same. The wireless device may determine a prioritization of an overlapping PUSCH with a first priority and a PUCCH with a second priority based on a rule. For example, the rule is that the wireless device may determine or resolve conflict/overlapping between one or more PUCCHs and one or more PUSCHs with a same priority. For example, based on the determining the conflict/overlapping, the wireless device may have a first PUCCH with a high priority (e.g., larger priority index) and either a PUSCH or a second PUCCH with a low priority (e.g., lower priority index) where the first PUCCH overlaps with either the PUSCH or the second PUCCH. The wireless device may determine to transmit the first PUCCH and may cancel either the PUSCH or the second PUCCH before a first symbol overlapping with the first PUCCH transmission. The wireless device may expect that a transmission of the first PUCCH may not start before Tproc+d1 after a last symbol of a first PDCCH reception. The first PDCCH is a DCI scheduling the first PUCCH. For example, Tproc is a processing delay and d1 is an processing offset. For example, based on the determining the conflict/overlapping, the wireless device may have a PUSCH with a larger priority index scheduled by a first DCI format via a first PDCCH repetition and a PUCCH of a smaller priority index. The wireless device may determine to transmit the PUSCH and may cancel the PUCCH. The PUSCH and the PUCCH may overlap in time. The wireless device may cancel a transmission of the PUCCH before a first symbol overlapping with a transmission of the PUSCH. The wireless device may expect that the transmission of the PUSCH may not start before Tproc+d1 after a last symbol of the first PDCCH reception. For example, d1 may be determined based on a UE capability.

When a wireless device may detect a first DCI format (or a first DCI) scheduling a PUCCH with a larger priority index or a PUSCH transmission with a larger priority index that may overlap with a second PUCCH with a smaller priority index or a second PUSCH with a smaller priority index, the wireless device may not expect to receive a second DCI format (or a second DCI), after receiving the first DCI format (or the first DCI), scheduling resource(s) mapped to/fully overlapped to the second PUSCH or the second PUCCH. The base station may not reschedule or reclaim the resource(s) of the second PUSCH or the second PUCCH that are cancelled by a prioritization.

In an example, a wireless device may receive a first DCI format (or a first DCI) in a first PDCCH reception scheduling a first PUCCH or a first PUSCH with a higher priority index. The wireless device may receive a second DCI format (or a second DCI) in a second PDCCH reception scheduling a second PUCCH or a second PUSCH with a smaller priority index. The first PUCCH or the first PUSCH may overlap with the second PUCCH or the second PUSCH. The wireless device may determine Tproc based on a numerology of a smaller subcarrier spacing between a first numerology of the first PDCCH and a second numerology of the second PDCCH and a third numerology of the first PUCCH or the first PUSCH and a fourth numerology of the second PUCCH or the second PUSCH.

In an example, a base station may not schedule a first PUCCH or a first PUSCH with a smaller priority index that may overlap with a second PUCCH with a larger priority index with a HARQ feedback bits corresponding to a SPS PDSCH reception only. The base station may not schedule a first PUCCH with a smaller priority index that may overlap in time with a PUSCH with a larger priority index and comprises SP-CSI report(s) without a corresponding scheduling DCI/PDCCH.

In an example, when a wireless device multiplex UCI(s) with a first priority to a PUCCH or a PUSCH, the wireless device may assume that a priority of the PUCCH or the PUSCH may have a same priority to the first priority. A base station may schedule to multiplex the UCI(s) with the first priority to the PUCCH or the PUSCH with the same priority (e.g., the first priority). In an example, when a wireless device may be scheduled with a PUSCH without UL-SCH (e.g., data) and the PUSCH may overlap with a PUCCH comprising a positive SR, the wireless device may drop/cancel a transmission of the PUSCH. In an example, a wireless device may multiplex HARQ feedback bits in a PUSCH transmission via a configured grant resource that comprises a CG-UCI based on a cg-CG-UCI-Multiplexing configuration parameter. For example, the wireless device may multiple the HARQ feedback bits to the PUSCH with the CG-UCI when the cg-CG-UCI-Multiplexing is provided or indicated or enabled. Otherwise, the wireless device may not multiplex. The wireless device may multiplex the HARQ feedback bits to another transmission of a second PUSCH or a PUCCH.

In an example, a base station may transmit one or more RRC messages comprising configuration parameters. The configuration parameters may comprise/indicate pdsch-HARQ-ACK-Codebook-List. The pdsch-HARQ-ACK-Codebook-List may indicate whether the wireless device needs to generate one HARQ codebook or two HARQ codebook. When the wireless device generates one HARQ codebook, the wireless device may multiplex in a single HARQ codebook of HARQ feedback bits associated with a same priority index. When the wireless device generates two HARQ codebooks, the wireless device may generate a first HARQ codebook for a PUCCH of a first priority index (e.g., priority index 0). The wireless device may generate a second HARQ codebook for a second PUCCH of a second priority index (e.g., priority index 1). For each HARQ codebook, the configuration parameters may indicate PUCCH-Config, UCI-OnPUSCH, and/or PDSCH-codeBlockGroupTransmission.

In an example, a wireless device may generate a positive acknowledgement (ACK) when the wireless device detects a DCI format that may schedule a transport block or indicates a SPS release and the wireless device detects the transport block or the SPS release successfully. Otherwise, the wireless device may generate a negative acknowledgement (NACK). For example, a value 0 may indicate an ACK. A value 1 may indicate an NACK.

In an example, the configuration parameters may indicate PDSCH-CodeBlockGroupTransmission for a serving cell to enable a code block group (CBG) based HARQ feedback. The wireless device may generate N bits of HARQ feedback bits for a transport block when the CBG based HARQ feedback is enabled. For example, N is a number of HARQ feedback bits (e.g., number of CBGs) for a transport block. The wireless device may determine M number of code blocks per each CBG based on a total number of code blocks of the transport block. The wireless device may generate an ACK for a CBG in response to the wireless device correctly receive all code blocks of the CBG. Otherwise, the wireless device may generate an NACK for the CBG. When a wireless device receives two transport blocks by a DCI or a DCI format, the wireless device may generate one or more HARQ feedback bits for a first transport block of the two transport blocks first and then generate one or more second HARQ feedback bits for a second transport block of the two transport blocks. In general, the wireless device may generate HARQ feedback bits for one or more CBGs of a transport block first and then generate next HARQ feedback bits for one or more next transport block and so on.

In an example, a base station may transmit one or more RRC messages comprising/indicating configuration parameters. The configuration parameters may indicate a semi-static HARQ feedback mode (e.g., pdsch-HARQ-ACK-Codebook=semi-static) or a dynamic HARQ feedback mode (e.g., pdsch-HARQ-ACK-Codebook=dynamic).

In an example, a wireless device may be configured with dynamic HARQ feedback mode or HARQ-ACK codebook determination. Based on the dynamic HARQ feedback mode, the wireless device may multiplex of one or more HARQ-ACK feedback bits based on a PDSCH scheduled by a DCI format that does not include/comprise a counter DAI field. In an example, a wireless device may determine monitoring occasions for receiving DCI(s) of PDCCH(s) with one or more DCI formats scheduling PDSCH or SPS PDSCH release via an active downlink BWP of a serving cell. The wireless device may determine one or more HARQ-ACK/HARQ feedback bits in a same PUCCH in a slot n based on (1) a value of a PDSCH-to-HARQ feedback timing indicator field of a DCI format scheduling a PDSCH reception or a SPS PDSCH release; and (2) a slot offsets or timing offsets between a PDCCH/DCI and a PDSCH (e.g., K0) provided by a time domain resource assignment filed in a DCI format scheduling a PDSCH or a SPS PDSCH release; and (3) a number of slot aggregations for the PDSCH or the SPS PDSCH release.

For example, a wireless device may determine a set of PDCCH monitoring occasions for one or more DCI format that may schedule a PDSCH reception or a SPS PDSCH release. The set of PDCCH monitoring occasions may comprise one or more monitoring occasions based on one or more search spaces of an active DL BWPs of configured serving cells. The one or more monitoring occasions may be indexed in an ascending order of a start time of a search space associated or determining a PDCCH monitoring occasion. A cardinality of the set of PDCCH monitoring occasions may be defined as a total number M of the one or more monitoring occasions. A value of a counter DAI field in one or more DCI formats may represent an accumulative number of {serving cell, PDCCH monitoring occasion}-pair(s) where PDSCH reception or SPS PDSCH release associated with the one or more DCI formats up to a current PDCCH monitoring occasion. A counter DAI value may be updated for each PDCCH monitoring occasion to indicate accumulative number of PDSCH receptions and/or SPS PDSCH release up to the each PDCCH monitoring occasion. When a wireless device may support more than a PDSCH reception per each PDCCH monitoring occasion (e.g., PDSCH-Numerber-perMOperCell is larger than 1), the wireless device may order one or more PDSCH reception starting time for a same {serving cell, PDCCH monitoring occasion} pair. The wireless device may then order PDCCH monitoring occasion or PDSCH receptions based on a serving cell index. The wireless device may then order PDCCH monitoring occasion index (based on a starting time of PDCCH monitoring occasion). When a wireless device is provided with ACKNACKFeedbackMode=JointFeedback, a first coreset pool index may be ordered first than a second coreset pool index for a same serving cell.

Figure 21:
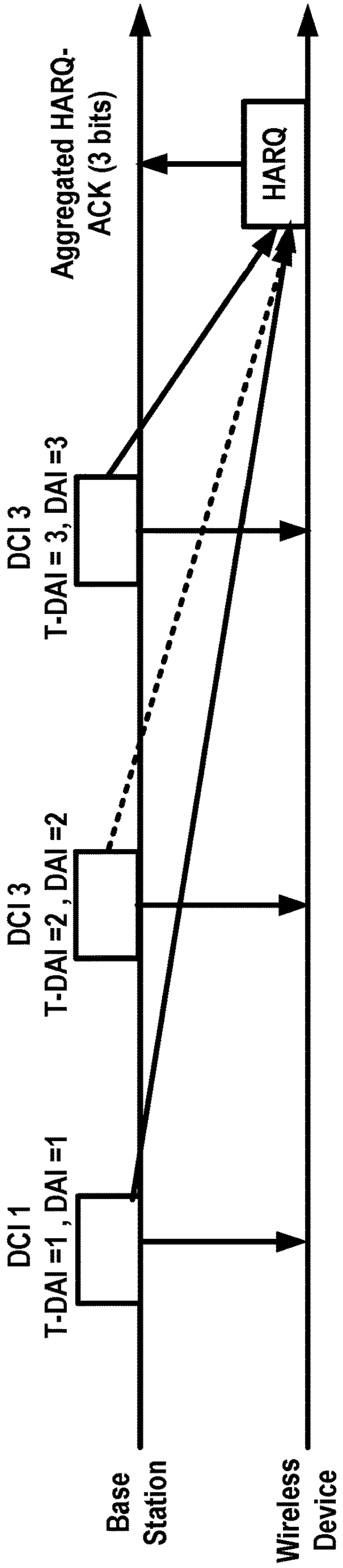
FIG. 21 illustrates an example of a HARQ-ACK codebook determination as per an aspect of an embodiment of the present disclosure.

In an example, a value of a total DAI may denote/represent a total number of {serving, PDCCH monitoring occasion}-pair(s) up to a current PDCCH monitoring occasion across one or more serving cells. FIG. 21 illustrates an example of a counter-DAI (C-DAI or DAI) and a total DAI (T-DAI) when a wireless device is configured with a single serving cell. For example, the wireless device may determine a first monitoring occasion (a left box), a second monitoring occasion (a middle box) and a third monitoring occasion (a right box) in FIG. 21. The wireless device may be scheduled/received DCI(s) based on one or more DCI formats via monitoring occasions (e.g., the first monitoring occasion, the second monitoring occasion, the third monitoring occasion). For example, the wireless device may receive a first DCI (DCI 1) via the first monitoring occasion where the first DCI indicates a DAI=1 and a T-DAI=1. The wireless device may receive a third DCI (DCI 3) via the third monitoring occasion where the third DCI indicates a DAI=3 and a T-DAI=3. The first DCI and the third DCI may indicate a same PUCCH resource for HARQ feedback. The wireless device may generate a first HARQ feedback bit for a PDSCH or a SPS PDSCH release scheduled by the first DCI. The wireless device may generate a third HARQ feedback bit for a second PDSCH or a second SPS PDSCH release by the third DCI. The wireless device may not receive successfully a second DCI via the second monitoring occasion. The wireless device may determine a missed DCI (e.g. the second DCI) based on a DAI value of the third DCI. The wireless device may generate NACK for a third PDSCH or a third SPS PDSCH release based on the second DCI as the wireless device may not receive the third PDSCH or the third SPS PDSCH release. The wireless device may generate HARQ feedback bits for 3 bits, a first bit corresponding to the first DCI, a second bit for the second DCI and a third bit for the third DCI. The wireless device may transmit the HARQ feedback bits via the PUCCH.

Figure 22:
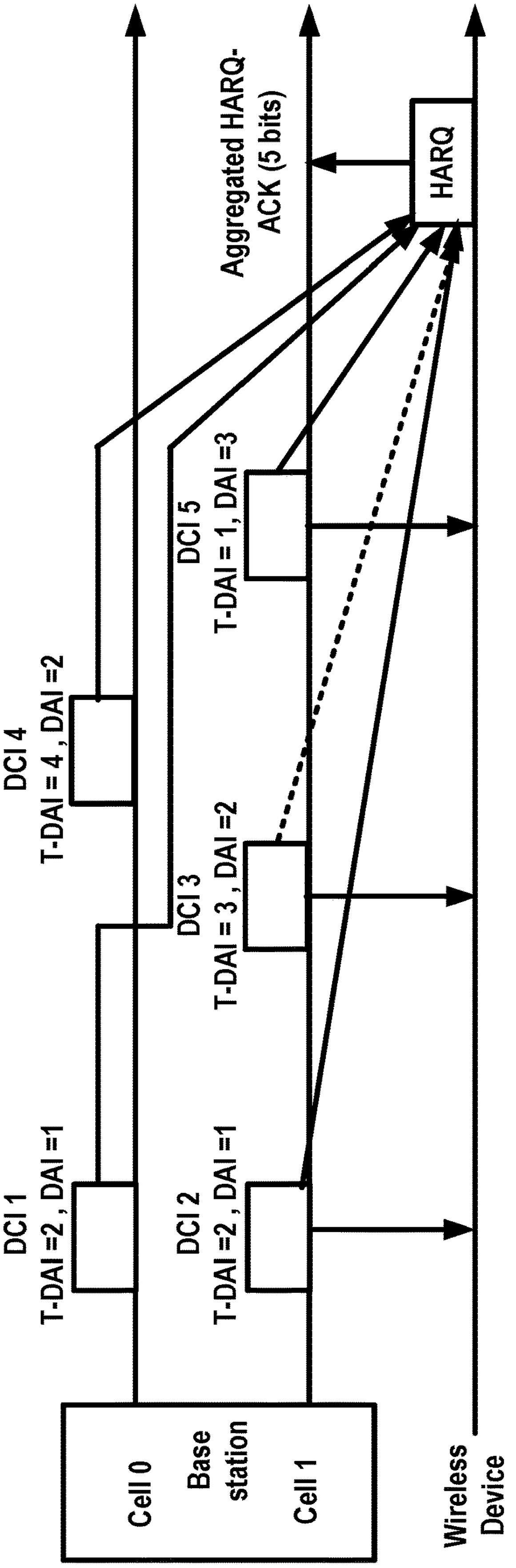
FIG. 22 illustrates an example of HARQ feedback determination with a plurality of serving cells as per an aspect of an embodiment of the present disclosure.

FIG. 22 illustrates an example of HARQ feedback determination when a wireless device is configured with a plurality of serving cells. For example, the wireless device may be configured with a first cell (Cell 0) and a second cell (Cell 1). For example, the wireless device may receive a first DCI via the first cell (DCI 1) that may indicate a DAI=1 and a T-DAI=2. The T-DAI may comprise all PDSCHs and/or SPS PDSCH release(s) scheduled via a same PDCCH monitoring occasion. A first monitoring occasion of the first cell may overlap and may have a same starting time to a first monitoring occasion of the second cell. A base station may set the T-DAI of the first DCI being two. The base station may set a T-DAI of a second DCI (DCI 2) via the second cell. A DAI value of the second DCI may be set to 1 as there is only one PDSCH or SPS PDSCH release scheduled by the second DCI for the second cell. The wireless device may not receive successfully a third DCI (DCI3) that may indicate a T-DAI=3 and DAI=2. The wireless device may receive a fourth DCI (DCI4) with a T-DAI=4 and DAI=2. The wireless device may receive a fifth DCI (DCIS) with a T-DAI=1 and DAI=3. A value of a T-DAI may be wrapped around when it reaches a maximum value or a threshold (e.g., a maximum value=4 based on 2 bits of T-DAI field, a maximum value=2^K or 2^K−1 where K is a number of bits used for a T-DAI field in a DCI format). The wireless device may determine HARQ-ACK bits as follows.

For example, for each PDCCH monitoring occasion (e.g., a first PDCCH monitoring occasion is a first time when the wireless device may monitor a first monitoring occasion via the first cell and a first monitoring occasion via the second cell), the wireless device may determine a number of HARQ-ACK feedback bits for each serving cell based on a cell index (e.g., determine the first cell and then determine the second cell when an index of the first cell is lower than an index of the second cell). For example, the wireless device may determine a number of HARQ-ACK bits for a serving cell based on a DAI field of the each PDCCH monitoring occasion. For example, the wireless device may determine a bit index among HARQ-ACK bits to put ACK or NACK for a transport block or a SPS PDSCH release scheduled by a DCI for the serving cell, where the wireless device may receive the DCI via the each PDCCH monitoring occasion. The wireless device may determine a first HARQ-ACK bit for a transport block of the first cell at the first PDCCH monitoring occasion. The wireless device may determine a second HARQ-ACK bit for a transport block of the second cell at the first PDCCH monitoring occasion. The wireless device may move to a next PDCCH monitoring occasion which occurs after the first monitoring occasion but occur before other monitoring occasions. In FIG. 22, the wireless device may determine a second monitoring occasion via the first cell as the wireless device may not detect any DCI via a second monitoring occasion via the second cell. The wireless device may determine a third HARQ ACK bit corresponding to a PDSCH or a SPS PDSCH release scheduled via the fourth DCI (DCI 4). The wireless device may move to a next PDCCH monitoring occasion, where the wireless device receives a DCI with a DAI value. For example, the wireless device may determine a third monitoring occasion via the second cell as the next PDCCH monitoring occasion. The wireless device may determine a fourth HARQ ACK bit corresponding to a PDSCH or a SPS PDSCH scheduled by the fifth DCI (DCI5).

The wireless device may determine a total DAI value being five, whereas the wireless device may have received four DCIs scheduling PDSCHs and/or SPS PDSCH release(s). The wireless device may determine NACK for a missed DCI between the second DCI and the fourth DCI. The wireless device may generate aggregated HARQ-ACK feedback by ascending order of a start time of a PDCCH monitoring occasion (e.g., the first DCI, the second DCI ➔ (the third DCI ➔) the fourth DCI ➔ the fifth DCI) and for each PDCCH monitoring occasion based on a cell index (e.g., the first cell ➔ the second cell in the first monitoring occasion). If the wireless device may be configured with a plurality of coreset pool indexes for a serving cell, the wireless device may further order based on a coreset pool index (e.g., a first coreset pool ➔ a second coreset pool). When a wireless device may be configured with a plurality of transport blocks for any serving cell, the wireless device may determine two ACK and/or NACK bits for each PDCCH monitoring occasion of a serving cell. The wireless device may transmit 5 bits of HARQ ACK feedback corresponding to DCI1, DCI2, DCI3, DCI4 and DCI5.

In an example, a base station may transmit a plurality of DCIs/PDCCHs, scheduling resource(s) for a transport block of a cell, via a plurality of TRPs or via a plurality of coreset pools or via a plurality of coreset groups. For example, a base station may configure a first TRP (or a first coreset pool) for a first cell via one or more RRC messages. The one or more RRC messages may comprise configuration parameters. The configuration parameters may indicate/comprise the first coreset pool of the first cell. The configuration parameters may indicate/comprise a second coreset pool of the first cell. For example, the second coreset pool may correspond to a second TRP of the first cell. The base station may transmit a first DCI/PDCCH via a first search space of a first coreset of the first coreset pool. The base station may transmit a second DCI/PDCCH via a second search space of a second coreset of the second coreset pool. The first DCI/PDCCH and the second DCI/PDCCH may schedule resource(s) of a transport block. The first/PDCCH and the second DCI/PDCCH may be repeated transmission of a control information. The transport block may be transmitted via the first TRP and the second TRP. The transport block may be transmitted based on a plurality of TCI states. The transport block may be transmitted based on a TCI state, where the TCI state is associated with a plurality of TCI states.

The configuration parameters may indicate/comprise a control channel repetition enabled/configured for the first cell. For example, a parameter of a control channel repetition mode may be configured. The control channel repetition mode may be the first control channel repetition mode or the second control channel repetition mode. The configuration parameters may indicate/comprise a first coreset associated with (or configured with or of) the first coreset pool. The configuration parameters may indicate/comprise a second coreset associated with (or configured with or of) the second coreset pool. The wireless device may determine a pair of the first coreset and the second coreset, where repeated DCI/PDCCHs may be transmitted, based on a rule. For example, the wireless device may determine the first coreset of the first coreset pool based on a search space associated with the first coreset, where the wireless device may monitor a DCI format via the search space. For example, the DCI format may be a DCI format 1_1 or a DCI format 0_1 or a DCI format 1_2 or a DCI format 0_2 (or a DCI format 3_0 or a DCI format 3_1). When there is a plurality of first search spaces, of the first coreset pool, configured with the DCI format, the wireless device may determine the plurality of first coresets of the first coreset pool. Similarly, the wireless device may determine the second coreset of the second coreset pool based on a search space associated with the second coreset, where the wireless device may monitor the DCI format via the search space. When there is a plurality of second search spaces, of the second coreset pool, configured with the DCI format, the wireless device may determine the plurality of second search spaces. In an example, the wireless device may be configured with at most one search space for a DCI format in each coreset pool.

In an example, the wireless device may determine the second coreset of the second coreset pool based on a first coreset index of the first coreset of the first coreset pool. For example, a second index of the second coreset may be the first coreset index+GAP. For example, the GAP may be a determined/predetermined value (e.g., 0, 12). For example, the configuration parameters may comprise a parameter indicating a value of the GAP. In an example, the wireless device may determine the second coreset based on a second search space, associated with the second coreset, and the first search space. For example, an index of the second search space may be a first index of the first search space+SS-GAP. For example, SS-GAP may be a predetermined value (e.g., 20, 0). For example, the wireless device may determine the second coreset and/or the second search space based on an association configured by the configuration parameters. For example, the configuration parameters may indicate/comprise the association between each of a coreset/search space associated with the first coreset pool and each of a coreset/search space associated with the second coreset pool. In an example, the configuration parameters may indicate/comprise a first coreset and/or a first search space of the first coreset pool. The wireless device may monitor a first DCI/PDCCH via the first search space of the first coreset pool. The configuration parameters may indicate/comprise a parameter indicating a control channel repetition across a multi-TRP or a multi-coreset pool for the first coreset or the first search space. Based on the parameter, the wireless device may determine a second coreset or a second search space of the second coreset pool. For example, the wireless device may determine the second coreset based on one or more parameters of the first coreset. For example, a same set of resource blocks configured for the first coreset may be used for the second coreset. For example, monitoring occasions of the first search space may be used for determining monitoring occasions of the second search space.

In an example, a base station may indicate a control channel repetition based on a coreset. For example, the base station may transmit a plurality of DCIs/PDCCHs via the coreset. The base station may transmit the plurality of DCIs/PDCCHs over a plurality of TRPs. The base station may transmit one of more RRC messages and/or MAC CEs indicating a plurality of TCI states are activated for the coreset. For example, the plurality of TCI states may comprise a first TCI state, corresponding to a first TRP of the plurality of TRPs, and a second TCI state, corresponding to a second TRP of the plurality of TRPs. The base station may transmit one or more second RRC messages comprising configuration parameters for the coreset. For example, the configuration parameters may indicate a control channel repetition based on the coreset. The configuration parameters may indicate the control channel repetition across a plurality of TRPs. The configuration parameters may indicate a repetition pattern across the plurality of TRPs. For example, the repetition pattern (e.g., TRP switching pattern) may be [0, . . . , 0, 1, . . . , 1] where 0 may represent a first TRP of the plurality of TRPs and 1 may represent a second TRP of the plurality of TRPs. The base station may indicate a bitmap indicating a number of control channel repetition. Each bit of the bitmap may represent which TRP may transmit i-th repetition. The repetition pattern may be [0, 1, 0, 1, . . . , 0, 1]. The repetition pattern may be [0, 0, . . . , 0, 1, 1, . . . , 1, 0, 0, . . . , 0, 1, 1, . . . , 1]. Various repetition patterns may be considered. Based on the repetition pattern, the wireless device may receive a control channel repetition based on a TCI state of the plurality of TCI states. For example, when the repetition pattern indicates the first TRP, the wireless device may receive the control channel repetition based on the first TCI state. When the repetition indicates the second TRP, the wireless device may receive the control channel repetition based on the second TCI state.

Figure 23:
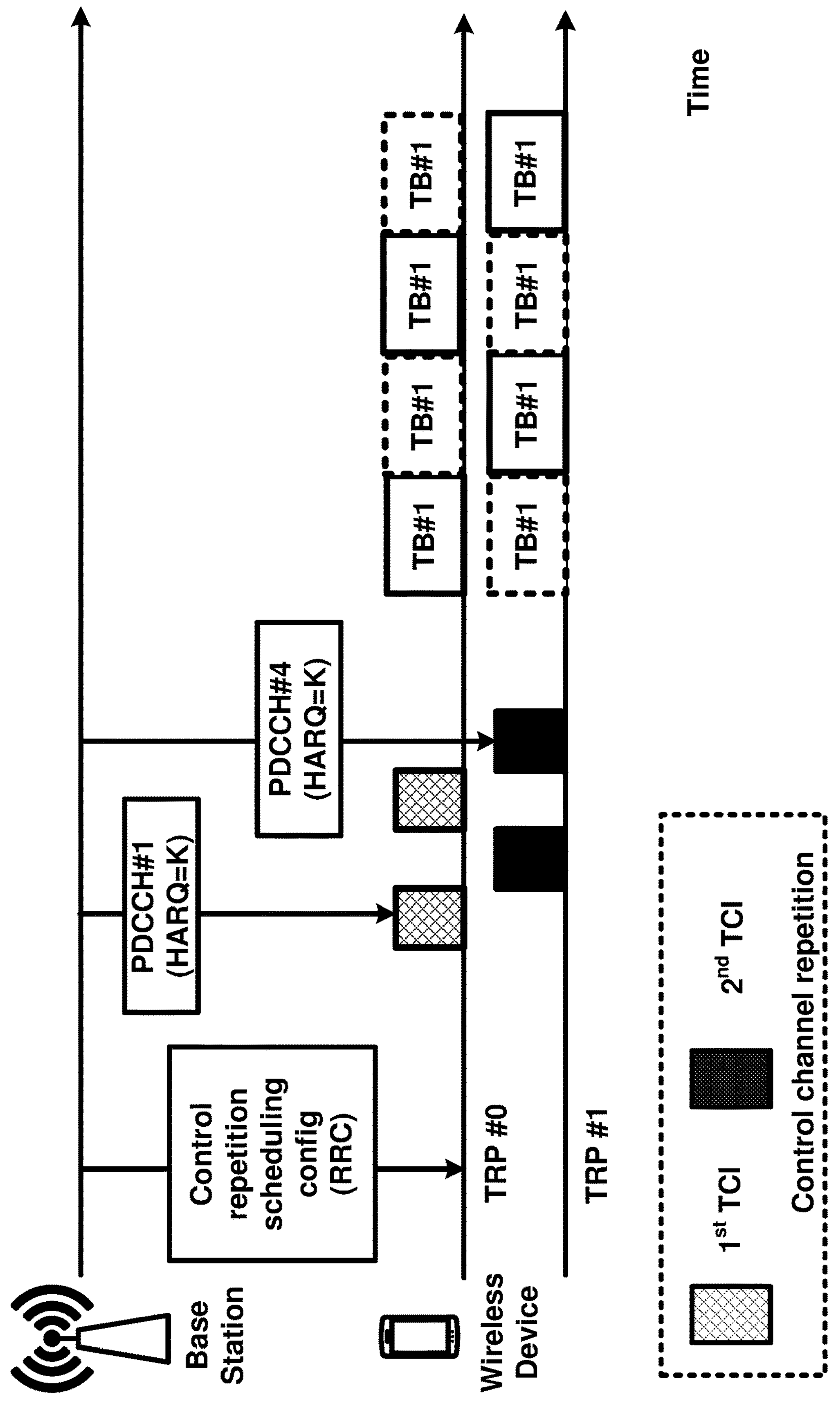
FIG. 23 illustrates an example of control channel repetition across a plurality of TRPs as per an aspect of an embodiment of the present disclosure.

FIG. 23 illustrates an example of control channel repetition across a plurality of TRPs (or a plurality of coreset pools). The base station may transmit one or more RRC messages comprising configuration parameters. The configuration parameters may indicate/comprise a first TRP (TRP #0) and a second TRP (TRP #1) associated with a cell. The configuration parameters may comprise/indicate a control channel repetition across a multi-TRP (e.g., via the first TRP and the second TRP). The base station may transmit a first DCI/PDCCH (e.g., PDCCH #1) via the first TRP or a first coreset pool. The first DCI/PDCCH may comprise/indicate resources scheduling a TB via the multi-TRP. The base station may transmit a second DCI/PDCCH (e.g., PDCCH #2) via the second TRP or a second coreset pool. The second DCI/PDCCH may comprise/indicate the resources scheduling the TB via the multi-TRP. The first DCI/PDCCH and the second DCI/PDCCH may indicate a same HARQ process index (e.g., HARQ-K) scheduling the TB. The base station may transmit a third DCI/PDCCH via the first TRP. The base station may transmit a fourth DCI/PDCCH (e.g., PDCCH #4) via the second TRP. A control information scheduling the TB may be repeated four times via a plurality of TRPs. A wireless device may monitor the first DCI/PDCCH and the third DCI/PDCCH based on a first TCI state, associated with the first TRP or the first coreset pool. The wireless device may monitor the second DCI/PDCCH and the fourth DCI/PDCCH based on a second TCI state, associated with the second TRP or the second coreset pool.

The base station may repeat the TB via four repetitions of the first TRP and via four repetitions of the second TRP. The wireless device may repeat the TB simultaneously via the first TRP and the second TRP when the wireless device may support simultaneous reception via the first TRP and the second TRP. When the wireless device may not support simultaneous reception via the first TRP and the second TRP, the base station may transmit the repeated transmission of the TB via the first TRP and the second TRP based on a time-domain division multiplexing. For example, the base station may transmit a first repetition of the repeated transmission via the first TRP. The base station may transmit a second repetition of the repeated transmission via the second TRP. A switching pattern between the first TRP and the second TRP may be configured by the base station based on RRC/MAC-CE/DCI signaling. The first DCI and the second DCI may schedule the repeated transmissions of the TB. Embodiments of a control channel repetition via a plurality of TRPs may enhance a reliability and lead better QoS experience.

In an example, a base station may transmit one or more RRC messages comprising configuration parameters. The configuration parameters may indicate a control channel repetition enabled for a cell. The base station may transmit a plurality of DCIs/PDCCHs scheduling a transport block via a plurality of coresets of the cell. For example, the configuration parameters may configure a first coreset and a second coreset for the control channel repetition. The configuration parameters may comprise/indicate a first search space associated with the first coreset. The configuration parameters may comprise/indicate a second search space associated with the second coreset. The configuration parameters may comprise/indicate a first TCI state associated with the first coreset. The configuration parameters may comprise/indicate a second TCI state associated with the second coreset. The first TCI state may be same or different from the second TCI state. The configuration parameters may comprise/indicate a set of first TCI states associated with the first coreset. One or more MAC CEs may indicate the first TCI state of the set of the first TCI states for the first coreset. For example, the configuration parameters may comprise/indicate a set of second TCI states associated with the second coreset. One or more second MAC CEs may indicate the second TCI state of the set of the second TCI states for the second coreset. The configuration parameters may indicate the first coreset and the second coreset are associated to schedule repeated DCIs/PDCCHs for a transport block.

In an example, the configuration parameters may indicate/comprise a search space associated with the first coreset and the second coreset. The configuration parameters may indicate/comprise a plurality of coreset indexes. The configuration parameters may comprise a coreset index, of the plurality of coreset indexes, indicating the first coreset. The configuration parameters may indicate/comprise one or more indexes, of the plurality of coreset indexes, of repeated/additional coresets (e.g., coresets used for a control channel repetition in addition to the first coreset, the second coreset). For example, an index of the one or more indexes may indicate the second coreset. When the first coreset and the second coreset are associated for a control channel repetition, first parameters of the first coreset and second parameters of the second coreset may have restriction in terms of configuration. For example, a set of resource blocks (RB) in frequency domain of the first coreset may be same to (or a subset of or a superset of) a set of resource block in frequency domain of the second coreset. The wireless device may determine a set of RBs belonging to the first coreset and the second coreset for the control channel repetition. For example, a first duration of the first coreset may be same to a second duration of the second coreset. For example, a number of REGs of the first coreset may be same as a number of REGs. For example, a number of CCEs of the first coreset may be same as (or less than or larger than) a number of CCEs of the second coreset. The wireless device may determine a number of REGs based on the determined set of RBs or based on the set of RBs of the first coreset. For example, a first CCE-to-REG mapping type of the first coreset (e.g., between interleaved or non-interleaved) may be same as a second CCE-to-REG mapping type of the second coreset. For example, a precoder granularity of the first coreset may configured as same to a precoder granularity of the second coreset. For example, a first tci-PresenceInDCI of the first coreset may same as a second tci-PresenceInDCI of the second coreset. For example, a first rb-Offset of the first coreset may be same as a second rb-Offset of the second coreset.

The first coreset and the second coreset may have potentially different configurations for one or more parameters. For example, the one or more parameters may comprise one or more TCI states. For example, the one or more parameters may comprise DM-RS scrambling identity (e.g., pdcch-DMRS-ScramblingID). For example, the one or more parameters may comprise a coreset pool index (e.g., coresetPoolIndex). For example, the one or more parameters may comprise a coreset index.

When the wireless device receives first configuration parameters of the first coreset and second configuration parameters of the second coreset, the wireless device determines whether a first number of CCEs of the first coreset is equal to or smaller (or larger) than a second number of CCEs of the second coreset. Based on the determining, the wireless device may consider the first coreset and the second coreset may be used for a control channel repetition. Otherwise, the wireless device may determine the first coreset and the second coreset may not be used for the control channel repetition. Alternatively, the wireless device may determine a smallest number of CCEs (e.g., M) among one or more number of CCEs of one or more coresets (e.g., determine a coreset of the one or more coresets with a smallest number of CCEs). For example, the one or more coresets may be configured/indicated/used for a control channel repetition. The wireless device may determine/assume/consider that first M candidates of each coreset of the one or more coresets are used for the control channel repetition.

In an example, a wireless device may determine a number of REGs of a first coreset of one or more coresets configured for a control channel repetition. The wireless device may determine a second number of REGs of a second coreset of the one or more coresets. The wireless device may determine whether the number of REGs is equal to the second number of REGs. In response to the determining the number of REGs being equal to the second number of REGs, the wireless device may consider the control channel repetition is configured via the first coreset and the second coreset. Otherwise, the wireless device may consider the configuration as an error case and may not activate the control channel repetition via the first coreset and the second coreset. In an example, the wireless device may determine a smallest number of REGs of the one or more coresets (e.g., determine a coreset with a smallest number of REGs). The wireless device may assume that the smallest number of REGs used for the control channel repetition.

The configuration parameters of the search space, associated with the first coreset and the second coreset, may comprise/indicate a switching pattern or mapping pattern of the first coreset and the second coreset. For example, the wireless device may determine a search space monitoring occasion based on the configuration parameters of the search space. The wireless device may determine the search space monitoring occasion based on the first coreset. The wireless device may determine a second search space monitoring occasion or an extended monitoring occasion based on a rule. For example, the wireless device may determine the second search space monitoring occasion as a next slot of the first monitoring occasion. The wireless device may determine the second search space monitoring occasion based on the second search space. The configuration parameters may indicate a bitmap of a number of OFDM symbols in a slot (or of a number of slots e.g., a multiple slots). The bitmap may indicate 0 for the first coreset or 1 for the second coreset for each corresponding OFDM symbol or a slot. When 0 is indicated for a OFDM symbol, the wireless device may monitor a search space monitoring occasion based on the first coreset. When 1 is indicated for a second OFDM symbol, the wireless device may monitor a second search space monitoring occasion based on a second coreset.

In an example, a wireless device may receive one or more RRC messages comprising configuration parameters. The configuration parameters may indicate/comprise a coreset of a bandwidth part of a cell. The configuration parameters may comprise parameters of a search space associated with the coreset. The parameters of the search space may indicate a first monitoring periodicity in a unit of a first time duration. For example, the first time duration may be a slot or a few slots. The parameters of the search space may indicate a second monitoring periodicity in a unit of a second time duration. For example, the second time duration may be an OFDM symbol or a few OFDM symbols or a slot. For example, the second time duration may be smaller than the first time duration. The wireless device may monitor one or more repeated DCIs/PDCCHs via one or more monitoring occasions determined based on the second monitoring periodicity within the first monitoring periodicity. For example, the configuration parameters may indicate the one ore monitoring occasions within the first monitoring periodicity.

For example, the wireless device may receive/monitor a first DCI/PDCCH of the one or more repeated DCIs/PDCCHs via a first monitoring occasion of the one or more monitoring occasions. The wireless device may receive/monitor a second DCI/PDCCH of the one or more repeated DCIs/PDCCHs via a second monitoring occasion of the one or more monitoring occasions. The first DCI/PDCCH may be same as the second DCI/PDCCH. The first DCI/PDCCH and the second DCI/PDCCH may indicate same resource(s) for a transport block. The wireless device may receive/monitor a DCI via the one or more monitoring occasions, where a search space candidate for the DCI may comprise one or more candidates of the one or more monitoring occasions. For example, the search space candidate may comprise a first candidate of the first monitoring occasion and a second candidate of the second monitoring occasion. For example, a first starting CCE index of the first candidate of the first monitoring occasion may be same as a second starting CCE index of the second candidate of the second monitoring occasion.

The wireless device may receive/monitor the DCI/PDCCH via the one or more monitoring occasions, where the search space candidate for the DCI/PDCCH may comprise one or more CCEs from the one or more monitoring occasions.

For example, the coreset may be associated with a plurality of TCI states as active TCI states. For example, the plurality of TCI states may be activated via one or more RRC messages or MAC CEs or DCIs. The wireless device may monitor the first monitoring occasion based on a first TCI of the plurality of TCI states. The wireless device may monitor the second monitoring occasion based on a second TCI of the plurality of TCI states.

Figure 24:
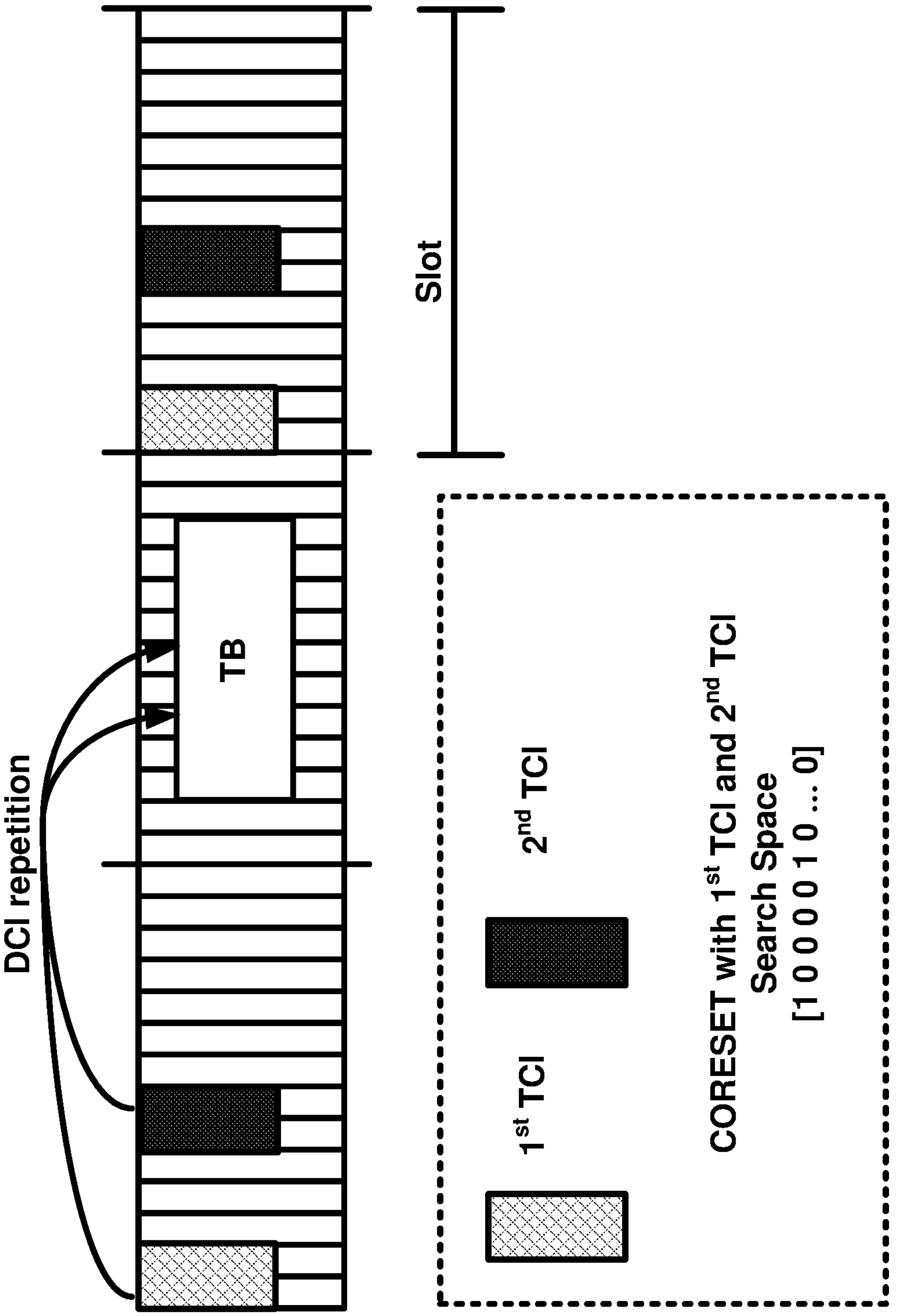
FIG. 24 illustrates an example of control channel repetition based on a coreset and a search space with a repetition as per an aspect of an embodiment of the present disclosure.

FIG. 24 illustrates an example of control channel repetition based on a coreset and a search space with a repetition configured. For example, a base station may transmit one or more RRC messages comprising configuration parameters. The configuration parameters may comprise/indicate a coreset associated with one or more active TCI states. A base station may activate the one or more active TCI states via the one or more RRC messages or one or more MAC CEs or one or more DCIs. The configuration parameters may comprise/indicate a bitmap indicating one or more monitoring occasions for a control channel repetition. FIG. 24 illustrates that a bitmap size is 14 (e.g., the bitmap corresponds to a slot where each bit maps to each OFDM symbol). The bitmap indicates monitoring occasions of 1st OFDM symbol and 6th OFDM symbol of a slot. The configuration parameters may indicate/comprise a first monitoring periodicity as two slots (e.g., monitor in every two slots). In each monitoring periodicity, the wireless device may determine one or more monitoring occasions based on the bitmap. For example, when the bitmap is not present, the wireless device may determine a monitoring occasion starting at a first OFDM symbol of a slot. In the example of FIG. 24, the wireless device may determine a first monitoring occasion and a second monitoring occasion based on the bitmap in each monitoring periodicity. The wireless device may monitor the first monitoring occasion and the second monitoring occasion for receiving one or more DCIs/PDCCHs scheduling a transport block.

In an example, a base station may associate a plurality of TCI states with a coreset as active TCI states. FIG. 24 illustrates an example of a coreset being associated with a plurality of TCI states as active TCI states. In the example, the base station may indicate a plurality of monitoring occasions within a slot or in a monitoring periodicity for a control channel repetition. A wireless device may monitor a first monitoring occasion based on a first TCI state of the plurality of TCI states. The wireless device may monitor a second monitoring occasion based on a second TCI state of the plurality of TCI states. The base station may indicate a pattern to switch between the plurality of TCI states. For example, configuration parameters of a search space associated with the coreset may comprise/indicate enabling a control channel repetition. The configuration parameters may comprise/indicate enabling a TCI switching or enabling the control channel repetition via a plurality of TCI states. The configuration parameters may comprise/indicate a switching pattern. For example, the switching pattern may be an alternating between a first TCI state of the plurality of TCI states and a second TCI state of the plurality of TCI states in each monitoring occasion of one or more monitoring occasions within a monitoring periodicity or a slot or within a few slots (e.g., between a monitoring periodicity configured by monitoringSlotPeriodicityAndOffset parameter of the search space). For example, the switching pattern may be an half-half between the first TCI state and the second TCI state. For example, a number of the one or more monitoring occasions is K. The wireless device may monitor first floor (K/2) monitoring occasion(s) based on the first TCI state. The wireless device may monitor remaining monitoring occasion(s) based on the second TCI state within the monitoring periodicity. For example, the switching pattern may be a bitmap to indicate a TCI state in each monitoring occasion of the one or more monitoring occasions.

FIG. 25 illustrates example parameters of a search space to configure one or more monitoring occasions within a monitoring periodicity. For example, monitoringSlotPeriodicityAndOffset may determine the monitoring periodicity. When parameters may comprise a monitoringSymbolWithinSlot, the wireless device may determine the monitoring periodicity based on a gap between each monitoring occasion within the slot based on the monitoringSymbolWithinSlot. The wireless device may expect an equal interval between monitoring occasions within the slot. Alternatively, the parameters may not comprise the monitoring SymbolsWithinSlot when the search space is used for a control channel repetition. In an example, the monitoringSymbolsWithinSlot may be used to indicate the one or more monitoring occasions within a monitoring periodicity determined based on the monitoringSlotPeriodicityAndOffset when a control channel repetition is enabled. For example, a parameter to indicate enabling of the control channel repetition may be configured for the search space or for a coreset associated with the search space or a DCI format monitored via the search space. For example, a duration of the search space may be used to determine the one or more monitoring occasions within the monitoring periodicity. For example, when the monitoring periodicity is larger than a slot, the wireless device may determine the one or more monitoring occasions based on the monitoring periodicity and the duration. For example, when the monitoring periodicity is P slots and the duration is D, the wireless device may determine a first monitoring occasion of the one or more monitoring occasions based on the monitoringSlotPeriodicityAndOffset. The wireless device may determine a second monitoring occasion of the one or more monitoring occasions as a next slot of the first monitoring occasion. The wireless device may determine D number of monitoring occasions starting from the first monitoring occasions in consecutive slots. For example, when a search space is configured/associated with a plurality of coresets, the search space may comprise a plurality of control resource set Id (e.g., a controlResourceSetID and a second controlResourceSetID).

In an example, a base station may transmit one or more messages comprising configuration parameters. The configuration parameters may comprise/indicate a search space group for a control channel repetition. The search space group may comprise one or more search spaces. For example, the search group may comprise a first search space of a first carrier and a second search space of a second carrier. For example, the search space group may comprise a first search space of a first BWP of a cell and a second search space of a second BWP of the cell. For example, the search space group may comprise a first search space of first BWP of a first cell and a second search space of a second BWP of a second cell. For example, for a BWP of a cell, the configuration parameters may indicate one or more search space groups. A search space group of the one or more search space groups may be associated/configured with one or more DCI formats. In an example, a wireless device may determine a search space group based on one or more search spaces configured/associated with the BWP of the cell, where each search space of the one or more search spaces may be configured to monitor a DCI format of the one or more DCI formats. For example, the one or more DCI formats may comprise a DCI format 1_1 and a DCI format 0_1. For example, the one or more DCI formats may comprise a DCI format 0_0 and a DCI format 1_0. For example, the one or more DCI formats may comprise a DCI format 1_2 and a DCI format 0_2. For example, the one or more DCI formats may comprise a DCI format 3_0 and a DCI format 3_1. For example, the one or more DCI formats may comprise downlink/uplink DCIs of non-fallback DCIs. For example, the one or more DCI formats may comprise downlink/uplink DCIs of fallback DCIs. For example, the one or more DCI formats may comprise DCI format(s) of sidelink DCIs.

The wireless device may determine a search space candidate over the one or more search space of the search space group in a similar manner addressed for a control repetition based on a plurality of coresets. In an example, the wireless device may determine one or more monitoring occasions in a slot based on the one or more search spaces. For example, in a slot n, the wireless device may determine one or more first monitoring occasions based on a first search space of the one or more search spaces. The wireless device may determine, in the slot n, one or more second monitoring occasions based on a second search space of the one or more search spaces. The wireless device may monitor the one or more first monitoring occasions and the one or more second monitoring occasions in the slot n. The wireless device may not expect to have overlap between a monitoring occasion of a search space of the one or more search spaces and a second monitoring occasion of a second search space of the one or more search spaces in a time domain. The wireless device may monitor one or more repeated DCIs based on the DCI format via the one or more monitoring occasions in the slot.

In an example, the one or more repeated DCIs may be transmitted via one or more PDCCHs, where each PDCCH may carry/transmit each DCI. Each DCI of the one or more repeated DCIs may have same content or different content. The wireless device may aggregate the one or more repeated DCIs when the each DCI may have same content. In an example, the one or more repeated DCIs may be transmitted via a PDCCH, where the PDCCH may be transmitted over one or more search space candidates of the one or more search spaces. In an example, a DCI may be transmitted repeatedly via one or more PDCCHs, where each PDCCH may carrier/transmit the DCI repeatedly.

In an example, a wireless device may transmit one or more HARQ-ACK feedback bits via a PUCCH in a slot n. The one or more HARQ-ACK feedback bits may correspond to one or more PDSCHs and/or one or more SPS PDSCH releases received via one or more slots. For example, the one or more slots may have offset/gap values from the slot n, wherein a offset/gap value of the offset/gap values may be indicated as a PDSCH-to-HARQ feedback timing indicator by a DCI scheduling a PDSCH of the one or more PDSCHs or releasing a SPS PDSCH release of the one or more SPS PDSCH releases. For example, the one or more slots may comprise slot n−1, slot n−2, . . . , slot n−k, where k is a maximum offset value or a maximum value used for the PDSCH-to-HARQ feedback timing indicator. The DCI may also indicate/comprise a current downlink assignment index (C-DAI or DAI) that may represent an accumulative number of transport blocks or an accumulative number of receptions of PDSCH(s) and/or an accumulative number of SPS PDSCH release(s) up to a monitoring occasion of a cell. For example, the DCI may be received via the monitoring occasion of the cell. The DCI may also indicate total DAI (T-DAI) that may represent a total number of transport blocks or a total number of receptions of PDSCH(s) and/or a total number of SPS PDSCH release(s) up to a PDCCH monitoring occasion across one or more serving cells.

In an example, a PDCCH monitoring occasion may comprise one or more monitoring occasions. For example, a first monitoring occasion of the one or more monitoring occasion may have a same starting time to a second monitoring occasion of the one or more monitoring occasion. For each PDCCH monitoring occasion, a base station may indicate a total number of HARQ-ACK feedback bits via a value of the T-DAI via a DCI. The wireless device may determine the HARQ-ACK feedback bits based on the C-DAI/T-DAI when the wireless device is configured with a dynamic (or Type-2) HARQ-ACK codebook determination.

In an example, a wireless device may have a plurality of PDCCH monitoring occasions that may map to a transmission of a PUCCH in a slot n. The wireless device may determine a first number of HARQ-ACK feedback bits in a first PDCCH monitoring occasion of the plurality of PDCCH monitoring occasions. The wireless device may determine a second number of HARQ-ACK feedback bits in a second monitoring occasion of the plurality of PDCCH monitoring occasions. The wireless device may determine a k-th number of HARQ-ACK feedback bits in a k-th PDCCH monitoring occasion of the plurality of PDCCH monitoring occasions. For example, each PDCCH monitoring occasion may comprise one or more monitoring occasions across one or more serving cells. For each monitoring occasion of the one or more monitoring occasions, the wireless device may check/determine whether the wireless device has received a DCI comprising/indicating C-DAI/DAI and/or T-DAI. In response to the DCI, the wireless device may determine one or more HARQ-ACK feedback bits corresponding to a PDSCH scheduled by the DCI or a SPS PDSCH release indicated by the DCI.

Figure 26:
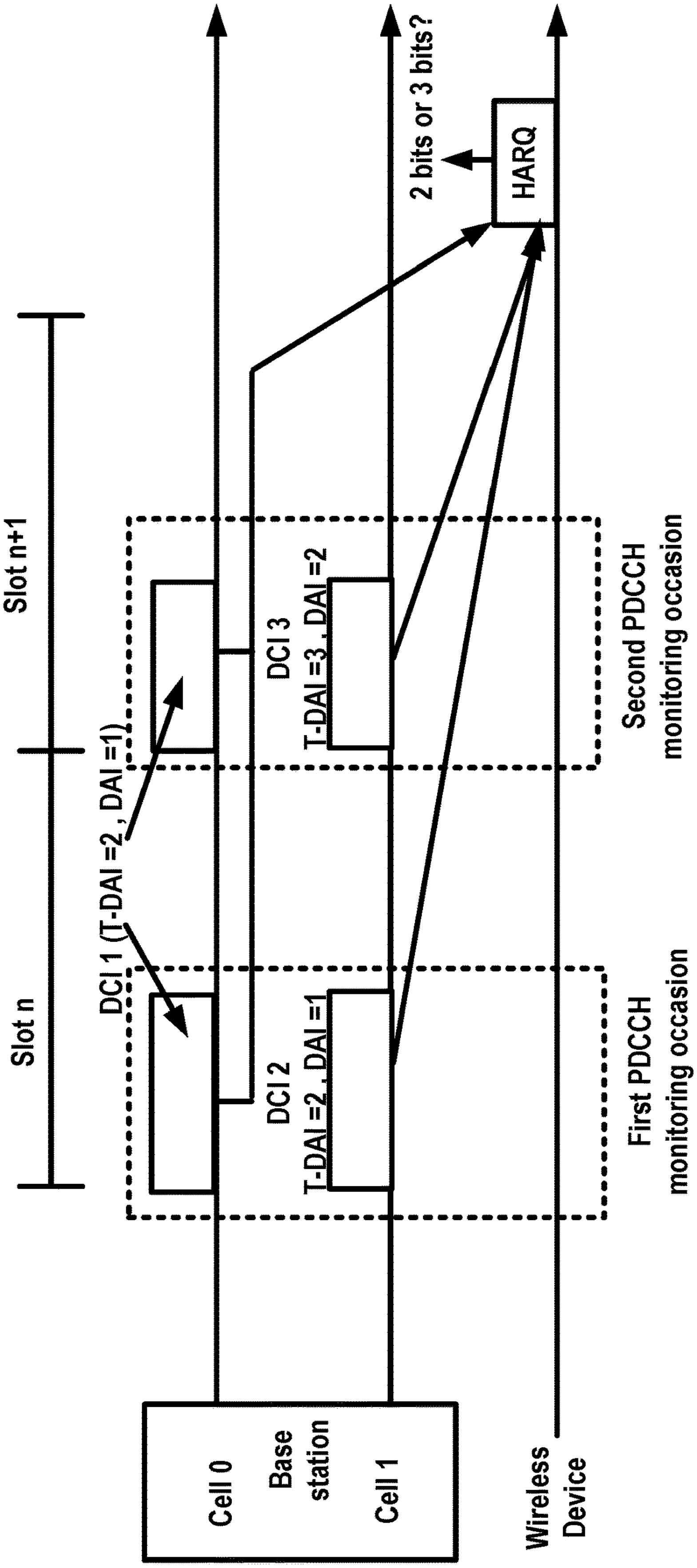
FIG. 26 illustrates an example scenario of a HARQ-ACK codebook determination as per an aspect of an embodiment of the present disclosure.

In an example, a wireless device may receive a DCI via a plurality of PDCCHs via a plurality of monitoring occasions. For example, the wireless device may receive a DCI with a repetition to compensate coverage loss with a higher frequency or with a reduced transmission power, and/or the like. When the wireless device receives the DCI via the plurality of monitoring occasions, existing mechanisms of HARQ-ACK codebook determination in each PDCCH monitoring occasion may lead ambiguous HARQ-ACK codebook determination. FIG. 26 illustrates an example. For example, the wireless device may receive a first DCI (DCI 1) via a first monitoring occasion of a first cell (Cell 0) in slot n and a second monitoring occasion of the first cell in slot n+1. The wireless device may receive a second DCI (DCI 2) via a third monitoring occasion of a second cell (Cell 1) in slot n. The wireless device may receive a third DCI (DCI 3) via a fourth monitoring occasion of the second cell in slot n+1. The first DCI may indicate a C-DAI=1 and T-DAI=2 in the first monitoring occasion and the second monitoring occasion. The second DAI may indicate a C-DAI=1 and T-DAI=2. The third DCI may indicate C-DAI=2 and T-DAI=3. The wireless device may determine a first PDCCH monitoring occasion comprising the first monitoring occasion and the third monitoring occasion. The wireless device may determine a second PDCCH monitoring occasion comprising the second monitoring occasion and the fourth monitoring occasion. The wireless device may determine a T-DAI value of the first DCI and a T-DAI value of the third DCI in the second PDCCH monitoring occasion being different. This may lead existing mechanisms to treat this case as an error case, and the wireless device may produce either two bits of HARQ-ACK feedback bits based on T-DAI=2 of the first DCI or three bits of HARQ-ACK feedback bits based on T-DAI=3 of the third DCI. This may lead ambiguity in a HARQ-ACK codebook determination.

In an example, a wireless device may determine a primary monitoring occasion of a plurality of monitoring occasions for a repetition of a DCI. For example, the wireless device may determine a first monitoring occasion of the plurality of monitoring occasion as the primary monitoring occasion. In FIG. 26, the wireless device may determine a first monitoring occasion of the first cell as the primary monitoring occasion. The wireless device may determine the first monitoring occasion of the second cell as a primary monitoring occasion. The wireless device may determine the second monitoring occasion of the second cell as a primary monitoring occasion. The wireless device may determine other monitoring occasion(s) as secondary monitoring occasion(s). For example, the wireless device may determine the second monitoring occasion of the first cell as a second monitoring occasion. The wireless device may determine a number of HARQ-ACK bits based on a C-DAI/T-DAI of a DCI/PDCCH transmitted/received via a primary monitoring occasion. For example, the wireless device may determine T-DAI of the third DCI as a T-DAI value and may ignore a T-DAI value of the first DCI via the second monitoring occasion of the first cell. The wireless device may determine a PDCCH monitoring occasion that comprise one or more primary monitoring occasions. The wireless device may ignore one or more second monitoring occasions in a HARQ-ACK codebook determination procedure. In FIG. 26, the wireless device may determine a T-DAI value of the third DCI as the T-DAI value for the second PDCCH monitoring occasion. The wireless device may generate/determine three HARQ-ACK feedback bits based on the T-DAI value of the third DCI. The wireless device may determine that the second PDCCH monitoring occasion may comprise only the second monitoring occasion of the second cell without comprising the second monitoring of the first cell.

Embodiments may reduce ambiguity in terms of HARQ feedback codebook size and an order of HARQ-ACK feedback bits for one or more transport blocks/SPS PDSCH releases for one or more serving cells. Embodiments may allow mixing HARQ-ACK feedbacks corresponding to one or more DCIs with repetition and one or more second DCIs with a single transmission. Embodiments may enhance HARQ-ACK feedback mechanism for various scenarios.

In an example, a wireless device may receive a DCI with a repetition. A base station may transmit the DCI via a plurality of PDCCHs via a plurality of monitoring occasions. The base station may transmit a plurality of first DCIs via the plurality of PDCCHs. The wireless device may aggregate the plurality of first DCIs to generate the DCI. The wireless device may aggregate the plurality of PDCCHs to generate the DCI. The DCI may indicate/comprise PDSCH-to-HARQ feedback timing indicator field. The DCI may also indicate/comprise a number of repetitions used for the DCI with the repetition. The base station may transmit one or more RRC messages comprising/indicating configuration parameters. The configuration parameters may indicate/comprise a maximum number of repetitions for the DCI with the repetition. The configuration parameters may indicate a list of a set of monitoring occasions associated with one or more search spaces and/or one or more coresets, where the wireless device may monitor a DCI with a repetition via a set of monitoring occasions. For example, each set of monitoring occasions may comprise a starting monitoring occasion, where the base station and the wireless device may determine the DCI with the repetition may be started to be transmitted/received, and a number of monitoring occasions or a number of slots or a number of opportunities or a number of repetition, where the wireless device and the base station may determine the DCI with the repetition may be ended to be transmitted/received. In an example, the base station may transmit the DCI with smaller repetition count than the number of repetition or the number of monitoring occasion. The base station may indicate a number of actual repetitions of a DCI via the DCI with the repetition. The number of actual repetitions may be smaller or equal to the number of monitoring occasions or the number of repetitions.

In an example, the wireless device may determine a first slot or a first OFDM symbol and slot for a transmission of a PUCCH, where the PUCCH may comprise HARQ feedback corresponding to the DCI with the repetition (e.g., one or more PDSCHs and/or one or more SPS releases scheduled by the DCI with the repetition). For a convenience, the DCI with the repetition may be referred as R-DCI. The wireless device may apply the PDSCH-to-HARQ feedback timing indicator field between a slot n, where a last (or a first) transmission of the one or more PDSCHs occurs, and a first slot of the PUCCH, where a first transmission of one or more PUCCHs occurs (e.g., repetitio for the PUCCH/HARQ feedback) or which is a start time of the transmission of the PUCCH. The wireless device may apply the PDSCH-to-HARQ feedback timing indicator field between a slot n, where a last (or a first) transmission of the plurality of PDCCHs for the DCI occurs, and the first slot of the PUCCH. The wireless device may determine monitoring occasions for monitoring R-DCIs based on one or more candidate values used/indicated via a PDSCH-to-HARQ feedback timing indicator field of a R-DCI and a slot offset K0 provided by time domain resource assignment field in the R-DCI scheduling one or more PDSCHs and/or one or more SPS PDSCH releases.

In an example, a wireless device may determine a set of PDCCH monitoring occasions for monitoring a R-DCI based on a DCI format scheduling one or more PDSCHs and/or one or more SPS PDSCH releases as a union of starting monitoring occasions across active DL BWPs of configured serving cells. For example, the set of PDCCH monitoring may comprise a PDCCH monitoring occasion for a R-DCI based on the DCI format. For example, the PDCCH monitoring occasion is a monitoring occasion, where the wireless device may monitor a first repetition of the R-DCI based on the DCI format. The wireless device may monitor one or more remaining repetitions of the R-DCI via one or more monitoring occasions after the monitoring occasion based on a number of repetitions of the R-DCI. For example, the wireless device may be configured with 4 repetitions for a R-DCI. The wireless device may be configured with monitoring occasions where a monitoring occasion occurs in each slot. The wireless device may be configured with a monitoring occasion in a slot n where n % R=0 (e.g., R=a number of repetitions, R=4) as a starting monitoring occasion for a R-DCI. The wireless device may monitor slot n, n+1, n+2 and n+3 for 4 repetition of PDCCHs conveying the R-DCI. The slot n is a starting slot and the monitoring occasion in the slot n may be called as a starting monitoring occasion or a primary monitoring occasion. Three monitoring occasions (e.g., remaining monitoring occasions) may be called as repetition monitoring occasions or secondary monitoring occasions.

Figure 27:
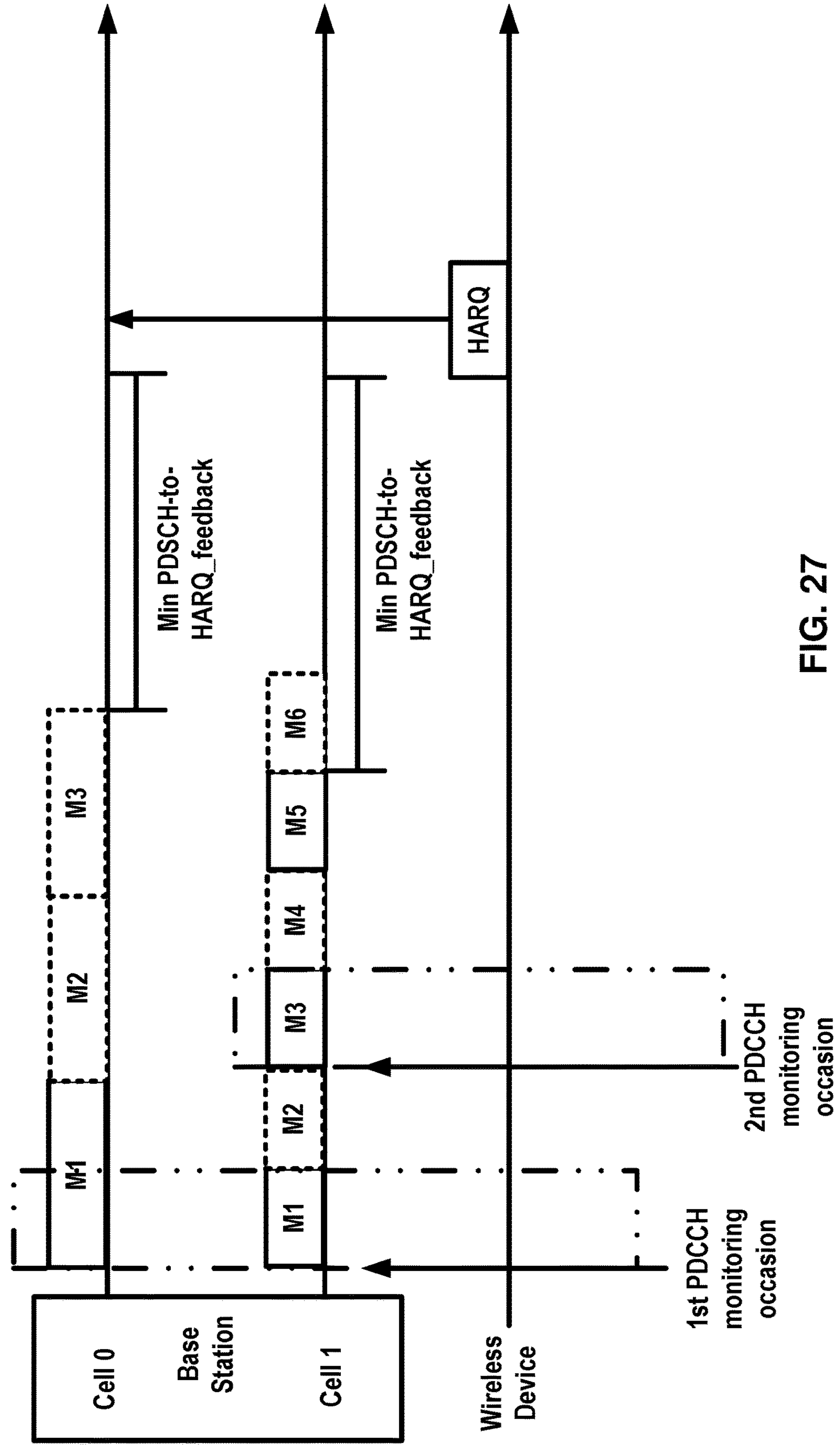
FIG. 27 illustrates an example diagram of one or more primary monitoring occasions as per an aspect of an embodiment of the present disclosure.

In an example, a wireless device may determine a set of PDCCH monitoring occasions for monitoring a R-DCI based on a DCI format scheduling one or more PDSCHs and/or one or more SPS PDSCH releases as a union of primary monitoring occasions across active DL BWPs of configured serving cells. The set of PDCCH monitoring occasions may not comprise one or more secondary or repetition monitoring occasions. FIG. 27 illustrates an example diagram of one or more primary monitoring occasions (e.g., starting monitoring occasions) and one or more secondary monitoring occasions (e.g., remaining monitoring occasions). For example, a base station may configure a first cell (Cell 0) and a second cell (Cell 1) to a wireless device. The base station may transmit one or more RRC messages comprising/indicating configuration parameters. The configuration parameters may indicate/comprise a number of maximum repetitions of a DCI format via the first cell as a first number (e.g., three). The configuration parameters may indicate/comprise a number of maximum repetitions of a second DCI format via the second cell as a second number (e.g., two). The configuration parameters may indicate/comprise one or more search spaces and/or one or more coresets for monitoring occasions, where the wireless device monitors first R-DCIs via the first cell. The configuration parameters may indicate/comprise one or more second search spaces and/or one or more second coresets for monitoring occasions, where the wireless device monitors second R-DCIs via the second cell. The configuration parameters may indicate/comprise a slot offset or a monitoring occasion offset for the first R-DCIs.

The wireless device may determine a first starting monitoring occasion based on the slot offset or the monitoring occasion offset. For example, the slot offset may be K. The wireless device may determine a monitoring occasion in slot n as the first starting monitoring occasion where the n=K. The wireless device may determine n+R1 as a next starting monitoring occasion or a next primary monitoring occasion for the first R-DCIs. For example, R1 is a number of maximum repetition of the first DCI format. The wireless device may determine n+k*R1 (e.g., k=0, 1, . . . ) as primary monitoring occasions for the first R-DCIs based on the first DCI format. The wireless device may determine m+k*R2 (e.g., k=0, 1, . . . ) where m is a first slot index or a monitoring occasion offset and R2 is a number of maximum repetition of second R-DCIs based on the second DCI format. Embodiments may reduce ambiguity in a HARQ-ACK codebook determination with a DCI repetition. Embodiments may simplify a wireless device complexity or reduce processing by reducing a number of monitoring occasions to check for a HARQ-ACK codebook determination.

FIG. 27 illustrates that R1 is 3 for the first cell for the first DCI format. R2 is 2 for the second cell for the second DCI format. For the first cell, the wireless device may determine M1 as a primary/starting monitoring occasion and determine M2 and M3 as secondary/remaining monitoring occasions. For the second cell, the wireless device may determine M1, M3 and M5 as primary/starting monitoring occasions and determine M2, M4 and M6 as secondary/remaining monitoring occasions. For example, the wireless device may determine a transmission of a PUCCH (e.g., shown as a box with HARQ label in FIG. 27). The wireless device may determine a set of PDCCH monitoring occasions based on a first PDSCH-to-HARQ feedback timing indicator for the first cell and a second PDSCH-to-HARQ feedback timing indicator for the second cell. The wireless device may determine the set of PDCCH monitoring occasions that comprise one or more starting/primary monitoring occasions. The set of PDCCH monitoring occasions may not comprise one or more secondary/remaining monitoring occasions. In FIG. 27, the wireless device may determine that the set of PDCCH monitoring occasions comprise M1 of the first cell and M1 and M3 of the second cell.

The wireless device may not determine a primary monitoring occasion as the set of PDCCH monitoring occasion for the PUCCH, wherein a timing offset/difference between a last monitoring occasion associated with the primary occasion and a first/start time of the PUCCH is less than a minimum PDSCH-to-HARQ feedback timing indicator. For example, the set of PDCCH monitoring occasions for the PUCCH may not comprise the M5 of the second cell as a last monitoring occasion (M6) associated with M5 may occur within a minimum timing offset for candidate value(s) of the PDSCH-to-HARQ feedback timing indicator field. In an example, the wireless device may not determine a primary monitoring occasion as the set of PDCCH monitoring occasion for the PUCCH, wherein a timing offset/difference between a last monitoring occasion of one or more monitoring occasions, of a plurality of candidate monitoring occasions for a R-DCI, carried one or more PDCCHs for the R-DCI is less a minimum PDSCH-to-HARQ feedback timing indicator. For example, the set of PDCCH monitoring occasions for the PUCCH may comprise the M5 of the second cell if a R-DCI with a repetition number=1 via a last monitoring occasion (M5) of a PDCCH for the R-DCI is received before a minimum timing offset for candidate value(s) of the PDSCH-to-HARQ feedback timing indicator field. This may apply for a case where the wireless device is configured with a Type-2 HARQ-ACK codebook determination.

For the transmission of the PUCCH (HARQ), the wireless device may determine that the set of PDCCH monitoring occasions that are union of valid starting/primary monitoring occasions. The wireless device may determine a starting/primary monitoring occasion is valid based on whether a last monitoring occasion associated with the starting/primary monitoring occasion meets timing/delay requirement to a start time of a corresponding transmission of a PUCCH. The wireless device may further determine the starting/primary monitoring occasion is valid further based on a K0 value based on time domain resource assignment entries may schedule a PDSCH or a SPS release.

Based on the set of PDCCH monitoring occasions, the wireless device may determine one or more HARQ-ACK bits via the transmission of the PUCCH. The wireless device may determine the one or more HARQ-ACK bits based on one or more DCIs and/or one or more R-DCIs scheduled via the set of PDCCH monitoring occasions. For a third DCI format, when the wireless device monitors a DCI without repetition based on the third DCI format, the wireless device may consider each monitoring occasion for the third DCI format as a primary/starting monitoring occasion.

In an example, a wireless device may determine a set of PDCCH monitoring occasions that comprise one or more monitoring occasions for one or more DCI formats. The one or more DCI formats may be used for DCIs and/or R-DCIs (e.g., no repetition and/or repetition). The wireless device may determine one or more secondary/remaining/repetition monitoring occasions among the one or more monitoring occasions. A secondary/remaining/repetition monitoring occasion may comprise a monitoring occasion that is used only to schedule a PDCCH repetition and that is not a starting monitoring occasion for a R-DCI or a plurality of PDCCHs. The wireless device may exclude the one or more secondary/remaining/repetition monitoring occasions from the set of PDCCH monitoring occasions. The wireless device may update the set of PDCCH monitoring occasions based on the exclusion. The wireless device may determine one or more HARQ-ACK feedback bits based on the updated set of PDCCH monitoring occasions. The wireless device may assume that a first value of a DAI field of a first DCI/PDCCH is same as a second value of a DAI field of a second DCI/PDCCH, wherein the second DCI/PDCCH is a repetition of the first DCI/PDCCH. The wireless device may assume that a first value of a T-DAI field of the first DCI/PDCCH is same as a second value of a T-DAI field of the second DCI/PDCCH.

In an example, a wireless device may determine monitoring occasions for PDCCH with a DCI format scheduling PDSCH receptions and/or SPS PDSCH releases on an active BWP of a serving cell c. The wireless device may transmit HARQ-ACK information for/corresponding to the PDSCH receptions and/or the SPS PDSCH release(s) via a PUCCH in slot n. The wireless device may determine the PDSCH receptions and/or the SPS PDSCH release(s) based on PDSCH-to-HARQ feedback timing indicator field values for a transmission of the PUCCH with the HARQ-ACK information in the slot n in response to the PDSCH receptions and/or the SPS PDSCH release(s). The wireless device may determine the PDSCH receptions and/or the SPS PDSCH release(s) based on slot offsets (e.g., set of K0s) provided by time domain resource assignment field in the DCI format scheduling the PDSCH receptions and/or the SPS PDSCH release(s). The wireless device may determine the PDSCH receptions and/or the SPS PDSCH release(s) based on pdsch-AggregationFactor (if configured). The configuration parameters may indicate a pdsch-AggregationFactor that may indicate a number of slots that a transport block is repeated over. The wireless device may determine a same set of OFDM symbols in each slot of the number of slots. The wireless device may receive one or more PDSCHs carrying the transport block via the number of slots. The wireless device may determine the PDSCH receptions and/or the SPS PDSCH release(s) based on RepNumR(16) (if configured). The configuration parameters may indicate a RepNumR for each entry of a time domain resource allocation table. The RepNumR may indicate a number of repetitions of a transport block via one or more slots. The wireless device may receive one or more PDSCHs carrying the TB (e.g., equal to or less than the RepNumR PDSCHs) via the one or more slots.

In an example, the wireless device may determine a set of PDCCH monitoring occasions for one or more DCI formats scheduling the PDSCH receptions and/or the SPS PDSCH release(s). For example, the one or more DCI formats may comprise a DCI format 1_1 and a DCI format 1_3. For example, the DCI format 1_3 is a DCI format used for a repeated DCI transmission over one or more monitoring occasions. The wireless device may determine the set of PDCCH monitoring occasions based on monitoring occasions of each active downlink BWP of each configured serving cell. For example, the set of PDCCH monitoring occasions may comprise the monitoring occasions of the each active downlink BWP of the each configured serving cell over one or more configured serving cells. The wireless device may determine a set of primary monitoring occasions comprising primary monitoring occasions of each active downlink BWP of each configured serving cell. The wireless device may determine a set of secondary monitoring occasions comprising secondary monitoring occasions of each active downlink BWP of each configured serving cell. The wireless device may determine that the set of primary monitoring occasions as the set of PDCCH monitoring occasions. For example, the wireless device may determine/update the set of PDCCH monitoring occasions by excluding the set of secondary monitoring occasions from the set of PDCCH monitoring occasions.

For example, the DCI format 1_3 may be a DCI format used for a repeated DCI transmission via a plurality of transmission and reception points (TRPs). For example, the one or more DCI format may comprise a DCI format 1_1. For example, the one or more DCI formats may comprise a DCI format 1_1 and a DCI format 1_2. For example, the DCI format 1_1 may be a downlink scheduling DCI format. For example, the DCI format 1_2 may be a small sized downlink scheduling DCI format. For example, the one or more DCI formats may comprise a DCI format 1_0 and a DCI format 1_1. For example, the one or more DCI formats may comprise at least one of a DCI format 1_0, a DCI format 1_1, a DCI format 1_2, and a DCI format 1_3. For example, the wireless device may determine a first set of PDCCH monitoring occasions for a first DCI format of a downlink scheduling. For example, the wireless device may determine a second set of PDCCH monitoring occasions for a second DCI format of a downlink scheduling.

The wireless device may order each PDCCH monitoring occasion of the set of PDCCH monitoring occasions based on start time (e.g., a starting slot index and/or a starting OFDM symbol index and/or a starting subframe index and/or a starting frame index) of the each PDCCH monitoring occasion. The wireless device may determine the start time of the each PDCCH monitoring occasion based on a search space configuration associated with the each PDCCH monitoring occasion. For example, the wireless device may determine monitoring occasions based on a first search space in each slot. The wireless device may determine a PDCCH monitoring occasion mapping to a monitoring occasion in each slot based on the search space. For example, when a coreset associated with the search space spans more than one OFDM symbols, the wireless device may use a first OFDM symbol of the coreset/search space for the start time. For example, when a monitoring occasion spans OFDM symbols 1-3 in each slot, the start time of the monitoring occasion may be slot n/$1^{st}$ OFDM symbol (e.g., n=0, 1, . . . ). A cardinality of the set of PDCCH monitoring occasions may be represented as M. The set of PDCCH monitoring occasions may be represented as $1^{st}$ PDCCH monitoring occasion, $2^{nd}$ PDCCH monitoring occasion, . . . , M-th monitoring occasion based on ascending order of start time of a PDCCH monitoring occasion of the set of PDCCH monitoring occasion.

The wireless device may determine at most one PDCCH monitoring occasion with a start time. The wireless device may have a plurality of monitoring occasions mapping to the at most one PDCCH monitoring occasion across one or more serving cells and/or across one or more search spaces. For example, FIG. 27 illustrates that a first PDCCH monitoring is determined based on a first start time of M1 via the first cell and the first start time of M1 via the second cell. M1 of the first cell and M1 of the second cell may have a same start time. For example, FIG. 27 illustrates that a second PDCCH monitoring occasion is determined based on a second start time of M3 via the second cell. M3 is a second primary monitoring occasion via the second cell. The wireless device may order M1 via the first cell and M1 via the second cell as the first PDCCH monitoring occasion and M3 via the second cell as the second PDCCH monitoring occasion.

In an example, the wireless device may determine a set of PDCCH monitoring occasions based on a start time and a cell index of a monitoring occasion. For example, in FIG. 27, the wireless device may determine M1 of the first cell as a first PDCCH monitoring occasion, M1 of the second cell as a second PDCCH monitoring occasion, and M3 of the second cell as a third PDCCH monitoring occasion.

The wireless device may determine a number of HARQ-ACK feedback bits based on one or more DAI values of one or more DCIs based on the one or more DCI formats via the set of PDCCH monitoring occasions. The wireless device may further determine the number of HARQ-ACK feedback bits based on one or more total DAI (T-DAI) values of the one or more DCIs based on the one or more DCI formats via the set of PDCCH monitoring occasions, if total DAI values are available. Embodiments may reduce ambiguity in a HARQ-ACK codebook determination with a DCI repetition. Embodiments may simplify a wireless device complexity or reduce processing by reducing a number of monitoring occasions to check for a HARQ-ACK codebook determination.

Figure 28:
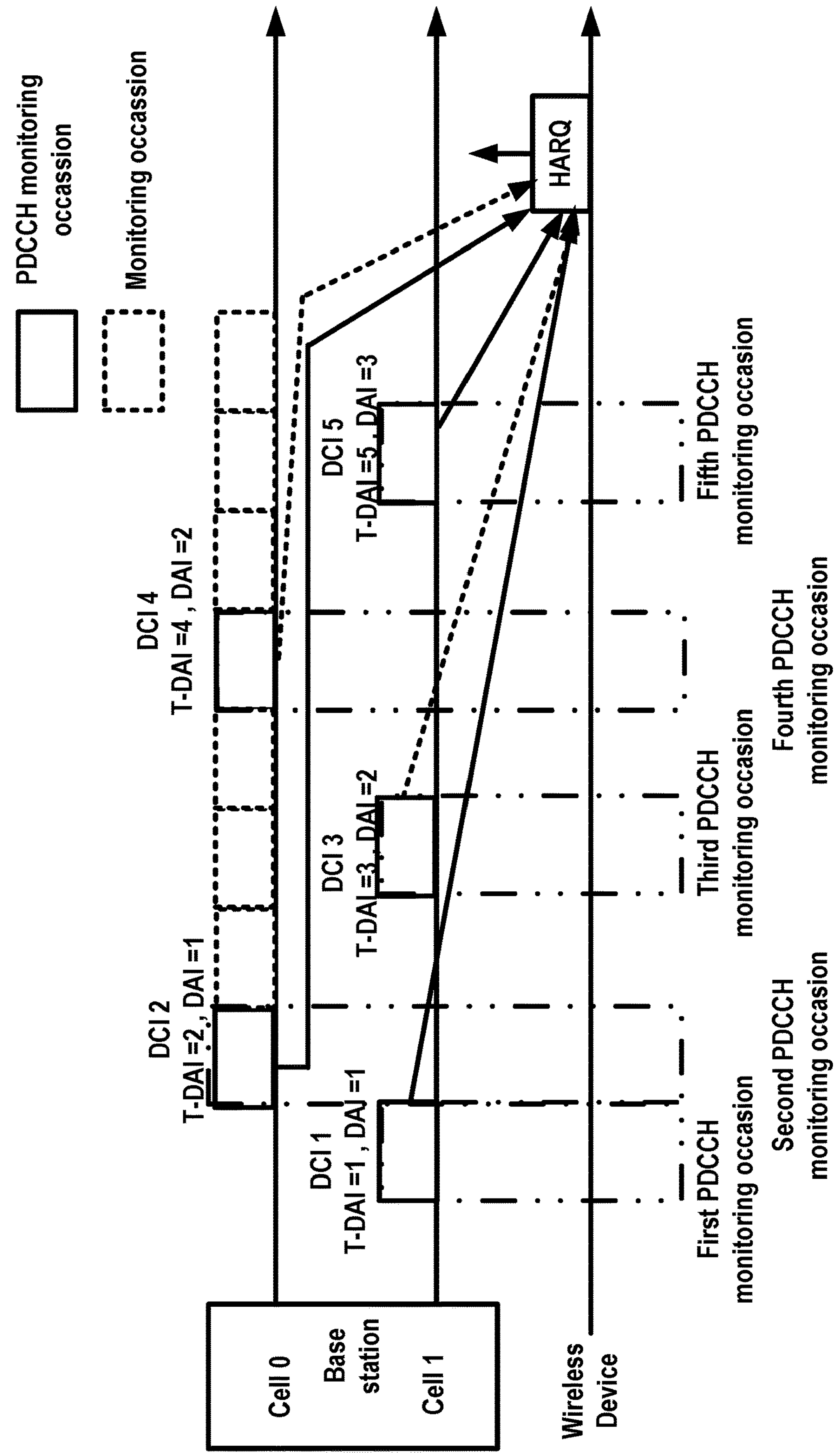
FIG. 28 illustrates an example of dynamic HARQ-ACK codebook determination with a control repetition as per an aspect of an embodiment of the present disclosure.

FIG. 28 illustrates an example of dynamic HARQ-ACK codebook determination with a PDCCH/DCI repetition. A base station may configure a first cell (Cell 0) and a second cell (Cell 1) to a wireless device. The base station may transmit one or more RRC messages comprising/indicating configuration parameters. The configuration parameters may comprise/indicate a PDCCH/DCI repetition for a first DCI format via the first cell. For example, a number of maximum repetitions of the first DCI format may be four (e.g., R1=4).

The configuration parameters may comprise/indicate no repetition (e.g., a single PDCCH/DCI transmission for a scheduling downlink data) of a second DCI format via the second cell (e.g., R2=1). Monitoring occasions of the first cell may comprise primary/starting monitoring occasions (shown in solid lined boxes) and secondary/remaining monitoring occasions (shown in dotted boxes). The wireless device may determine a set of PDCCH monitoring occasions that may comprise the primary/starting monitoring occasions via the first cell. The set of PDCCH monitoring occasions may also comprise monitoring occasions via the second cell. The monitoring occasions via the second cell may be considered as primary/starting monitoring occasions as there is no repetition configured for the monitoring occasions.

For example, the wireless device may determine a PDCCH monitoring occasion that may comprise one or more primary monitoring occasions of one or more serving cells. A first PDCCH monitoring occasion may comprise a first (primary) monitoring occasion of the second cell. A second PDCCH monitoring occasion may comprise a first primary monitoring occasion of the first cell. The third PDCCH monitoring occasion may comprise a second monitoring occasion of the second cell. The third PDCCH monitoring occasion may not comprise a monitoring occasion (e.g., a third monitoring occasion) of the first cell as the monitoring occasion is not a primary monitoring occasion. A fourth PDCCH monitoring occasion may comprise a fifth monitoring occasion (e.g., a second primary monitoring occasion) of the first cell. A fifth PDCCH monitoring occasion may comprise a third monitoring occasion of the second cell. Note that monitoring occasions shown in FIG. 28 may be determined based on one or more DCI formats used for scheduling one or more PDSCHs and/or one or more SPS PDSCH releases.

The wireless device may determine a number of HARQ-ACK feedback bits as follows. The set of PDCCH monitoring occasions may comprise a first monitoring occasion via the second cell (left box), a first primary monitoring occasion via the first cell (left solid box), a second monitoring occasion via the second cell (middle box), a second primary monitoring occasion via the first cell (middle solid box), and a third monitoring occasion via the second cell. For each PDCCH monitoring of the set of PDCCH monitoring occasions, the wireless device may perform the following steps.

For each m of the set of PDCCH monitoring occasions, for each cell c of one or more serving cells configured to the wireless device, the wireless device may determine a number of HARQ ACK bits based on a C-DAI or DAI value of a DCI received via the m for the cell c (if available). Otherwise, the wireless device may switch to a next cell based on a cell index. Or the wireless device may switch to a next PDCCH monitoring occasion. When the wireless device is configured with a plurality of coreset pools, and a R-DCI may be repeated via a plurality of PDCCHs scheduled via a first coreset of a first coreset pool and a second coreset of a second coreset pool, the wireless device may consider the R-DCI may be scheduled by the first coreset pool (e.g., a first coreset pool index). For example, when the wireless device is configured with a plurality of search spaces, and a R-DCI may be repeated via a plurality of PDCCHs scheduled via the plurality of search spaces, where the plurality of search spaces may be associated with a plurality of coreset pools, the wireless device may consider the R-DCI may be scheduled by the first coreset pool (e.g., a first coreset pool index).

For each C-DAI or DAI value of the DCI, the wireless device may add one or more HARQ-ACK bits. For example, when a number of transport block for a slot (e.g., maxNrofCodeWordsScheduledByDCI=1) is one, the wireless device may add 1 HARQ-ACK bit for the each C-DAI or the DAI value for the DCI for the cell c. For example, when a number of transport block for a slot (e.g., maxNrofCodeWordsScheduledByDCI=2) is two, the wireless device may add 2 HARQ-ACK bits for the each C-DAI or the DAI value for the DCI for the cell c. For example, when the wireless device may be configured/associated with a plurality of coreset pools for the cell c, and the wireless device may be configured with ACKNACKFeedbackMode=JointFeedback, the cell c may be counted once for a first coreset pool of the cell c and another for a second coreset pool of the cell c.

FIG. 28 shows that the wireless device first determines 1 bit HARQ-ACK bit corresponding to a first DCI (DCI 1), assuming maxNrofCodeWordsScheduledByDCI=1 based on a DAI value of the first DCI. The wireless device may receive the second DCI (a R-DCI, DCI 2) indicating a C-DAI/DAI=1 for the first cell. The wireless device may generate 1 HARQ-ACK bit for the repeated second DCI. The base station may repeat the second DCI up to four times. The base station may transmit the second DCI via one PDCCH or two PDCCHs or three PDCCHs or four PDCCHs. The wireless device may miss or may not successfully detect a third DCI (DCI 3). The wireless device may not successfully receive or may not detect a fourth DCI (DCI 4). The wireless device may receive a fifth DCI (DCI 5) with a C-DAI/DAI=3 and a T-DAI=5 (or 1 by wrapping around). Based on the C-DAI/DAI of the fifth DCI, the wireless device may determine a DCI (DCI 3) is missing for the second cell. Based on the T-DAI of the fifth DCI, the wireless device may determine a DCI (DCI 4) is missing for the first cell.

Based on the DAI/T-DAI values, the wireless device may determine two HARQ-ACK bits for the first cell. The wireless device may determine three HARQ-ACK bits for the second cell. The wireless device may determine total of 5 HARQ-ACK bits for a transmission of a PUCCH (e.g., HARQ). The wireless device may generate a first HARQ-ACK bit corresponding to a PDSCH or a SPS PDSCH release by the first DCI, a second HARQ-ACK bit corresponding to a PDSCH or a SPS PDSCH release by the second DCI, a third HARQ-Ack bit with NACK, a fourth HARQ-ACK bit with NACK, and a fifth HARQ-ACK bit corresponding to a PDSCH or a SPS PDSCH release by the fifth DCI. For example, when the wireless device may receive PDSCHs and/or SPS PDSCH release(s) by the first DCI, the third DCI and the fifth DCI, the wireless device may transmit [1 1 0 0 1] for a case shown in FIG. 28.

In an example, a first monitoring occasion for a first cell or via the first cell may overlap in time with a second monitoring occasion for a second cell or via the second cell. A monitoring occasion may be determined based on one or more configuration parameters of one or more search spaces associated with the monitoring occasion. For example, as shown FIG. 26, the one or more configuration parameters of the one or more search spaces may indicate a monitoring periodicity and/or a monitoring offset (e.g., monitoringSlotPeriodicityAndOffset). Based on the monitoring periodicity and/or the monitoring offset, the wireless device may determine monitoring occasions where a number of OFDM symbols for each monitoring occasion may be determined based on one or more coresets associated with the one or more search spaces. The wireless device may determine a starting OFDM symbol of each monitoring occasion based on monitoringSymbolsWithinSlot (if configured) parameter of the one or more configuration parameters of the one or more search spaces. The wireless device may determine a first OFDM symbol (e.g., OFDM symbol 0 or 1 among 14 OFDM symbols of a slot based on a normal CP or 12 OFDM symbols of a slot based on extended CP). The wireless device may determine no monitoring occasion in a slot n when periodicity may be larger than a slot. The wireless device may determine a plurality of monitoring occasions in a slot m when monitoringSymbolsWithinSlot may indicate more than one OFDM symbols with monitoring occasions. The wireless device may determine monitoring occasions based on the one or more search spaces based on the monitoring periodicity/offset and/or monitoring SymbolsWithinSlot.

In an example, the first monitoring occasion of the first cell may overlap with the second monitoring occasion of the second cell in response to a first start time of the first monitoring occasion is same to a second start time of the second monitoring occasion. For example, the first start time may be determined as a slot index and/or a OFDM symbol index within a subframe based on a reference numerology. For example, the reference numerology may be determined/defined based on a larger subcarrier spacing between a first subcarrier spacing configured for the first monitoring occasion and a second subcarrier spacing configured for the second monitoring occasion. For example, the reference numerology may be defined/determined as a largest subcarrier spacing among one or more subcarrier spacing that the wireless device may support. For example, the reference numerology may be 240 kHz subcarrier spacing with a normal CP. For CP length, the wireless device may assume a normal CP or a extended CP. The wireless device may determine the CP length based on a CP length configured for the first cell or the second cell. When the first cell and the second cell may be configured with different CP lengths, the wireless device may not consider the first monitoring occasion and the second monitoring occasion overlap.

The wireless device may determine the first monitoring occasion overlaps with the second monitoring occasion based on the first start time and the second start time are equal. A first span of the first monitoring occasion may be different from a second span of the second monitoring occasion. For example, a span may be determined/defined as a number of OFDM symbols and/or a number of slots that the first monitoring occasion may span consecutively. For example, a span may be determined based on a duration of a coreset associated with the one or more search spaces defining a monitoring occasion. In an example, a wireless device may be configured with a DCI/PDCCH repetition across a plurality of monitoring occasion based on one or more search spaces and/or one or more coresets. The wireless device may be configured with the DCI/PDCCH repetition across a monitoring occasion, where a monitoring occasion may comprise a plurality of sub-monitoring occasions. For example, one or more monitoring occasion carrying a plurality of PDCCHs for a DCI may be grouped as a monitoring occasion. Each monitoring occasion belong to a group of monitoring occasion may be referred as a sub-monitoring occasion.

When a DCI with a repetition may be received via a plurality of monitoring occasions and/or via a plurality of PDCCHs, the wireless device may determine a primary monitoring occasion among the plurality of monitoring occasions. The primary monitoring occasion may be first or earliest monitoring occasion of the plurality of monitoring occasions. The wireless device may determine a start time of the plurality of monitoring occasions based on a start time of the primary monitoring occasion. For example, a start time of a second monitoring occasion of the plurality of monitoring occasions may be same as the start time of the first/primary/earliest monitoring occasion of the plurality of monitoring occasions.

When a DCI with a repetition may be received via a group monitoring occasion comprising a plurality of sub-monitoring occasions, a start time of the group monitoring occasion may be determined based on a first or an earliest sub-monitoring occasion of the plurality of sub-monitoring occasions. For example, a DCI of a primary monitoring occasion of a first cell may indicate a same T-DAI value to a second DCI of a (primary) monitoring occasion of a second cell, in response to a PDCCH monitoring occasion comprising the primary monitoring occasion of the first cell and the (primary) monitoring occasion of the second cell. For example, the PDCCH monitoring occasion may comprise the primary monitoring occasion of the first cell and the (primary) monitoring occasion of the second cell in response to a first starting time of the primary monitoring occasion of the first cell is same as a second starting time of the (primary) monitoring occasion of the second cell. For example, the PDCCH monitoring occasion may comprise the primary monitoring occasion of the first cell and the (primary) monitoring occasion of the second cell in response to the primary monitoring occasion of the first cell may (fully or partially) overlap with the (primary) monitoring occasion of the second cell in time domain.

In an example, the wireless device may receive a first DCI comprising/indicating a value of a T-DAI via the first monitoring occasion. The wireless device may receive a second DCI comprising/indicating a value of a second T-DAI via the second monitoring occasion. The wireless device may determine/consider that the T-DAI of the first DCI is same as the T-DAI of the second DAI. The wireless device may consider a plurality of DCIs, transmitted/received via a plurality of monitoring occasions with a same start time across a plurality of search spaces and/or a plurality of coresets and/or a plurality of cells, having a same total DAI value if the total DAI value is indicated. In the example, the first DCI may schedule one or more PDSCHs and/or one or more SPS PDSCH releases. The second DCI may schedule one or more second PDSCHs and/or one or more second SPS PDSCH releases. In an example, a wireless device may receive a third DCI comprising/indicating a value of a T-DAI via a third monitoring occasion. The third DCI may schedule uplink resource(s) for one or more PUSCHs. The wireless device may receive a fourth DCI comprising/indicating a value of a second T-DAI via a fourth monitoring occasion. For example, the third monitoring occasion may overlap with the fourth monitoring occasion. For example, the third monitoring occasion may have a same starting time with the fourth monitoring occasion. The value of T-DAI of the third DCI may be different from the value of second T-DAI of the fourth DAI. The value of T-DAI of the third DCI may be same as the value of second T-DAI of the fourth DAI. The wireless device may determine no HARQ-ACK piggybacking in response to a value of a T-DAI, of an uplink grant corresponding to a PUSCH, being 4. A base station may indicate/set a T-DAI value of an uplink grant DCI as four (4) when the base station may not expect that the wireless device perform a UCI piggybacking on a PUSCH scheduled by the uplink grant DCI.

The wireless device may determine one or more missed/not successfully received DCIs/PDSCHs/SPS PDSCH release(s) based on one or more C-DAIs/DAIs received via successfully received one or more DCIs (and/or one or more R-DCIs) and one or more T-DAIs received via the one or more DCIs (and/or the one or more R-DCIs). Embodiments allow efficient multiplexing of HARQ-ACK feedbacks corresponding to PDSCHs/SPS PDSCH releases scheduled by DCIs and PDSCHs/SPS PDSCHs release scheduled by R-DCIs. Embodiments reduces ambiguity in determining a HARQ-ACK codebook with a DCI repetition.

In an example, a base station may transmit one or more RRC messages comprising/indicating configuration parameters. The configuration parameters may indicate/comprise a HARQ feedback mode/type/mechanism between Type-1 HARQ-ACK codebook determination (e.g., semi-static HARQ-ACK codebook generation type/mode/mechanism) and Type-2 HARQ-ACK codebook determination (e.g., dynamic HARQ-ACK codebook generation type/mode/mechanism). The configuration parameter may indicate/comprise the HARQ feedback mode/type/mechanism as a Type-3 HARQ-ACK codebook determination that is an advanced dynamic HARQ-ACK codebook generation type/mode/mechanism. The configuration parameters may indicate/comprise one or more time domain resource allocation entries that may be referred via one or more scheduling DCIs indicating downlink resources for PDSCH(s) and/or SPS PDSCH release(s). An entry of the one or more time domain resource allocation entries may include/comprise a scheduling offset (e.g., k0) between an ending time of a scheduling DCI and a start time of a corresponding PDSCH. The entry may comprise a number of repetitions for one or more PDSCHs scheduled by the scheduling DCI. The entry may comprise a starting OFDM symbol in a scheduled slot. The entry may also comprise a length of a PDSCH of the one or more PDSCHs.

In an example, the wireless device may apply a scheduling offset between a scheduling DCI and a PDSCH or a transport block scheduled by the scheduling DCI based on a first timing of the scheduling DCI and a second timing of the PDSCH or the transport block. For example, the wireless device may receive a plurality of PDCCHs carrying the scheduling DCI via a plurality of monitoring occasions in a time domain. For example, the wireless device may receive the transport block via a number of repetitions where a plurality of PDSCHs carrying the transport block may be transmitted/received or the PDSCH may be transmitted/received via multiple time domain resources for the transport block. In an example, the wireless device may determine the first time as a slot n in which the wireless device may monitor a last PDCCH of the plurality of PDCCHs via a last monitoring occasion of the plurality monitoring occasions. For example, the base station may not transmit the last PDCCH. For example, the wireless device may determine the first timing based on a starting or a primary monitoring occasion of the plurality of monitoring occasions and a number of maximum repetitions. The wireless device may be configured with the number of maximum repetitions via RRC signaling. For example, the base station may transmit K number of PDCCH repetitions for a DCI, where K is equal to or less than the number of maximum repetitions.

In an example, the wireless device may determine the first timing of the scheduling DCI based on a last candidate monitoring occasion of the plurality of monitoring occasions in response to a HARQ feedback mode/type being configured as the Type-1 HARQ-ACK codebook determination. The wireless device may determine the first timing of the scheduling DCI based on a last monitoring occasion in which the wireless device receives a last repetition of a PDCCH of the plurality of PDCCHs for the scheduling DCI in response to the HARQ feedback mode/type being configured as the Type-2 HARQ-ACK codebook determination. For example, the last monitoring occasion may be same or different from the last candidate monitoring occasion. For example, the scheduling DCI may comprise/indicate a number of actual repetitions used for the scheduling DCI. The wireless device may determine the last monitoring occasion based on a starting monitoring occasion of the plurality of monitoring occasion and the number of actual repetitions. For example, the plurality of monitoring occasions may comprise N monitoring occasions. The number of actual repetitions may be M (M<=N).

The wireless device may determine the last monitoring occasion as M-th monitoring occasion of the plurality of monitoring occasions starting from the starting/primary monitoring occasion of the plurality of monitoring occasions. When the dynamic HARQ-ACK codebook determination (e.g., Type-2) is configured/enabled, the wireless device may consider that a last transmitted PDCCH for a DCI with a repetition may be used to apply a timing offset between the DCI and a scheduled PDSCH by the DCI. When the semi-static HARQ-ACK codebook determination (e.g., Type-1) is configured/enabled, the wireless device may consider that a last candidate monitoring occasion of a candidate PDCCH for a DCI with a repetition, regardless of actual repetition number of the DCI, may be used to apply the timing offset between the DCI and a scheduled PDSCH by the DCI.

In an example, the wireless device may follow a same procedure of the Type-2 HARQ-ACK codebook determination for a case where the wireless device is configured with the Type-3 HARQ-ACK codebook determination. For example, the wireless device may determine/apply a timing offset (e.g., a scheduling offset) between an (actual) last PDCCH reception of a DCI with a repetition and a first slot of scheduled PDSCH(s) by the DCI. When the timing offset may be represented with a number of OFDM symbols, a last OFDM symbol of the last PDCCH reception and a starting OFDM symbol of the first slot of the scheduled PDSC(s) may be used for determining/applying the timing offset/scheduling offset. Similarly, the wireless device may determine a timing offset between a last symbol, of a last candidate monitoring occasion of a plurality of monitoring occasions for a DCI with a repetition, and a first symbol of a first slot of scheduled PDSCH(s) by the DCI.

Figure 29A:
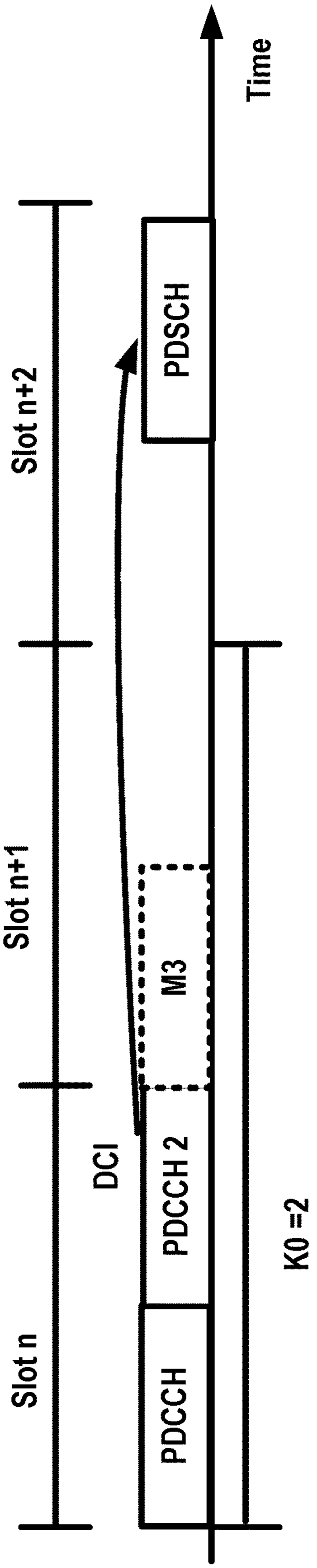
FIG. 29A illustrate an example embodiment of determining a scheduling offset based on a dynamic HARQ-ACK codebook determination as per an aspect of an embodiment of the present disclosure.
Figure 29B:
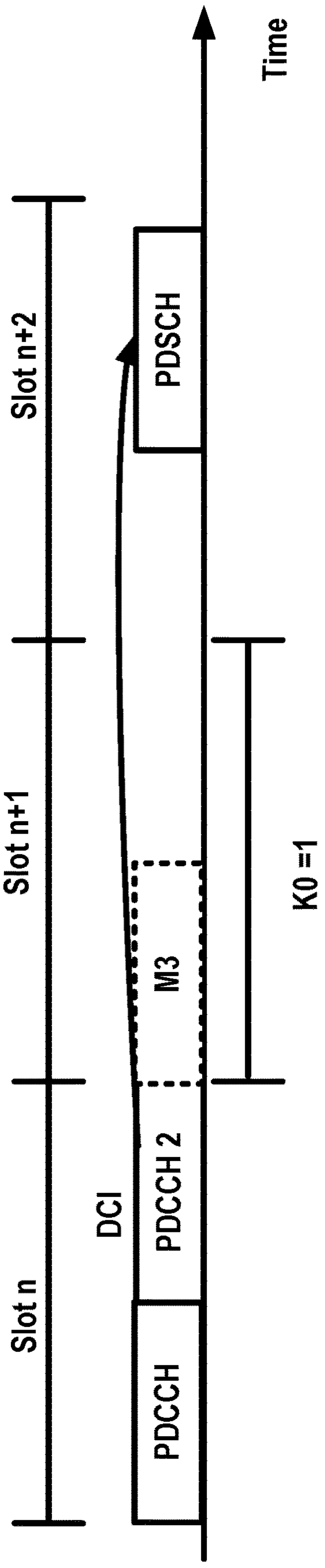
FIG. 29B illustrate an example embodiment of determining a scheduling offset based on a semi-static HARQ-ACK codebook determination as per an aspect of an embodiment of the present disclosure.

For example, FIG. 29A and FIG. 29B illustrate two example embodiments of determining a scheduling offset between a first case and a second case. For example, the wireless device may be configured with a Type-2 or Type-3 HARQ-ACK codebook determination (e.g., a dynamic HARQ feedback mode/type) in the first case. The wireless device may be configured with a Type-1 HARQ-ACK codebook determination (e.g., a semi-static HARQ feedback mode/type) in the second case. The wireless device may be configured with a mode/type wherein a base station may transmit one or more RRC messages comprising one or more configuration parameters indicating/comprising the mode/type. For example, a pdsch-HARQ-ACK-Codebook parameter may be indicated as semi-static for Type-1 HARQ-ACK codebook determination or may be indicated as a dynamic for Type-2 HARQ-ACK codebook determination. A parameter of pdsch-HARQ-ACK-OneShotFeedback-r16 may be indicated to the wireless device to enable the Type-3 HARQ-ACK codebook determination.

For example, a DCI in FIG. 29A may be transmitted/received via two PDCCHs (e.g., PDCCH and PDCCH2)

over three candidate monitoring occasions. A base station may skip transmission of a third PDCCH and may indicate that the DCI is repeated over the two PDCCHs. The wireless device may determine that a second monitoring occasion of a second PDCCH (PDCCH2) as a last monitoring occasion for the DCI. For example, the wireless device may determine a slot n (Slot n) as a starting time for a scheduling offset between the DCI and a PDSCH. The slot n may comprise the second monitoring occasion (e.g., a last actual monitoring occasion for a last repetition of a PDCCH). The scheduling offset (e.g., K0) may be applied between the slot n and a starting slot of the PDSCH. For example, FIG. 29A illustrates that K0=2, where the wireless device receives the PDSCH in slot n+2 (Slot n+2). The wireless device may determine the scheduling offset based on a last actual PDCCH transmission, indicated by a DCI or based on a configuration or a based on blind detection, when the wireless device is configured to provide a HARQ-ACK feedback based on a Type-2 or a Type-3 HARQ-ACK codebook determination.

For example, a DCI in FIG. 29B may be transmitted via two PDCCHs (e.g., PDCCH and PDCCH2) over three candidate monitoring occasions, that are same to FIG. 29A. In FIG. 29B, the wireless device may be configured with the Type-1 HARQ-ACK codebook determination. The wireless device may determine a start slot/time of a scheduling offset (e.g., K0) based on a last candidate monitoring occasion (e.g., M3) regardless of whether the wireless device may have received a PDCCH repetition for the DCI via the last candidate monitoring occasion or not. FIG. 29B illustrates that K0=1 as the K0 is applied between slot n+1 and slot n+2. The wireless device may determine slot n+1 as the starting time based on the last candidate monitoring occasion.

Embodiments allow flexible K0 value determination based on a HARQ-ACK codebook determination type/method. Based on dynamic HARQ-ACK codebook determination, K0 value may be applied based on a last repetition. Based on semi-static HARQ-ACK codebook determination, to ensure consistency and to reduce ambiguity, K0 value may be applied based on a last candidate monitoring occasion.

In an example, a base station may transmit one or more RRC messages comprising configuration parameters. The configuration parameters may indicate/comprise a Typ1-1 HARQ-ACK codebook determination (e.g., semi-static HARQ feedback mode). The configuration parameters may indicate/comprise a number of repetitions for a DCI repetition via a first cell. For example, the configuration parameters may indicate/comprise one or more search spaces for one or more DCI formats for monitoring the DCI repetition (e.g., monitoring R-DCIs). For example, the configuration parameters may indicate/comprise one or more coresets associated with the one or more search spaces for the DCI repetition. The configuration parameters may indicate a number of repetitions for the DCI repetition via the one or more search spaces. In response to the Type-1 HARQ-ACK codebook determination being indicated/enabled, the wireless device may determine that a number of actual repetition of a R-DCI, based on a DCI format of the one or more DCI formats, via the one or more search spaces as the number of repetitions (e.g., R) configured by the configuration parameters. For example, the base station may transmit R PDCCHs for a R-DCI for the DCI repetition, where R may be same for a first R-DCI and a second R-DCI. For example, the first R-DCI may be received at a time n. For example, the second R-DCI may be received at a time m. The number of repetitions for each R-DCI may be fixed or determined based on the number of repetitions of the configuration parameters.

In an example, a wireless device may monitor a R-DCI over a plurality of monitoring occasions. The plurality of monitoring occasions may comprise a primary/starting monitoring occasion and one or more secondary/repetition/remaining monitoring occasions. The wireless device may receive a first PDCCH of one or more PDCCHs carrying the R-DCI via the primary/starting monitoring occasion. The wireless device may determine/apply a scheduling offset or a time offset (e.g., K0) based on a slot index of the primary/starting monitoring occasion. The wireless device may determine/apply the scheduling offset or the time offset (e.g., K0) based on a second slot index of a last monitoring occasion of the plurality of monitoring occasion. A base station may transmit a last PDCCH repetition via the last monitoring occasion.

In an example, a second slot with the second slot index may comprise the last monitoring occasion and one or more monitoring occasions of the plurality of monitoring occasions. For example, the second slot may comprise three monitoring occasions of the plurality of monitoring occasions in a OFDM symbol 1, a OFDM symbol 4, and a OFDM symbol 7. The last monitoring occasion may occur in the OFDM symbol 7. The one or more monitoring occasions may occur in the OFDM symbol 1 and the OFDM symbol 4. The base station may transmit one or more PDCCHs for the R-DCI (repetition) via one or more monitoring occasions of the three monitoring occasions. For example, the base station may transmit one PDCCH where a last actual monitoring occasion of the R-DCI reception is a first monitoring occasion in the OFDM symbol 1. For example, the base station may transmit two PDCCHs where a last actual monitoring occasion of the R-DCI reception is a second monitoring occasion in the OFDM symbol 4. For example, the base station may transmit three PDCCHs where a last actual monitoring occasion of the R-DCI reception is the last monitoring occasion. The base station may ensure transmission of at least one PDCCH of the plurality of PDCCHs for the R-DCI, when the plurality of PDCCHs for the R-DCI have been scheduled/transmitted. Based on the ensuring the transmission, the wireless device may determine/apply a scheduling offset or a time offset (e.g., K0) based on a slot where a last monitoring occasion belongs to and a start time of a scheduled/corresponded PDSCH. The base station may adapt or chose a number of repetitions such that at least one repetition occurs in the slot that comprises the last monitoring occasion.

In an example, when the wireless device may be enabled with a Type-2 HARQ-ACK codebook determination or a Type-3 HARQ-ACK codebook determination, the base station may transmit one or more PDCCHs for a R-DCI, where a number of the one or more PDCCHs may be smaller than or equal to a number of repetitions configured for a PDCCH repetition. The wireless device may apply/determine the number of the one or more PDCCHs (e.g., a number of actual repetition) based on a blind decoding (e.g., attempt to decode k1 numbers of repetition, k2 numbers of repetition, k3 numbers of repetition, and/or the like) over multiple candidate numbers of repetitions. For example, the multiple candidate numbers may comprise/indicate a first number=the number of repetition, a second number=the number of repetition/2 (e.g., divided by 2), a third number=the number of repetition/4 (e.g., divided by 4), and so on. The wireless device may determine the number of the one or more PDCCHs based on an indication via the R-DCI.

For example, the R-DCI or a DCI format of the R-DCI may comprise a DCI field indicating the number of actual repetitions. For example, the R-DCI or the DCI format of the R-DCI may comprise/indicate the number of actual repetitions via one or more DCI fields.

Figure 30A:
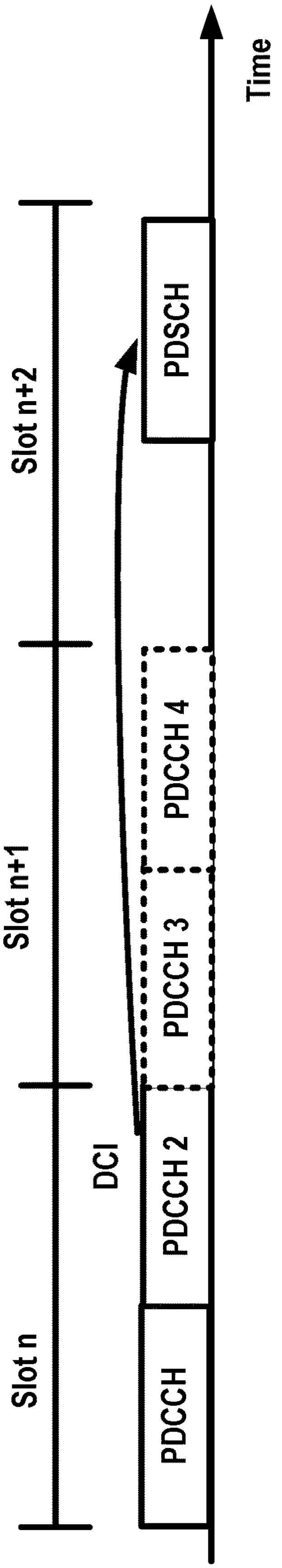
FIG. 30A illustrate an example embodiment of a number of actual repetitions based on a dynamic HARQ-ACK codebook determination as per an aspect of an embodiment of the present disclosure.
Figure 30B:
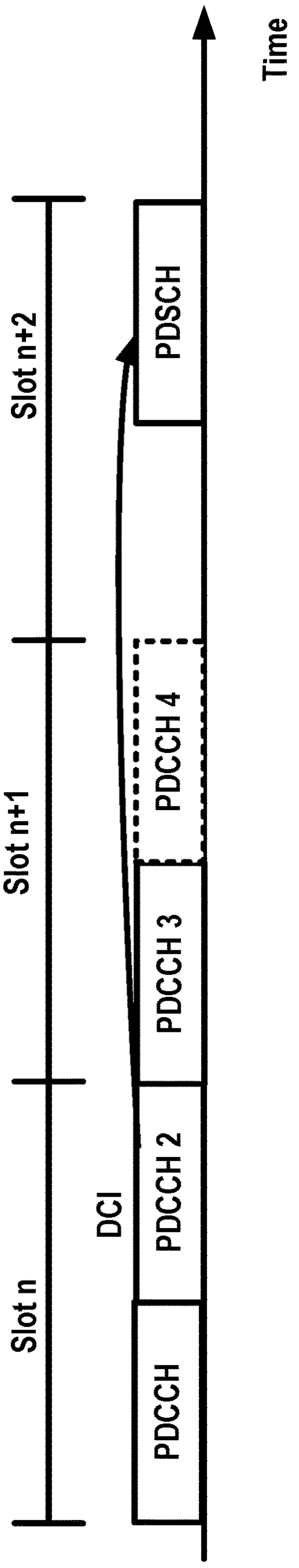
FIG. 30B illustrate an example embodiment of a number of actual repetitions based on a semi-static HARQ-ACK codebook determination as per an aspect of an embodiment of the present disclosure.

FIG. 30A and FIG. 30B illustrate an example embodiment of one or more allowed number of repetitions K based on a maximum number of repetition R with either a Type-2 HARQ-ACK codebook determination (e.g., dynamic, FIG. 30A) or a Type-1 HARQ-ACK codebook determination (semi-static, FIG. 30B). For example, when a wireless device is configured with a dynamic HARQ-ACK codebook determination (e.g., the Type-2 HARQ-ACK codebook determination), the wireless device may receive a R-DCI scheduling a PDSCH or releasing a SPS PDSCH. The R-DCI may comprise/indicate a number of transmitted/actual repetition (e.g., M). For example, M may be smaller than or equal to a maximum number of repetition R. For example, the R-DCI may comprise/indicate a value M that is smaller than or equal to R. For example, FIG. 30A illustrates that a base station transmits two PDCCHs out of maximum four repetitions (R=4). A DCI via the two PDCCHs may indicate M=2 in FIG. 30A. Based on the Type-2 HARQ-ACK codebook determination, the base station may indicate M=1, or M=2 or M=3 or M=4.

FIG. 30B illustrates an example embodiment for a number of transmitted number of repetitions based on the Type-1 HARQ-ACK codebook determination. For example, the wireless device may receive a second R-DCI scheduling a PDSCH or releasing a SPS PDSCH. The second R-DCI may comprise/indicate a number of transmitted/actual repetition (e.g., M). For example, M may be equal to a maximum number of repetition R (e.g., M=R). For example, M may be smaller than R (M=R−X) where X is 0, 1, . . . , P wherein P is a number of monitoring occasions in a last slot of a plurality of monitoring occasions. The wireless device may receive a R-DCI via one or more PDCCHs via the plurality of monitoring occasions.

In an example, based on a Type-1 HARQ-ACK codebook determination, a range of a number of transmitted/received or actual repetition of a R-DCI may be [R−X, R] where X is a number of monitoring occasions, of a plurality of monitoring occasions for the R-DCI, in a last. Based on a Type-2 HARQ-Ack codebook determination, a range of a number of transmitted/received or actual repetition of a R-DCI may be [1, R]. R may represent a number of maximum repetitions for the R-DCI. Embodiments allow flexible number of actual repetitions based on a HARQ-ACK codebook determination type/method. Based on dynamic HARQ-ACK codebook determination, a number of repetition may vary up to a maximum number of repetitions. Based on semi-static HARQ-ACK codebook determination, to ensure consistency and to reduce ambiguity, repetition may be consistent as to a maximum number of repetitions.

In an example, a base station may transmit one or more RRC messages comprising/indicating configuration parameters. The configuration parameters may indicate a number of repetitions based on a first DCI format via a first cell. For example, the first DCI format may schedule a PDSCH or a SPS PDSCH release for the first cell. For example, a R-DCI based on the first DCI format may be scheduled via monitoring occasions determined based on one or more search spaces of an active DL BWP of the first cell. The configuration parameters may indicate a single transmission based on a second DCI format via a second cell. For example, the second DCI format may schedule a second PDSCH or a second SPS PDSCH release for the second cell. For example, a DCI based on the second DCI format may be scheduled via monitoring occasion(s) determined based on one or more second search spaces of an active DL BWP of the second cell. The base station may transmit a first R-DCI via a plurality of monitoring occasions of the first cell. The base station may transmit a second DCI via a monitoring occasion of the second cell. The plurality of monitoring occasion of the first cell may overlap in time with the monitoring occasion of the second cell. The base station may set a first T-DAI via the first R-DCI equal to a second T-DAI via the DCI. FIG. 30 illustrates an example embodiments of overlapped monitoring occasions across a plurality of cells and total DAI values.

Figure 31:
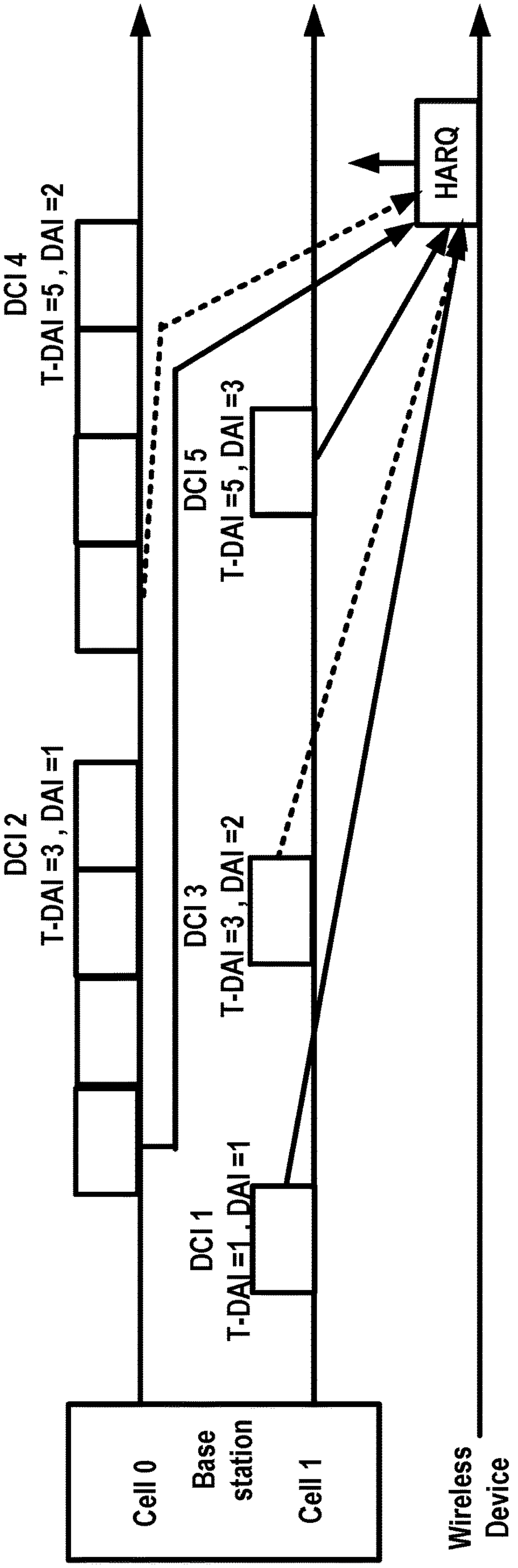
FIG. 31 illustrates an example embodiment as per an aspect of an embodiment of the present disclosure.

In FIG. 31, a wireless device may be configured with a first cell (Cell 0) and a second cell (Cell 1). The wireless device may receive a first DCI via the second cell. The first DCI may indicate a T-DAI=1. The base station may indicate a T-DAI value of a second DCI (DCI 2) same as a T-DAI value of a third DCI (DCI 3) as monitoring occasions for the second DCI overlaps with a monitoring occasion for the third DCI. The monitoring occasions for the second DCI may not have a same starting time to the monitoring occasion for the third DCI. The base station may ensure DCI(s), over monitoring occasions overlapped in time, having a same T-DAI value regardless whether the monitoring occasions share a same start time or not. The base station may indicate a same T-DAI (e.g., 5) for a fourth DCI (DCI 4) and a fifth DCI (DCI 5) where monitoring occasions for the fourth DCI and a monitoring occasion for the fifth DCI overlap.

In an example, a wireless device may determine first monitoring occasion of a plurality of monitoring occasion or as last monitoring occasion of the plurality of monitoring occasions as a primary monitoring occasion among the plurality of monitoring occasions for a DCI based on a DCI format with a repetition. Embodiments may allow flexible DAI determination.

In an example, a wireless device may receive scheduling information for a PDSCH via a plurality of PDCCHs carried over a plurality of monitoring occasions. The wireless device may determine a set of PDCCH monitoring occasions for a transmission of a PUCCH in a slot n. The set of PDCCH monitoring occasions may comprise the plurality of monitoring occasions. The wireless device may determine whether there is any DCI received via each PDCCH monitoring occasion of the set of PDCCH monitoring occasions. In an example, the wireless device may consider that each of the plurality of monitoring occasions as a PDCCH monitoring occasion of the set of PDCCH monitoring occasions. In an example, the wireless device may determine a first DCI via a first PDCCH carried over a first monitoring occasion of the plurality of monitoring occasions. The wireless device may determine a second DCI via a second PDCCH carried over a second monitoring occasion of the plurality of monitoring occasions. In an example, the first DCI may be same as the second DCI, where the second DCI is a repetition of the first DCI (e.g., based on repetition mode 1). In an example, the first DCI may be different from the second DCI (e.g., based on repetition mode 2). The second DCI may comprise/indicate a second time/frequency resource for a PDSCH of a transport block and a HARQ process identifier. The first DCI may comprise/indicate a first time/frequency resource for the PDSCH of the transport block and the HARQ process identifier. The second time/frequency resource may indicate a same resource that of the first time/frequency resource. When the first DCI and the second DCI may indicate a SPS PDSCH release, a same SPS configuration index may be indicated via the first DCI and the second DCI. When a SPS configuration is available, the wireless device may assume that the first DCI releasing the SPS PDSCH and the second DCI releasing the SPS PDSCH are transmitted within a time duration (e.g., K slots, K=2).

When the first DCI may be equal to the second DCI, the wireless device may aggregate a number of repeated PDCCHs and may decode a DCI that is same content to that of the first DCI and the second DCI. The wireless device may consider the second DCI is a duplicate of the first DCI. The wireless device may determine a number of HARQ-ACK feedback bits based on a 'new DCI' or a 'first DCI' among one or more DCIs indicating/scheduling a PDSCH of a transport block or releasing a SPS PDSCH. For example, the wireless device may receive the first DCI via the first PDCCH and the second DCI via the second PDCCH. The wireless device may determine a number of HARQ-ACK bits based on a C-DAI/T-DAI/DAI value(s) of the first DCI and may skip determination based on the second DCI in response to the second DCI being a repetition of the first DCI.

In an example, the wireless device may perform determining of a number of HARQ-ACK bits based on a C-DAI/T-DAI/DAI value(s) of a DCI, where the DCI is one of one or more DCIs scheduling a PDSCH of a transport block or releasing a SPS PDSCH. For example, when the wireless device may aggregate multiple PDCCHs to retrieve/decode a first DCI, the wireless device may consider the first DCI as the DCI for a HARQ-ACK feedback determination. For example, when the wireless device may receive a first DCI and a second DCI, where the first DCI and the second DCI schedule a same time/frequency resource for a PDSCH of a transport block or release a SPS PDSCH, the wireless device may consider the first DCI as the DCI or the second DCI as the DCI. For example, when the wireless device receives both the first DCI and the second DCI, the wireless device consider a first received DCI as the DCI (e.g., the first DCI). For example, when the wireless device receives either the first DCI or the second DCI, the wireless device may consider a received DCI as the DCI (e.g., either the first DCI or the second DCI).

In an example, a wireless device may determine a number of HARQ-ACK bits for each PDSCH or a SPS PDSCH release where a HARQ-ACK feedback of the each PDSCH or the SPS PDSCH release may correspond to a slot n transmission of a PUCCH.

Figure 32:
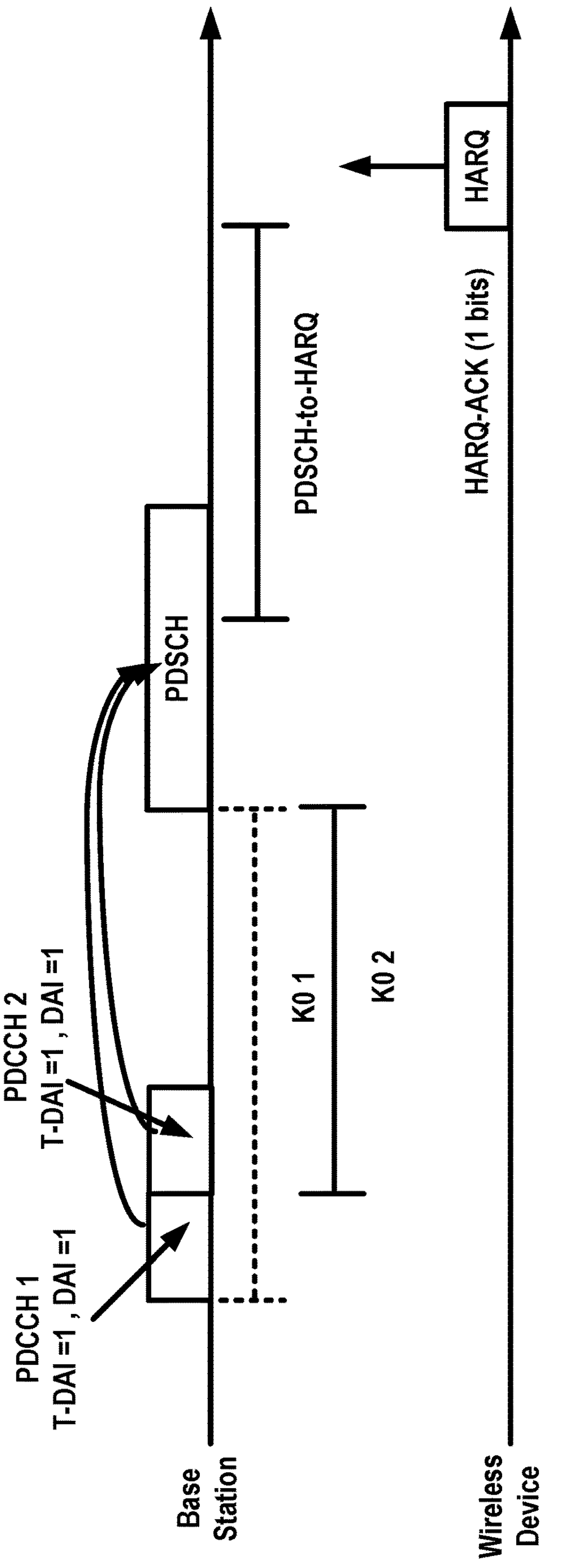
FIG. 32 illustrates an example embodiment of using a DAI value of a plurality of PDCCHs as per an aspect of an embodiment of the present disclosure.

FIG. 32 illustrates an example embodiment of applying one C-DAI/T-DAI per each DCI scheduling a transport block via one or more PDSCHs or releasing a SPS PDSCH. For example, a base station may transmit a DCI via a first PDCCH (PDCCH 1) and a second PDCCH (PDCCH 2) where a scheduling offset between the DCI and a scheduled PDSCH may be determined based on a last PDCCH (e.g., the second PDCCH) or a first PDCCH (e.g., the first PDCCH). For example, the base station may transmit a first DCI via a first PDCCH (PDCCH 1) and a second DCI via a second PDCCH (PDCCH 2). The first DCI may indicate/comprise a first K0 value (K0 1) of a scheduling offset between the first PDCCH/DCI and a scheduled PDSCH. The second DCI may indicate/comprise a second K0 value (K0 2) of a scheduling offset between the second PDCCH/DCI and the scheduled PDSCH. The first DCI or the DCI may comprise a first C-DAI/DAI=1 and a first T-DAI=1. The second DCI or the DCI may comprise a second C-DAI/DAI=1 and a second T-DAI=1. In determining a number of HARQ-ACK bits or a HARQ-ACK codebook, the wireless device may apply either the first C-DAI/DAI or the second C-DAI/DAI for a current DAI value for the PDSCH. The wireless device may apply either the first T-DAI or the second T-DAI value for a total DAI value for the PDSCH.

For example, the wireless device may receive both the first PDCCH and the second PDCCH, the wireless device may apply the first C-DAI/DAI and the first T-DAI for the HARQ-ACK codebook determination. For example, the wireless device may receive the second PDCCH only, the wireless device may apply the second C-DAI/DAI and the second T-DAI for the HARQ-ACK codebook determination. For example, the wireless device may receive the second PDCCH only, the wireless device may apply the first C-DAI/DAI and the first T-DAI for the HARQ-ACK codebook determination. Without receiving the first PDCCH, the wireless device may determine the first C-DAI/DAI being same as the second C-DAI/DAI and the first T-DAI being same as the second T-DAI. For example, the wireless device may receive the first PDCCH only, the wireless device may apply the first C-DAI/DAI and the first T-DAI for the HARQ-ACK codebook determination.

In an example, a wireless device may piggyback a HARQ-ACK feedback to a PUSCH. For example, the wireless device may receive an uplink grant based on a DCI format 0_1. The uplink grant may comprise a DAI value for the PUSCH. The wireless device may apply the DAI value of the uplink grant as a total DAI value for a HARQ-ACK codebook determination. For example, the wireless device may consider a total DAI value for the HARQ-ACK codebook determination for the HARQ-ACK feedback piggybacked to the PUSCH based on the DAI value of the uplink grant. Embodiments may simplify and reduce processing for a HARQ-ACK codebook determination with a DCI repetition.

In an example, a wireless device may receive a R-DCI with a number of repetition K. For example, K may be smaller than or equal to a maximum number of repetition R configured for a DCI format configured/enabled with a repetition. For example, the R-DCI may be based on the DCI format with the repetition. For example, the wireless device may receive the R-DCI via one or more PDCCHs via one or more monitoring occasions. The one or more monitoring occasions may be a subset or equal to a plurality of candidate monitoring occasions. For example, the base station may transmit the one or more PDCCHs, where a number of the one or more PDCCHs may be smaller than or equal to the maximum number of repetition R. The R-DCI may indicate a SPS PDSCH release for one or more SPS configuration of a cell. The R-DCI may comprise a PDSCH-to-HARQ feedback timing indicator. For example, the wireless device may determine a slot n for a PUCCH for a HARQ-ACK feedback corresponding to the SPS PDSCH release based on the PDSCH-to-HARQ feedback timing indicator and a last PDCCH of the one or more PDCCHs. For example, the wireless device may determine a first slot where the wireless device receives the last PDCCH of the one or more PDCCHs. The wireless device may determine the slot n based on the PDSCH-to-HARQ feedback timing indicator (e.g., K1) and the first slot (e.g., an index n=an index of the first slot+a value of the PDSCH-to-HARQ feedback timing indicator).

In an example, a wireless device may receive a downlink control information (DCI) indicating a timing offset for a hybrid automatic repeat request (HARQ) feedback. Based on the DCI, the wireless device may determine the HARQ feedback comprising one or more HARQ feedback bits. The wireless device may determine a slot for a transmission of the HARQ feedback based on the timing offset. For the HARQ feedback in the slot, the wireless device may determine a plurality of monitoring occasions based on the timing offset, a DCI format configured for DCI repetition and one or more search spaces associated with the DCI format. For example, the wireless device may monitor a repetition of a first DCI based on the DCI format via the plurality of monitoring occasions. For example, the wireless device may determine the plurality of monitoring occasions based on the one or more search spaces associated with the DCI format. The wireless device may determine a physical downlink control channel (PDCCH) monitoring occasion that comprises first monitoring occasion of the plurality of monitoring occasions. The PDCCH monitoring occasion may not comprise one or more other monitoring occasions of the plurality of monitoring occasions. The wireless device may determine at most one PDCCH monitoring occasion for the plurality of monitoring occasions for the DCI. The wireless device may determine a number of HARQ-ACK feedback bits corresponding to the DCI based on the PDCCH monitoring occasion. The wireless device may transmit the HARQ feedback based on the PDCCH monitoring occasion.

According to an example embodiment, the wireless device may receive one or more radio resource control (RRC) messages comprising configuration parameters. For example, the configuration parameters may comprise a number of repetitions for the DCI format configured for the DCI repetition; the one or more search spaces associated with the DCI format; and one or more coresets associated with the one or more search spaces. For example, the wireless device may receive the first DCI via one or more PDCCHs via the plurality of monitoring occasions. For example, a PDCCH of the one or more PDCCHs may be carried/transmitted/received via a monitoring occasion of the plurality of monitoring occasions. For example, a monitoring occasion of the plurality of monitoring occasions may not comprise or may not carry or may not transmit a PDCCH in response to the monitoring occasion overlaps with uplink resource or flexible resource. For example, the uplink resource or the flexible resource may be indicated by a dynamic slot format indicator via a group common DCI.

For example, the uplink resource may be indicated via one or more RRC parameters. For example, the first DCI may comprise a second timing offset (e.g., PDSCH-to-HARQ feedback timing indicator), for the HARQ feedback, indicating the slot. The wireless device may determine the slot based on a last monitoring occasion of the plurality of monitoring occasions and the second timing offset, wherein the wireless device monitors last PDCCH of the one or more PDCCHs via the last monitoring occasion. For example, the determining the slot based on the last monitoring occasion may be in response to the wireless device being configured with a dynamic (e.g., Type-2) HARQ-ACK codebook determination. In an example embodiment, the wireless device may determine the slot based on first monitoring occasion of the plurality of monitoring occasions and the second timing offset. For example, the determining the slot based on last monitoring occasion is in response to the wireless device being configured with a semi-static (e.g., Type-1) HARQ codebook determination.

According to an example embodiment, a monitoring occasion of the plurality of monitoring occasions may not comprise/transmit/carry a PDCCH when a number of transmitted repetition for the first DCI being smaller than the number of repetitions for the DCI format. For example, the number of transmitted repetition may represent a number of the one or more PDCCHs associated with the first DCI.

According to an example embodiment, the wireless device may determine a second PDCCH monitoring occasion that comprises one or more monitoring occasions with a same starting time. For example, a starting time of a monitoring occasion may be determined based on a slot index and a OFDM symbol where a first OFDM symbol of the monitoring occasion starts. For example, a first starting time of a first monitoring occasion may be same to a second starting time of a second monitoring occasion in response to the first monitoring occasion and the second monitoring occasion overlap in time and start in a same time location. For example, the second PDCCH monitoring may comprise the first monitoring occasion and the second monitoring occasion. For example, the first monitoring occasion may be first monitoring occasion of a second plurality of monitoring occasions for a second DCI based on the DCI format. The wireless device may receive the second DCI via the first monitoring occasion and a third DCI via the second monitoring occasion. For example, the wireless device may determine a first number of HARQ feedback bits based on the second DCI. The first number of HARQ feedback bits may be determined based on downlink assignment index (DAI) field of the second DCI.

For example, the wireless device may determine a second number of HARQ feedback bits based on the third DCI. The second number of HARQ feedback bits may be determined based on downlink assignment index (DAI) field of the third DCI. For example, a first total DAI field of the second DCI may indicate a same value to a second total DAI field of the third DCI. According to an example embodiment, the wireless device may determine one or more PDCCH monitoring occasions mapped to the HARQ feedback in the slot. The wireless device may determine each number of HARQ feedback bits and the HARQ feedback bits for each PDCCH monitoring of the PDCCH monitoring occasions. The wireless device may aggregate the HARQ feedback bits based on an order of associated PDCCH monitoring occasion in a time domain.

In an example, a wireless device may receive one or more radio resource control (RRC) messages indicating configuration parameters. The configuration parameters may indicate/comprise a hybrid automatic repeat request (HARQ) feedback mode between a dynamic HARQ feedback mode and a semi-static HARQ feedback mode. The configuration parameters may further indicate/comprise a number of repetitions for a DCI format. For example, the wireless device may receive/monitor downlink control information (DCI) via a plurality of physical downlink control channels (PDCCHs) up to the number of repetitions. The configuration parameters may further indicate/comprise one or more search spaces associated with the DCI format. The wireless device may determine a plurality of monitoring occasion, based on the one or more search spaces, for receiving a DCI based on the DCI format. The wireless device may receive DCI of one or more PDCCHs via the plurality of monitoring occasions. For example, the DCI may indicate a scheduling offset between the DCI and a physical downlink shared channel (PDSCH) scheduled by the DCI. Based on the HARQ feedback mode, the wireless device may determine a slot of the PDSCH based on the scheduling offset and a first slot of a last PDCCH of the one or more PDCCHs in response to the HARQ feedback mode being the dynamic HARQ feedback mode. Based on the HARQ feedback mode, the wireless device may determine a slot of the PDSCH based on the scheduling offset and a second slot of a last monitoring occasion of the plurality of monitoring occasions in response to the HARQ feedback mode being the semi-static HARQ feedback mode. The wireless device may receive the PDSCH based on the determining the slot or the second slot.

In an example, a wireless device may receive one or more radio resource control (RRC) messages indicating configuration parameters. The configuration parameters may indicate/comprise a hybrid automatic repeat request (HARQ) feedback mode between a dynamic HARQ feedback mode and a semi-static HARQ feedback mode. The configuration parameters may further indicate/comprise a number of repetitions for a DCI format. For example, the wireless device may receive/monitor downlink control information (DCI) via a plurality of physical downlink control channels (PDCCHs) up to the number of repetitions. The configuration parameters may further indicate/comprise one or more search spaces associated with the DCI format. The wireless device may determine a plurality of monitoring occasion, based on the one or more search spaces, for receiving a DCI based on the DCI format. The wireless device may receive DCI of one or more PDCCHs via the plurality of monitoring occasions. For example, the DCI may indicate a number of transmitted repetitions of the DCI. Based on the HARQ feedback mode, the number of transmitted repetitions may be smaller than or equal to the number of repetitions in response to the HARQ feedback mode being the dynamic HARQ feedback mode. Based on the HARQ feedback mode, the number of transmitted repetitions may be equal to the number of repetitions in response to the HARQ feedback mode being the semi-static HARQ feedback mode. The wireless device may receive the DCI based on the number of transmitted repetitions.

In an example, a wireless device may receive one or more radio resource control (RRC) messages indicating configuration parameters. The configuration parameters may comprise/indicate a plurality of first monitoring occasions associated with at least one first search space. For example, the wireless device may monitor a first downlink control information (DCI) with repetition via the plurality of first monitoring occasions. The configuration parameters may comprise/indicate one or more second monitoring occasions associated with at least one second search spaces. For example, the wireless device may monitor a second DCI via the one or more second monitoring occasions and the one or more second monitoring occasions overlap with the plurality of first monitoring occasions. The wireless device may receive a DCI indicating a timing offset for a HARQ feedback. Based on the DCI and in response to first monitoring occasion of the plurality of first monitoring occasions occurs before first monitoring occasion of the one or more second monitoring occasions, the wireless device may determine first monitoring occasion of the plurality of first monitoring occasions as a first physical downlink control channel (PDCCH) monitoring occasion and may determine first monitoring occasion of the one or more second monitoring as a second PDCCH monitoring occasion. For example, the first monitoring occasion of the plurality of first monitoring occasions may start in a different time to the first monitoring occasion of the one or more second monitoring occasions.

In an example, a wireless device may one or more radio resource control (RRC) messages indicating configuration parameters. The configuration parameters may comprise/indicate a plurality of monitoring occasions associated with at least one search space. For example, the wireless device may monitor a first downlink control information (DCI) with repetition via the plurality of monitoring occasions. For example, the wireless device may receive the first DCI indicating a timing offset for a HARQ feedback. The wireless device may determine the plurality of first monitoring occasions as a physical downlink control channel (PDCCH) monitoring occasion for the HARQ feedback based on last monitoring occasion of the plurality of monitoring occasions and the wireless device processing capability. The wireless device may determine a number of HARQ feedback bits based on first monitoring occasion of the plurality of monitoring occasions. The wireless device may transmit the HARQ feedback based on the determining the number of HARQ feedback bits.

For example, the wireless device processing capability may represent a minimum gap/offset between a last reception timing of a PDSCH of a transport block and a first transmission of a PUCCH corresponding to the PDSCH.

What is claimed is:

1. A method comprising:
receiving, by a wireless device, one or more radio resource control (RRC) messages comprising one or more configuration parameters indicating:
a downlink control information (DCI) repetition; and
a first search space and a second search space that are configured for the DCI repetition, wherein:
a first DCI of the DCI repetition is to be received via a first monitoring occasion;
a second DCI of the DCI repetition is to be received via a second monitoring occasion; and
content of the first DCI and content of the second DCI are the same; and
transmitting one or more feedback information bits via an uplink resource, wherein:
a number of the one or more feedback information bits is determined based on a downlink assignment index (DAI) corresponding to an earlier one of the first monitoring occasion and the second monitoring occasion;
a start time for receiving the DCI repetition is the earlier one of the first monitoring occasion and the second monitoring occasion; and
a scheduling offset between the reception of the DCI repetition and a physical downlink shared channel (PDSCH) transmission scheduled by the DCI repetition is between:
a reception of a later one of the first monitoring occasion and the second monitoring occasion; and
the PDSCH transmission.

2. The method of claim 1, wherein the one or more configuration parameters indicate that the DCI repetition is scheduled via the first monitoring occasion of the first search space and the second monitoring occasion of the second search space.

3. The method of claim 1, wherein the one or more feedback information bits are one or more hybrid automatic repeat request acknowledgement (HARQ-ACK) feedback information bits.

4. The method of claim 3, further comprising determining that the one or more HARQ-ACK feedback information bits are based on the DAI corresponding to the earlier of the first monitoring occasion and the second monitoring occasion.

5. The method of claim 4, wherein the earlier of the first monitoring occasion and the second monitoring occasion is an earliest monitoring occasion.

6. The method of claim 1, wherein the uplink resource is a physical uplink control channel (PUCCH) resource.

7. The method of claim 1, further comprising determining a primary monitoring occasion among the first monitoring occasion and the second monitoring occasion.

8. The method of claim 7, wherein:

the primary monitoring occasion is a starting monitoring occasion of the first monitoring occasion and the second monitoring occasion;

the DAI corresponds to the primary monitoring occasion; and the primary monitoring occasion is the first monitoring occasion.

9. The method of claim 1, further comprising receiving, via the first monitoring occasion and the second monitoring occasion, the first DCI that indicates the DAI, wherein the first DCI and the second DCI are the same.

10. The method of claim 9, wherein the first DCI further indicates a timing offset from the first DCI to a PUCCH resource.

11. A wireless device comprising:

one or more processors; and memory storing instructions that, when executed by the one or more processors, cause the wireless device to:

receive one or more radio resource control (RRC) messages comprising one or more configuration parameters indicating:

a downlink control information (DCI) repetition; and a first search space and a second search space that are configured for the DCI repetition, wherein:

a first DCI of the DCI repetition is to be received via a first monitoring occasion;

a second DCI of the DCI repetition is to be received via a second monitoring occasion; and content of the first DCI and content of the second DCI are the same; and transmit one or more feedback information bits via an uplink resource, wherein:

a number of the one or more feedback information bits is determined based on a downlink assignment index (DAI) corresponding to an earlier one of the first monitoring occasion and the second monitoring occasion;

a start time for receiving the DCI repetition is the earlier one of the first monitoring occasion and the second monitoring occasion; and a scheduling offset between the reception of the DCI repetition and a physical downlink shared channel (PDSCH) transmission scheduled by the DCI repetition is between:

a reception of a later one of the first monitoring occasion and the second monitoring occasion; and the PDSCH transmission.

12. The wireless device of claim 11, wherein the one or more configuration parameters indicate that the DCI repetition is scheduled via the first monitoring occasion of the first search space and the second monitoring occasion of the second search space.

13. The wireless device of claim 11, wherein the one or more feedback information bits are one or more hybrid automatic repeat request acknowledgement (HARQ-ACK) feedback information bits.

14. The wireless device of claim 13, wherein the instructions further cause the wireless device to determine that the one or more HARQ-ACK feedback information bits are based on the DAI corresponding to the earlier of the first monitoring occasion and the second monitoring occasion.

15. The wireless device of claim 14, wherein the earlier of the first monitoring occasion and the second monitoring occasion is an earliest monitoring occasion.

16. The wireless device of claim 11, wherein the uplink resource is a physical uplink control channel (PUCCH) resource.

17. The wireless device of claim 11, wherein the instructions further cause the wireless device to determine a primary monitoring occasion among the first monitoring occasion and the second monitoring occasion.

18. The wireless device of claim 17, wherein:

the primary monitoring occasion is a starting monitoring occasion of the first monitoring occasion and the second monitoring occasion;

the DAI corresponds to the primary monitoring occasion; and the primary monitoring occasion is the first monitoring occasion.

19. The wireless device of claim 11, wherein:

the instructions further cause the wireless device to receive, via the first monitoring occasion and the second monitoring occasion, the first DCI that indicates the DAI;

the first DCI and the second DCI are the same; and the first DCI further indicates a timing offset from the first DCI to a PUCCH resource.

20. A base station comprising:

one or more processors; and memory storing instructions that, when executed by the one or more processors, cause the base station to:

transmit, to a wireless device, one or more radio resource control (RRC) messages comprising one or more configuration parameters indicating:

a downlink control information (DCI) repetition; and a first search space and a second search space that are configured for the DCI repetition, wherein:

a first DCI of the DCI repetition is to be received via a first monitoring occasion;

a second DCI of the DCI repetition is to be received via a second monitoring occasion; and content of the first DCI and content of the second DCI are the same; and receive one or more feedback information bits via an uplink resource, wherein:

a number of the one or more feedback information bits is determined based on a downlink assignment index (DAI) corresponding to an earlier one of the first monitoring occasion and the second monitoring occasion;

a start time for receiving the DCI repetition is the earlier one of the first monitoring occasion and the second monitoring occasion; and a scheduling offset between the reception of the DCI repetition and a physical downlink shared channel (PDSCH) transmission scheduled by the DCI repetition is between:

a reception of a later one of the first monitoring occasion and the second monitoring occasion; and the PDSCH transmission.

* * * * *